(12) United States Patent
Piecko

(10) Patent No.: US 10,936,668 B2
(45) Date of Patent: Mar. 2, 2021

(54) SYSTEMS AND METHODS FOR QUERYING DATABASES

(71) Applicant: DataWalk Spólka Akcyjna, Wroclaw (PL)

(72) Inventor: Krystian Piecko, Wroclaw (PL)

(73) Assignee: DATAWALK SPOLKA AKCYJNA, Wroclaw (PL)

(*) Notice: Subject to any disclaimer, the term of this patent is extended or adjusted under 35 U.S.C. 154(b) by 388 days.

(21) Appl. No.: 16/167,333

(22) Filed: Oct. 22, 2018

(65) Prior Publication Data

US 2019/0095395 A1 Mar. 28, 2019

Related U.S. Application Data

(63) Continuation of application No. PCT/EP2017/059892, filed on Apr. 26, 2017.

(Continued)

(51) Int. Cl.
*G06F 16/00* (2019.01)
*G06F 16/904* (2019.01)
(Continued)

(52) U.S. Cl.
CPC ........ *G06F 16/904* (2019.01); *G06F 16/2457* (2019.01); *G06F 16/26* (2019.01);
(Continued)

(58) Field of Classification Search
CPC ...... G06F 16/904; G06F 16/26; G06F 16/288; G06F 16/2457; G06F 16/9024; G06F 3/0482
See application file for complete search history.

(56) References Cited

U.S. PATENT DOCUMENTS 5,257,349 A 10/1993 Alexander
5,418,961 A 5/1995 Segal et al.
(Continued)

FOREIGN PATENT DOCUMENTS

EP 0592046 A2 4/1994
EP 2455869 A1 5/2012
WO WO-02059793 A3 4/2003

OTHER PUBLICATIONS

Anonymous: II sql—Relational database design question—Surrogate-key or Natural-key?—Stack Overflow, Sep. 19, 2010 (Sep. 19, 2010), XP055109921, Retrieved from the Internet: URL:http://stackoverflow.com/questions/3747730/relational-database-design-question-surrogate-key-or-natural-key [retrieved on Mar. 25, 2014].

(Continued)

*Primary Examiner* — Diedra McQuitery
(74) *Attorney, Agent, or Firm* — Wilson Sonsini Goodrich & Rosati

(57) ABSTRACT

A method for providing visualization of data objects in a relational database is provided. The method comprises: (a) bringing an electronic device of a user in communication with a server comprising the non-hierarchical relational database, (b) generating and displaying a graph comprising visual graphical elements including a first node representing a first class encompassing a first subset of the data objects, a second node representing a second class encompassing a second subset of the data objects, and a link representing a relationship between the first class and the second class, (c) receiving a request via the user interface of the electronic device to perform a task directed to at least a subset of the data objects, (d) generating one or more filtering operations for the task and, upon execution, producing a graphical result comprising a filtered data set, and (e) automatically displaying the graphical result on the user interface.

20 Claims, 51 Drawing Sheets

Related U.S. Application Data

(60) Provisional application No. 62/327,668, filed on Apr. 26, 2016.

(51) Int. Cl.

| | | |
|---|---|---|
| *G06F 16/26* | (2019.01) | |
| *G06F 16/28* | (2019.01) | |
| *G06F 16/2457* | (2019.01) | |
| *G06F 16/901* | (2019.01) | |
| *G06F 3/0482* | (2013.01) | |

(52) U.S. Cl.
CPC ........ *G06F 16/288* (2019.01); *G06F 16/9024* (2019.01); *G06F 3/0482* (2013.01)

(56) References Cited

U.S. PATENT DOCUMENTS

| | | |
|---|---|---|
| 5,548,758 A | 8/1996 | Pirahesh et al. |
| 5,604,899 A | 2/1997 | Doktor |
| 6,038,566 A | 3/2000 | Tsai |
| 6,105,035 A | 8/2000 | Monge et al. |
| 6,163,775 A | 12/2000 | Wlaschin et al. |
| 6,192,371 B1 | 2/2001 | Schultz |
| 6,934,712 B2 | 8/2005 | Kiernan et al. |
| 6,947,945 B1 | 9/2005 | Carey et al. |
| 6,986,102 B1 | 1/2006 | Baer et al. |
| 7,058,622 B1 | 6/2006 | Tedesco |
| 7,243,106 B2 | 7/2007 | Vierich et al. |
| 7,363,593 B1 | 4/2008 | Loyens et al. |
| 7,895,191 B2 | 2/2011 | Colossi et al. |
| 8,103,703 B1 | 1/2012 | Jetter et al. |
| 8,224,829 B2 | 7/2012 | Pauly |
| 8,364,623 B1 | 1/2013 | Bunker et al. |
| 8,386,920 B2 | 2/2013 | Cox et al. |
| 8,793,246 B1 | 7/2014 | Mathur et al. |
| 8,874,621 B1 | 10/2014 | Goodwin et al. |
| 9,218,380 B2 | 12/2015 | Adzic et al. |
| 9,483,508 B1 | 11/2016 | Wilkes et al. |
| 9,747,312 B2 | 8/2017 | Piecko |
| 10,002,143 B2 | 6/2018 | Piecko et al. |
| 10,095,743 B2 | 10/2018 | Piecko |
| 2001/0051948 A1 | 12/2001 | Srinivasan et al. |
| 2002/0029209 A1 | 3/2002 | Bernal et al. |
| 2003/0088545 A1 | 5/2003 | Subramaniam et al. |
| 2003/0208493 A1 | 11/2003 | Hall et al. |
| 2003/0229640 A1 | 12/2003 | Carlson et al. |
| 2004/0088283 A1 | 5/2004 | Lissar et al. |
| 2004/0133581 A1 | 7/2004 | Shinjo |
| 2004/0139102 A1 | 7/2004 | Vierich et al. |
| 2004/0255301 A1 | 12/2004 | Turski et al. |
| 2005/0039033 A1 | 2/2005 | Meyers et al. |
| 2005/0216503 A1 | 9/2005 | Charlot et al. |
| 2005/0228818 A1 | 10/2005 | Murthy et al. |
| 2005/0229167 A1* | 10/2005 | Henning ............... G06F 16/958 717/143 |
| 2006/0173841 A1 | 8/2006 | Bill |
| 2006/0288035 A1 | 12/2006 | Viavant |
| 2007/0112803 A1 | 5/2007 | Pettovello |
| 2007/0198557 A1 | 8/2007 | Ching et al. |
| 2007/0214136 A1* | 9/2007 | MacLennan ........ G06F 16/2465 |
| 2008/0021864 A1 | 1/2008 | Bakalash et al. |
| 2008/0033987 A1 | 2/2008 | Carter |
| 2008/0183658 A1 | 7/2008 | Mangipudi |
| 2008/0301181 A1 | 12/2008 | Lori |
| 2009/0103715 A1 | 4/2009 | Thorbjornsson |
| 2009/0222408 A1 | 9/2009 | Charles et al. |
| 2010/0287212 A1 | 11/2010 | Becker |
| 2010/0299348 A1 | 11/2010 | Gill et al. |
| 2010/0333113 A1* | 12/2010 | Johnson ............... G06F 9/4881 719/318 |
| 2011/0231438 A1 | 9/2011 | Pfeifle et al. |
| 2012/0096002 A1 | 4/2012 | Sheehan et al. |
| 2012/0117027 A1 | 5/2012 | Shau et al. |
| 2012/0246147 A1 | 9/2012 | Lamb et al. |
| 2012/0284635 A1 | 11/2012 | Sitrick et al. |
| 2013/0083104 A1 | 4/2013 | Mitsuki |
| 2013/0086104 A1 | 4/2013 | Morrison et al. |
| 2013/0091180 A1 | 4/2013 | Vicat-Blanc-Primet et al. |
| 2013/0144917 A1 | 6/2013 | Hosurmath et al. |
| 2013/0307843 A1 | 11/2013 | Sikka et al. |
| 2013/0311518 A1 | 11/2013 | Agbaria |
| 2014/0046983 A1 | 2/2014 | Galloway et al. |
| 2014/0297693 A1 | 10/2014 | Piecko |
| 2015/0006507 A1 | 1/2015 | Piecko |
| 2015/0309695 A1* | 10/2015 | Sannandeji ............... G06F 8/34 715/763 |
| 2015/0379429 A1* | 12/2015 | Lee ........................ G09B 5/00 706/11 |
| 2018/0018357 A1 | 1/2018 | Piecko |
| 2018/0181446 A1* | 6/2018 | Bequet ............... G06F 16/9024 |
| 2018/0203884 A1 | 7/2018 | Piecko |

OTHER PUBLICATIONS

Co-pending U.S. Appl. No. 16/058,025, filed Aug. 8, 2018.
European Search Report; RE. Application No. 13461516.0 Report Date: Jul. 30, 2013.
European Search Report; RE. Application No. 13461536.8 Report Date: Sep. 10, 2013.
European Search Report; RE. Application No. 13461545.9 Report Date: Apr. 25, 2014.
European Search Report; RE. Application No. 13461546.7 Report Date: Apr. 11, 2014.
European Search Report dated Feb. 16, 2017 for European Patent Application No. EP16197450.6.
European Search Report dated May 18, 2017 for European Patent Application No. 16203912.7.
Girvan et al. Community structure in social and biological networks. Proc Natl Acad Sci U S A. Jun. 11, 2002; 99(12): 7821-7826.
Notice of Allowance dated Apr. 10, 2017 for U.S. Appl. No. 14/469,968.
Notice of Allowance dated Apr. 28, 2017 for U.S. Appl. No. 14/469,968.
Notice of Allowance dated Jul. 26, 2017 for U.S. Appl. No. 14/469,968.
Notice of Allowance dated Dec. 19, 2017 for U.S. Appl. No. 14/222,795.
Office action dated Feb. 11, 2016 for U.S. Appl. No. 14/222,795.
Office Action dated Mar. 13, 2017 for U.S. Appl. No. 14/315,481.
Office Action dated Apr. 28, 2017 for U.S. Appl. No. 14/222,795.
Office Action dated May 26, 2017 for U.S. Appl. No. 14/469,958.
Office action dated Jun. 2, 2016 for U.S. Appl. No. 14/222,795.
Office Action dated Jul. 3, 2017 for U.S. Appl. No. 14/315,481.
Office action dated Aug. 22, 2016 for U.S. Appl. No. 14/315,481.
Office action dated Aug. 26, 2016 for U.S. Appl. No. 14/469,968.
Office action dated Sep. 12, 2016 for U.S. Appl. No. 14/469,958.
Office Action dated Sep. 22, 2016 for U.S. Appl. No. 14/222,795.
Office Action dated Dec. 21, 2016 for U.S. Appl. No. 14/469,968.
Office Action dated Dec. 22, 2017 for U.S. U.S. Appl. No. 14/469,958.
PCT/EP2017/059892 International Search Report and Written Opinion dated May 30, 2017.
U.S. Appl. No. 14/222,795 Notice of Allowance dated Jan. 29, 2018.
U.S. Appl. No. 14/315,481 Notice of Allowance dated Nov. 28, 2018.
U.S. Appl. No. 14/315,481 Office Action dated May 17, 2018.
U.S. Appl. No. 14/469,958 Notice of Allowance dated Jun. 29, 2018.

* cited by examiner

FIG. 14

SYSTEMS AND METHODS FOR QUERYING DATABASES

CROSS-REFERENCE

This application is a continuation application of International PCT Application No. PCT/EP2017/059892, filed Apr. 26, 2017, which claims priority to U.S. Provisional Patent Application No. 62/327,668, filed Apr. 26, 2016, each of which is entirely incorporated herein by reference.

BACKGROUND

A database is a data storage concept evolving for decades since the 1960s to case increasing difficulties in designing, building, and maintaining complex information systems (multi-user systems with a large amount of data). Another term directly related to databases is a database management system (DBMS), which enables the effective handling of databases. It shall nevertheless be noted that the terms database and DBMS define different entities, they may be inseparable: a database's properties may be determined by its supporting DBMS. A DBMS is presently a complex software system such as general-purpose DBMSs, like Oracle or Microsoft SQL Server.

Techniques exist for computer-implemented methods and systems for creating and managing a database. In particular there are three major DBMS approaches widely used in the industry, e.g., relational databases, object databases and graph databases.

A relational database is a collection of data items organized as a set of formally described tables from which data can be accessed easily. A relational database may be created using the relational model. The software used in a relational database is called a relational database management system (RDBMS). A relational database may be a dominant choice for many data storage applications. An RDBMS may comprise of a number of tables in which, for example, each table has its own primary key.

A problem with a relational database may be the complexity that arises when the relational database is created. It is generally important that defined relationships among the tables are correct and that each set of information is linked to its pair. Although less information has to be entered in total than with other database approaches, verifying that points are set up correctly may be a time-consuming process. Furthermore, the relationships can become complicated when a relational database comprises numerous tables.

An object database (also object-oriented database management system or OODBMS) is a database management system comprising information represented in the form of objects as used in object-oriented programming. Object databases may be different from relational databases and belong together in a broader database management system.

An object database may store complex data and relationships between data directly, without mapping to relational rows and columns, which may make object databases suitable for applications in which complex data may be encountered. Objects may have a many-to-many relationship and are accessed by the use of pointers. Pointers may be linked to objects to establish relationships. Another benefit of an OODBMS may be that an OODBMS may be programmed with small procedural differences without affecting the entire system. This may be helpful for those organizations in which data relationships may be used that are not entirely clear or there is a need to change these relations to satisfy a new business requirement.

Disadvantages of object databases may include lower efficiency when data is complex and relationships are complex, late binding may slow down access speed, data and operations being separated, low responsiveness to changes in problem space, and inadequate design for concurrent problems, for example.

A hybrid object-relational database may be suitable for some applications. A client application may direct queries to an object server component to obtain data from the data sources. An object server component may operate with an object definition component which may fulfill the queries. An object definition component may access an object definition database to obtain and use metadata, in the form of programmatic objects, about the location and structure of the data stored in the data sources. An optional object manager component may, for example, work with the object definition component to edit and create new metadata or, via the object server component, to work with and create new instances of the data sources.

As it pertains in particular to graph databases, such databases may depart from traditional storage and definitions paradigms. Many software developers may have experience with storing data in tabular form in a relational database. Such approaches may work well for some applications, but presently may begin to show drawbacks. Relational databases, for example, may exhibit difficulties in scaling. Unfortunately, more and more of today's innovative applications may involve massive data to be processed. In some instances, such large data processing requirements may expose a need for new approaches such as Graph Databases. For example, tables, such as tables used in relational databases, may be difficult to implement in web-based environments. Since a web may be characterized as collection of pages that are hyperlinked, not identically-shaped rows in a gigantic table, a graph database may more closely accord with present-day web architectures. A graph, as known from mathematics, or as informally drawn by most engineers on whiteboards, may be a much more natural representation for data that is native to the web. Given that much of the data processed by today's innovative applications may exist elsewhere, the time of stovepipe applications may past. Additionally, some applications may not own a substantial percentage of their own data, such as some social feed aggregators.

Current databases, such as ORACLE®, may provide for the use of an ALTER command. The process of modifying database structures directly requires locking a database structure that will be modified. There is also a related LOCK command that effectuates a freeze of a database structure for the time of modification such as adding, searching for or modifying records of a given table.

In production, end-user database systems, may make use of special scripts utilizing special triggers, which execute ALTER and/or LOCK commands automatically.

In some instances, an operation of adding a column to a database may lock a table. Further, an ALTER command may close currently executing data processing tasks such as transactions. This may render processing operations executing with varying number of parameters to be ineffective and may potentially threaten integrity of data gathering. Further, if data are collected very quickly, the size of a data buffer may be insufficient.

The use of the aforementioned commands in databases that arc updated very frequently may be problematic in that such approaches may require databases to stop certain services. Hence it may also be beneficial to create a database system that does not require to stop the aforementioned services when, for example, a new column is to be added to an existing table.

Drawbacks of known graph databases include, for example, increased memory requirements and difficulties in presenting information to a user in a clear way. In some cases where few nodes have a large number of connections and most nodes have few connections, graph databases are designed to keep the nodes and their linked objects (references) as close as possible; thus, the graph databases cannot be split, leading to inefficient data drilling. Further drawbacks of current database systems include lack of possibility of extending database in real time and difficulties in understanding how a complex database is designed.

Taking into account the present techniques there is a need to design and implement an efficient database model that is especially adapted to large scale databases, is easily scalable and has reduced memory requirement in comparison to graph, relational or object-oriented databases.

Moreover, a typical database may contain hundreds or even thousands of data structures (e.g., tables, objects, and graphs). If a user wants to execute database queries on a complicated database with many related data structures, specially tailored queries have to be designed, which may be usually complex and require a long time to process by a computing machine. If the queried results do not reflect desired results aligning with the original design, the queries may have to be performed again, which may be very costly in terms of time and required trial and error cycles. As such, to avoid a user to learn a new system of query language, a user friendly interface for data queries is much more desirable.

SUMMARY

Recognized herein are various limitations to databases currently available, as described above. It may be advantageous to improve data query processes with a data discovery and data visualization tool. The technologies can be made independent of a hierarchy of a database, because up to now such data query processes have been hardcoded in end-user software, such as Business Intelligence (BI) database software, Enterprise Resource Planning (ERP) database software and Customer Relationship Management (CRM) database software, and any new request of a client that desires some new way of data drilling (e.g., drill up or drill down), presently requires end-user's software update and extensive work on the side of database software provider.

In a traditional SQL-based system, a user seeking an answer proceeds through a series of queries. At each step, the query gets longer, more complex, and takes longer to execute. With each incremental step, the assumptions in the query become more hidden from the end user. And, each step requires a SQL expert with knowledge of the underlying data representation. The focus with such systems is on writing good queries. NoSQL databases or other well-known database languages may also share such problems with SQL-based systems.

The technology disclosed herein may allow a user to explore data by following a series of connections between sets of abstract classes or data objects. A user may not need to be aware of SQL queries (or NoSQL queries), which are being generated behind the scenes. The disclosed system may offer a user interface to a user, and the interface may take the user along a path of inquiry; each step can be incremental and fast. As a user creates a path, all of previous steps are visible, and assumptions are not buried in, for example, a huge SQL query. If a path leads to a dead-end, it's quick and easy for a user to return to a previous step in the path and resume exploration from that point.

The technology disclosed herein may also be distinguished from a traditional graph database. In a graph database, the focus is on objects. For example, when a graph database satisfies a query, it does so using objects. In a typical graph database, many objects have a handful of links to other objects, but a few may have large number of links. When such graph database partitions a dataset to speed queries, each object can be assigned to a partition. Some partitions may, unfortunately, have objects with large number of links. These partitions will run slowly and may delay the result of the entire query. Deployments using graph databases also often manipulate their objects in an unnatural way to avoid these issues. By forcing the object model to fit the limitations of the graph database, maintenance and usability issues may arise.

In contrast, the technology disclosed herein is a connection-oriented system. The underlying RDBMS may be optimized around connections (as opposed to objects). For example, when the RDBMS partitions data for performance, there is no need for an object to reside wholly within a single partition. In the disclosed system, the connections are spread across all available compute resources. Consequently, even massively linked objects may be handled without performance penalty issues in a traditional graph database.

In one aspect, disclosed herein is a method for providing visualization of data objects to a user, comprising: (a) bringing an electronic device of a user in communication with a computer server comprising a database that stores said data objects in a non-hierarchical manner, which electronic device comprises a user interface; (b) providing a first output of a first relationship of said data objects for display on said user interface, which relationship is between said data objects in said non-hierarchical manner, and wherein said first output includes one or more graphical elements that are representative of said first relationship; (c) receiving a request from said user to access a subset of said data objects stored in said database, which request is inputted in said user interface that displays said relationship; (d) accessing said database to retrieve said subset of said data objects from said database; (e) generating a second relationship of said data objects, which second relationship is representative of said subset of said data objects; and (f) generating a second output of said second relationship for display on said user interface, which second output includes one or more graphical elements that are representative of said second relationship. In some embodiments, said first relationship is a graph that comprises a node representing an abstract class encompassing a first subset of said data objects, and a link representing a data relationship between a pair of one or more other abstract classes representing a remainder of said data objects. Said second relationship may be an additional graph that comprises an additional node representing a class encompassing a second subset of said data objects, which second subset includes data objects from said first subset of said data objects. Said database may store said data objects with the aid of an electronic mind map.

In another aspect, disclosed herein is a system for providing visualization of data objects to a user, comprising: (a) a database that stores said data objects in a non-hierarchical manner; and (b) a computer processor operatively coupled to said database and programmed to (i) provide a first output of a first relationship of said data objects for display on said user interface, which relationship is between said data objects in said non-hierarchical manner, and wherein said first output includes one or more graphical elements that are representative of said first relationship; (ii) receive a request from said user to access a subset of said data objects stored in said database, which request is inputted in said user interface that displays said relationship; (iii) access said database to retrieve said subset of said data objects from said database; (iv) generate a second relationship of said data objects, which second relationship is representative of said subset of said data objects; and (v) generate a second output of said second relationship for display on said user interface, which second output includes one or more graphical elements that are representative of said second relationship. The first relationship may be a graph that comprises a node representing an abstract class encompassing a first subset of said data objects, and a link representing a data relationship between a pair of one or more other abstract classes representing a remainder of said data objects. Said second relationship may be an additional graph that comprises an additional node representing a class encompassing a second subset of said data objects, which second subset includes data objects from said first subset of said data objects. The database may store said data objects with the aid of an electronic mind map.

In another aspect, disclosed herein is a non-transitory computer-readable medium comprising machine-executable code that, upon execution by one or more computer processors, implements a method for providing visualization of data objects to a user, the method comprising: (a) bringing an electronic device of a user in communication with a computer server comprising a database that stores said data objects in a non-hierarchical manner, which electronic device comprises a user interface; (b) providing a first output of a first relationship of said data objects for display on said user interface, which relationship is between said data objects in said non-hierarchical manner, and wherein said first output includes one or more graphical elements that are representative of said first relationship; (c) receiving a request from said user to access a subset of said data objects stored in said database, which request is inputted in said user interface that displays said relationship; (d) accessing said database to retrieve said subset of said data objects from said database; (e) generating a second relationship of said data objects, which second relationship is representative of said subset of said data objects; and (f) generating a second output of said second relationship for display on said user interface, which second output includes one or more graphical elements that are representative of said second relationship. Said database may store said data objects with the aid of an electronic mind map.

In an aspect, provided is a method for providing visualization of data objects to a user. The method can comprise: bringing an electronic device of a user in communication with a computer server comprising a database that stores the data objects in a non-hierarchical manner, which electronic device comprises a user interface; providing a first output of a first relationship of the data objects for display on the user interface, wherein the first relationship is between the data objects in the non-hierarchical manner, and wherein the first output includes one or more graphical elements that are representative of the first relationship; receiving a request from the user to access a subset of the data objects stored in the database, which request is inputted in the user interface that displays the relationship; accessing the database to retrieve the subset of the data objects from the database; generating a second relationship of the data objects, wherein the second relationship is representative of the subset of the data objects; and generating a second output of the second relationship for display on the user interface, which second output includes one or more graphical elements that are representative of the second relationship.

In some embodiments, the first relationship can be a graph that comprises a node representing a class encompassing a first subset of the data objects, and a link representing a data relationship between a pair of one or more other classes representing a remainder of the data objects.

In some embodiments, the second relationship can be an additional graph that comprises an additional node representing a class encompassing a second subset of the data objects, which second subset includes data objects from the first subset of the data objects.

In some embodiments, the method can further comprise providing a querying interface for the database based on a selected node on the graph, wherein the graph is updated based on the selected node and a menu associated with the selected node is provided on the user interface.

In some embodiments, the menu can comprise a filtering option, wherein the filtering option is configured to perform a query on one or more classes linked to the selected node.

In some embodiments, the filtering option can provide one or more options for filtering based on the selected node on the graph.

In some embodiments, the request from the user can comprise options selected from the one or more options provided on the graph.

In some embodiments, possible filtering options can be automatically populated based on the selected node on the graph.

In some embodiments, the database can store the data objects with the aid of an electronic mind map.

In another aspect, a system can be provided for visualization of data objects to a user. The system can comprise: a database that stores the data objects in a non-hierarchical manner; and one or more computer processors operatively coupled to the database, wherein the one or more computer processors are individually or collectively programmed to (i) provide a first output of a first relationship of the data objects for display on a user interface, wherein the first relationship is between the data objects in the non-hierarchical manner, and wherein the first output includes one or more graphical elements that are representative of the first relationship; (ii) receive a request from the user to access a subset of the data objects stored in the database, which request is inputted in the user interface that displays the relationship; (iii) access the database to retrieve the subset of the data objects from the database; (iv) generate a second relationship of the data objects, wherein the second relationship is representative of the subset of the data objects; and (v) generate a second output of the second relationship for display on the user interface, which second output includes one or more graphical elements that are representative of the second relationship.

In other aspect, a non-transitory computer-readable medium can be provided which may comprise machine-executable code that, upon execution by one or more computer processors, implements a method for providing visualization of data objects to a user, the method comprising: bringing an electronic device of a user in communication with a computer server comprising a database that stores the data objects in a non-hierarchical manner, which electronic device comprises a user interface; providing a first output of a first relationship of the data objects for display on the user interface, wherein the first relationship is between the data objects in the non-hierarchical manner, and wherein the first output includes one or more graphical elements that are representative of the first relationship; receiving a request from the user to access a subset of the data objects stored in the database, which request is inputted in the user interface that displays the relationship; accessing the database to retrieve the subset of the data objects from the database; generating a second relationship of the data objects, wherein the second relationship is representative of the subset of the data objects; and generating a second output of the second relationship for display on the user interface, which second output includes one or more graphical elements that are representative of the second relationship.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein).

FIG. 14 shows a table view of data records in the results of FIG. 13.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The technologies disclosed herein include a visualization-oriented system, which may enable a user to explore data sets simply by clicking and filtering. Interactions with a visualization system can generate a series of invisible queries, enabling the system to be effectively operated by a user who has no knowledge of SQL or any specific database systems or languages.

Database Systems

Figure 1:
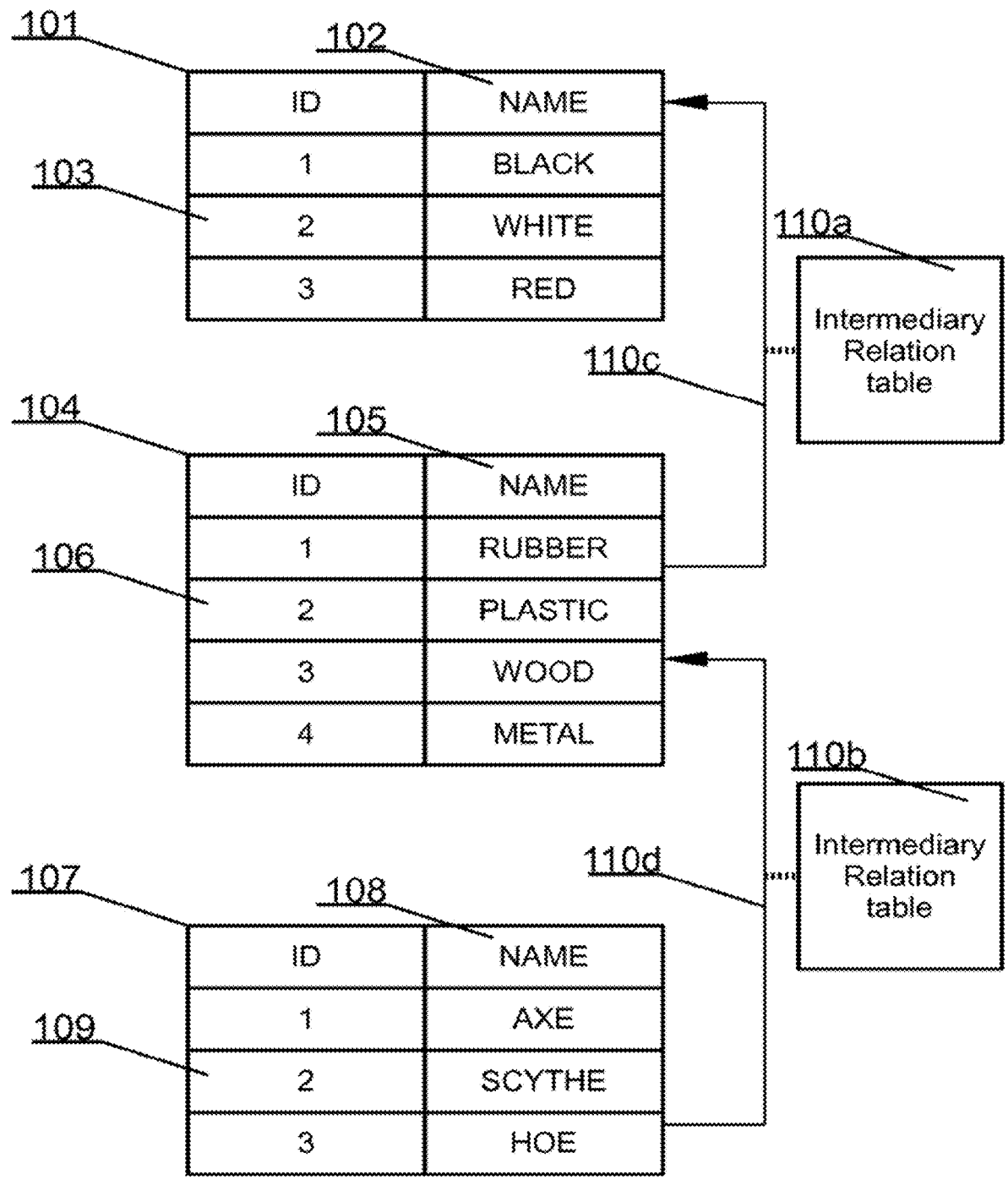
FIG. 1 presents an exemplary relational database of the present disclosure.

FIG. 1 presents an exemplary relational database schema. The database comprises three tables and two relations. The first table 101 may hold colors data and may comprise two columns, namely name of the color (NAME) 102 and identifier of the color (ID) 103. A second table 104 may hold materials data and may comprise two columns, namely name of the material (NAME) 105 and identifier of the material (ID) 106. A third table, namely table 107 may hold tools data and may comprise two columns, namely name of the tool (column→'NAME') 108 and identifier of the tool (column→'ID') 109. Second table 104 may link with first table 101 by way of link 110c and to intermediary relation table 110a.

Tables 101 and 107 may comprise three entries while table 104 has four entries. The colors table 101 and the materials table 104 may be related, which may be defined with the aid of a relation 110c. Table 107 may link with table 104 and with intermediary relation table 110b by way of link 110d.

Typically, one defines foreign keys in a database to model relationships in the real world. Relationships between real-world entities may often be complex, involving numerous entities each having multiple relationships with one another. For example, a family may have multiple relationships between multiple people. In addition all relationships may exist at the same time. In a relational database, however, there are considered only relationships between pairs of tables. These tables may be related in one of three different ways: one-to-one, one-to-many or many-to-many.

The relation 110c is for example many-to-many relation where a color may be assigned to many materials but at the same time a material may be assigned to many colors.

Such relation in a real database system may be implemented by using an intermediary relation table 110a that provides mapping between elements of each table. On a similar technical basis, in FIG. 1, there is defined another relation between materials table and tools table 110d utilizing an intermediary relation Table 110b. The relation may be for example many-to-many relation where a material may be assigned to many tools but at the same time a tool may be assigned to many materials.

A relational database may therefore be summarized, at least in some embodiments, as follows: there are at least two sets of elements and at least one relation that defines how elements from the first set arc related to the elements of the second set, whereas the relation involves creation of a data structure mapping elements of the first set to elements of the second set. Typically the mapping may be brought about with the aid of unique identifiers (within each set) of the elements in each set.

It has been observed, that many problems that a relational database designer faces with respect to awareness of the complete design are a result of presenting real life events and entities on a very complex tables and relations diagram.

Real life cases, however, may be suitably defined and presented with the aid of electronic mind maps (also "mind maps" herein).

In some embodiments, an electronic mind map is a diagram, which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Figure 2:
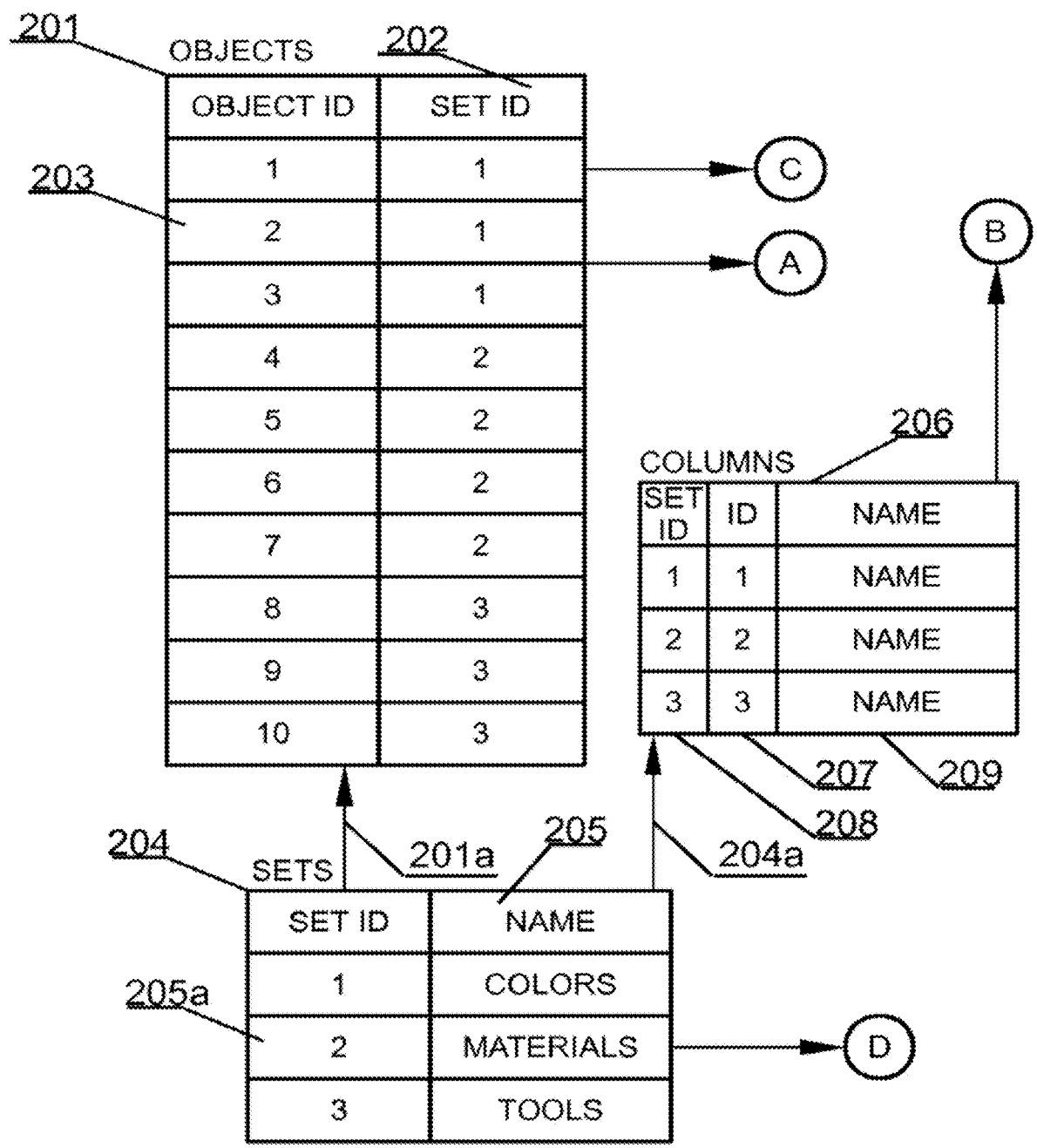
FIG. 2 shows an example of a database system of the present disclosure.

FIG. 2 shows a new database system. In order to cooperate with mind maps, the database system has been designed differently than known database systems. The database system comprises six core sets of data and optional sets. The core sets comprise SETS, OBJECTS, COLUMNS, CHARACTERISTICS, RELATIONS and OBJECTS RELATIONS. It should be noted that the names above are exemplary only and the respective core sets are defined rather by their function within the system than their name.

In order to more easily understand differences between the relational database of FIG. 1 and the embodiments presented herein, the same database and its data will be also used in FIG. 2. The first set of data is called SETS 204, because it may be used to logically hold data related to sets of data. Sets of data may be represented on a mind map as nodes. Each entry in a SETS data structure 204 may comprise at least a unique identifier 205a and may also comprise its name 205. Referring back to example from FIG. 1 there are three SETS, namely COLORS having ID of 1, MATERIALS having ID of 2 and TOOLS having ID of 3. The SETS data structure may be a top level structure and may not refer to other data structures, but other data structures may refer to the SETS data structure as identified by respective arrows between the sets of FIG. 2.

Each set of data may be, as in the real world, characterized by some properties typically referred to as columns. Hence, the second set of data may be called COLUMNS 206. A property, typically referred to as a "column," may be uniquely identified with an identifier ID 207 and maybe associated with a set, defined in the SETS data structure 204, with the aid of an identifier herein called SET ID 208. A column also may be associated with a name 209. As indicated by an arrow 204a, the COLUMNS data structure logically, directly references the SETS data structure, because the COLUMNS data structure may utilize the identifiers of sets. If, for example, each color of the set called COLORS comprises another property, say RGB value, there may possibly be added an entry comprising the following values: 1, 4, RGB'. At such a level of the system types of respective data such as text, integer, BLOB may not be considered as their application in the present system is routine work.

Referring back to an example from FIG. 1, there may be three columns wherein each column is associated with a textual identifier "NAME" 209. However, as can be readily seen by respective set identifiers, each column may be associated using a different set, which corresponds to an arrangement of FIG. 1.

Having defined data structures of SETS and COLUMNS there may be defined objects that may form elements of respective SETS and may have properties defined by the COLUMNS data structure. Objects may be held in the OBJECTS 201 data structure. The OBJECTS 201 data structure may hold entries uniquely identified with an identifier ID 203 and associated with a set, defined in the SETS data structure 204, with the aid of an identifier herein called SET ID 202. As indicated by an arrow 201a, the OBJECTS data structure logically, directly references the SETS data structure, since, for example, the SETS data structure utilizes identifiers of sets.

Referring back to an example from FIG. 1 there are ten objects in the database, namely three colors, four materials and three tools. Hence, the OBJECTS data structure 201 may comprise ten objects, which may correspond to the data of the relational database presented in FIG. 1. A fourth core data structure is a data structure that may hold data entries of each property of each object. This data structure has been identified as CHARACTERISTICS 301 in FIG. 2. This may be a fundamental difference from known databases in which there are rows of data that comprise entries for all columns of a data table. Each property of an object is stored as a separate entry, which may greatly improve scalability of the system and allow for example adding object properties in real time.

The CHARACTERISTICS 301 data structure may hold entries uniquely identified using an identifier OBJECT ID 302 and maybe associated with a property, defined in the COLUMNS data structure 206, with the aid of an identifier herein referred to as COLUMNID 303. Further each entry in the CHARACTERISTICS data structure, may comprise a value of a given property of the particular object. As indicated by respective arrows originating from sources A and B, the CHARACTERISTICS data structure 301 logically, directly references the COLUMNS data structure and the OBJECTS data structure, because CHARACTERISTICS data structure 301 uses the identifiers from the respective data structures. Characteristics data structure 301 includes a VALUE property 304, such as black, white, red, rubber, plastic, wood, metal, axe, scythe, and hoc.

Referring back to an example from FIG. 1 there are ten characteristics that may result from the notion that in the example of FIG. 1 there are three colors, four materials and three tools. By way of a non-limiting example, one can easily recognize that the BLACK color refers to an object having ID of 1 and to property having ID of 1. By using these identifiers, for example, one may determine that the property description is "NAME" and that the object belongs to the set, whose description is "COLORS".

A fifth core data structure, of the database system according to particular embodiments, may be operator function to hold data regarding relations present in the database. This data structure has been referred to herein as RELATIONS 305. This may be a simple structure and, in principle, may hold an identifier of a relation ID 307 and additionally hold a textual description of the relation i.e. a NAME 306. As indicated by an arrow 305a, the RELATIONS data structure may logically, directly references (e.g., downwards direction) the OBJECTS RELATIONS data structure, because the OBJECTS RELATIONS may use the identifiers of the relations.

Referring back to mind maps, for example, a relation present in the RELATIONS 305 data structure, may be directly mapping to a branch between two nodes of a mind map. A relation may be of different types, however in some embodiments, as in typical mind maps, a relation may be provided with a textual description.

The last core data structure of the present embodiment may be the mentioned OBJECTS RELATIONS data structure 308. This data structure may be designed to provide mapping between a relation from the RELATIONS data structure 305 and two objects from the OBJECTS data structure 301. For example a first entry in the OBJECTS RELATIONS data structure 308 defines that a relation having identifier of 1 exists between object having an identifier of 1 and an object having an identifier of 6. Referring to FIG. 1 this may be an exact definition that a material of wood has color of black, which is defined, in relational database systems, by the intermediary relation table 110a (not shown in details). OBJECT RELATIONS data structure 308 includes Object ID columns 309, Object ID column 310, and Relation ID column 311.

In some embodiments, a seventh data structure may exist in a database system. This data structure may hold data regarding relations between respective data sets and in FIG. 3 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student—teacher relation between persons assigned to a particular set.

As described, for example, a relational database system of 100 tables may, in one possible example implementation, be stored in the six above-described data structures. Naturally, most of the data may be kept in the OBJECTS and CHARACTERISTICS data structures.

Figure 3:
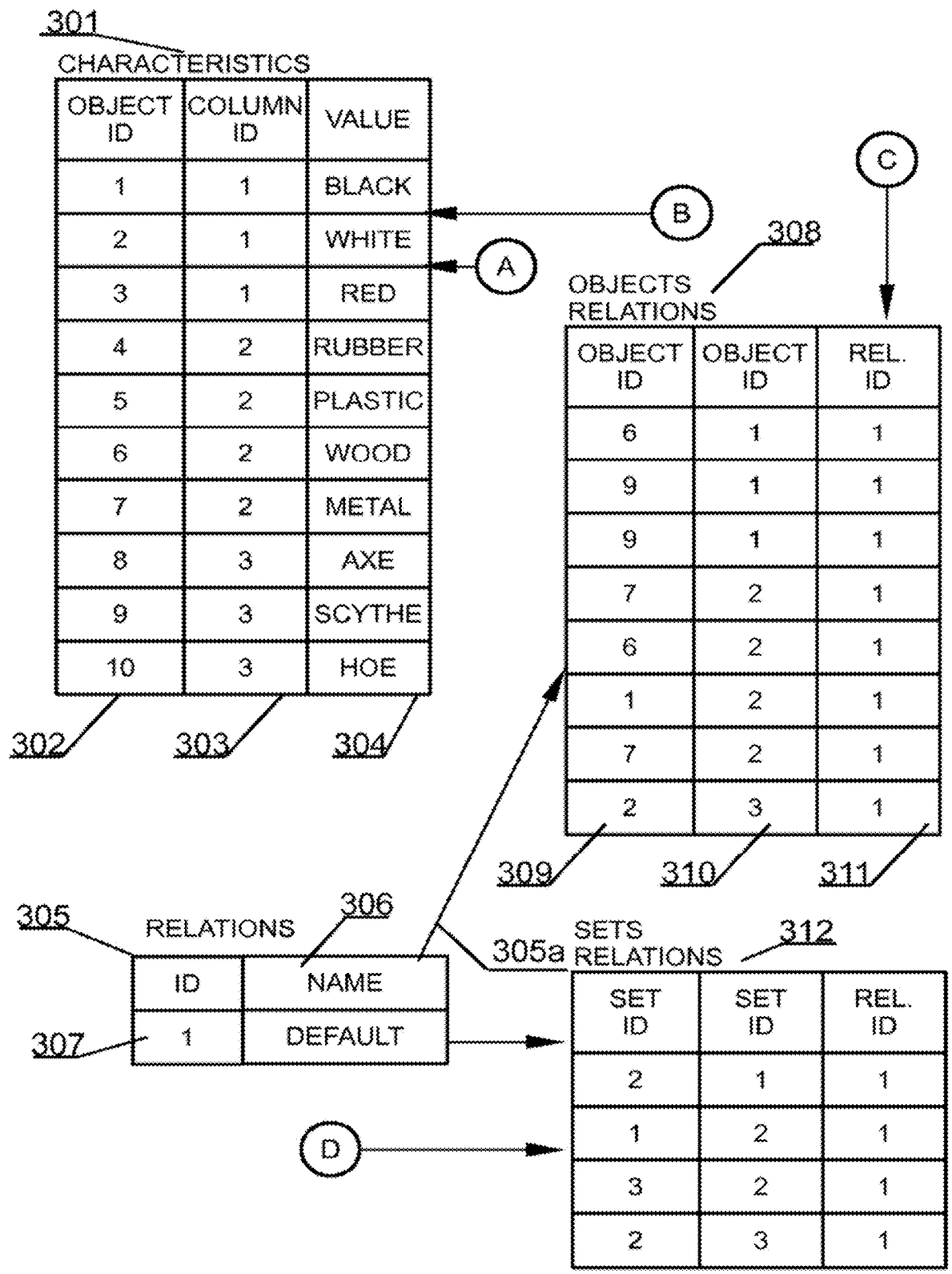
FIG. 3 shows an example of a database system of the present disclosure.

The data structures that are illustrated and described in FIG. 2 and FIG. 3 may also be altered in various ways. For example, in FIG. 2, the OBJECTS table can be partitioned or sharded according to SET ID 202. Sharding, as used herein, may generally refer to horizontal partitioning, whereby rows of database tables may be held separately rather than splitting by columns. Each partition may form part of a "shard", wherein each "shard" may be located on a separate database server or physical location. Similarly, in FIG. 3, for example, CHARACTERISTICS table can be partitioned or sharded according to COLUMN ID 303. When sharding is used, for every column in a set, the system may create key value tables that can comprise of the values from the chosen column. The OBJECT RELATIONS table can also be partitioned or sharded according to the REL. ID 311 or sharded according to an algorithm that can maintain persistence. Moreover, FIGS. 2 and 3 are for illustration purposes only and may comprise of more columns that is illustrated in those figures.

Figure 4:
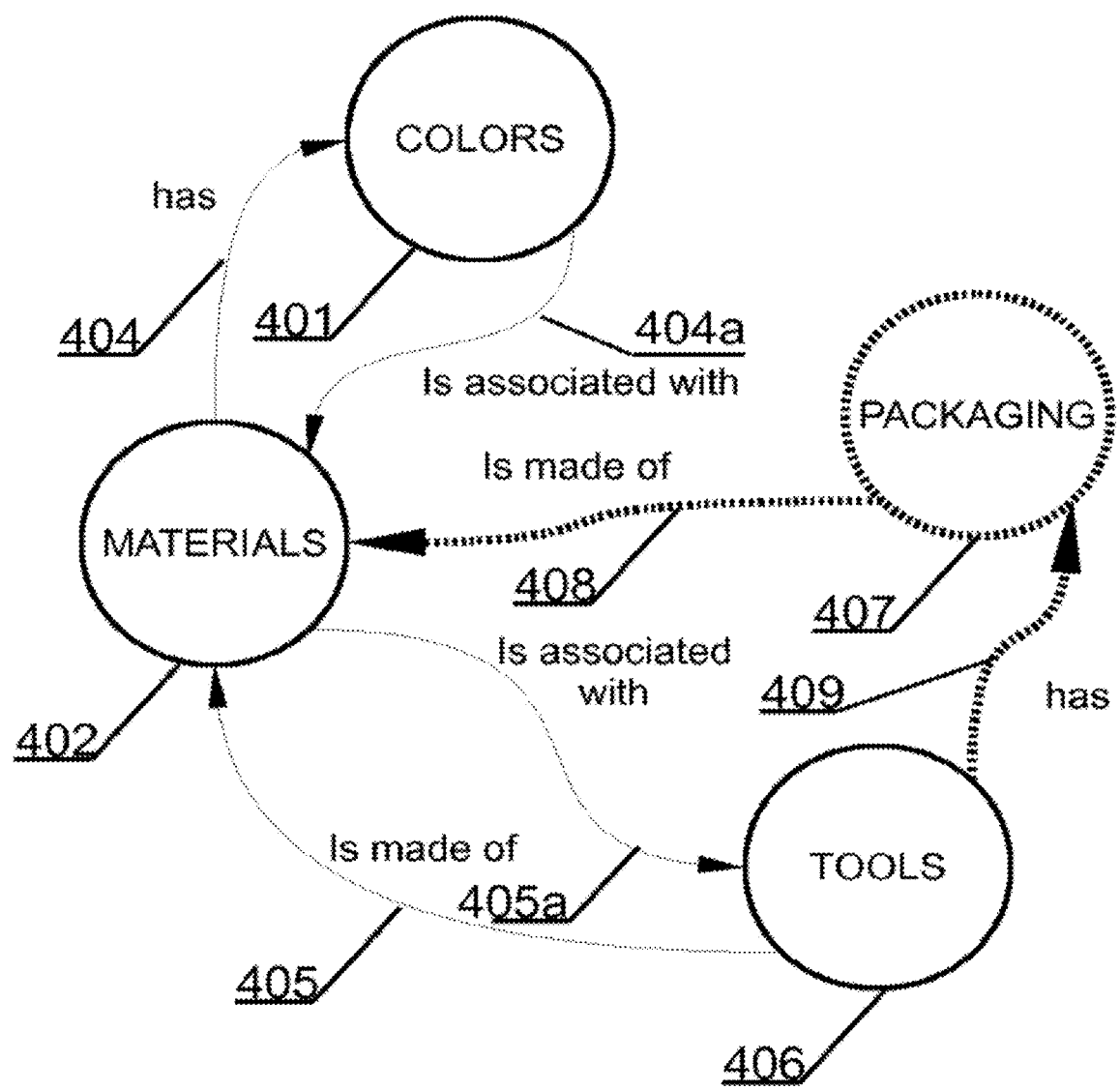
FIG. 4 depicts a mind map that may represent the database of FIG. 2 and FIG. 3.

FIG. 4 depicts a mind map that may represent relationships in the database of FIG. 2. There are three nodes that may represent sets of data, namely COLORS 401, MATERIALS 402 and TOOLS 406. A mind map may additionally define branches between respective nodes. Taking into account the relational database of FIG. 1 which may be defined according to the new database system in FIG. 2, there are four branches. A first branch 404 of the mind map is defined between COLORS 401 and MATERIALS 402 and may imply that a MATERIAL may have a COLOR. A second branch 404a of the mind map may be defined between COLORS 401 and MATERIALS 402 and may imply that a COLOUR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405a of the mind map may be defined between MATERIALS 402 and TOOLS 406 and may imply that a MATERIAL may be associated with a TOOL.

The concept of FIG. 1 may be further expanded in FIG. 3 to also encompass a possibility that a tool may have 409 its packaging 407 and the packaging is made of some materials 408.

In particular embodiments, because all identifiers may be generated automatically, during creation of the database system of FIG. 2 one may start from the mind map presented in FIG. 4. For each node a designer may create a name of a set and properties of the objects that may be kept in the set. Similarly, the designer may create branches as relations between respective nodes, such as data sets. Based on such mind map definition the system of FIG. 2 may be automatically generated from the mind map of FIG. 4. In particular embodiments there may additionally be a process of assigning properties to each node of the mind map wherein each property is an entry in the second data structure, such as the COLUMNS data structure.

A database structure disclosed herein can be created by a method described as follows. A computer implemented method may store data in a memory and comprises the following blocks or actions. A first data structure may be created and stored in a memory, wherein a first data structure may comprise a definition of at least one data set wherein each data set comprises a data set identifier and logically may hold data objects of the same type. Next, a second data structure may be created and stored in the memory, the second data structure may comprise definitions of properties of objects, wherein each property may comprise an identifier of the property and an identifier of a set to which the property is assigned.

Further, a third data structure may be created and stored in the memory, the third data structure comprising definitions of objects wherein each object comprises an identifier and an identifier of a set the object is assigned to. A fourth data structure is created and stored in the memory, the fourth data structure may comprise definitions of properties of each object wherein each property of an object associates a value with an object and a property of the set to which the object is assigned. Next, a fifth data structure is created and stored in the memory, the fifth data structure may comprise definitions of relations wherein each relation comprises an identifier of the relation. Finally, a sixth data structure may be created and stored in the memory, the sixth data structure comprising definitions of relations between objects wherein each objects relation associates a relation from the fifth data structure to two objects from the third data structure.

Taking into account the database system according to particular embodiments such as the embodiment of FIG. 2, a process of adding an object (a record) to the database may be outlined as follows. First a new entry is created in the OBJECTS data structure 201. The object is therefore assigned to a given data set defined by the SETS data structure 204. For each object property of the given set defined in the COLUMNS data structure 206, there is created an entry in the CHARACTERISTICS data structure 301. Subsequently there may be created relations of the new object with existing objects with the aid of the OBJECTS RELATIONS data structure.

A method of removing objects from the database system is described below. First an object to be removed may be identified and its corresponding unique identifier is fetched. Next, the object entry may be removed from the OBJECTS data structure. The object is therefore removed from a given data set defined by the SETS data structure 204. Because properties of each object are stored separately, the next step is to, for each object property of the given set defined in the COLUMNS data structure 206, there is removed an entry in the CHARACTERISTICS data structure 301 related to the object identifier being removed from the database. Subsequently there are removed any existing relations of the removed object with other existing objects with the aid of deleting entries in the OBJECTS RELATIONS data structure that related to the object being removed.

A method for creation of the database system using a mind map is described below. The first step may be to create a mind map structure. Defining a database system using a mind map may be beneficial and allows a designer to more easily see the big picture in very complex database arrangements. A designer may further gain an ability to visualize organization a database sets and relations that may exist between the respective data sets. A next step, a new node may be added to the mind map structure. This is typically executed by using graphical user interface by a database designer. A node of a mind map may represent a set as defined with reference to FIG. 2. Therefore it may be advantageous at this point to define, preferably using the graphical user interface, properties associated with the set associated with this particular node of the mind map. The next step may be executed to store a record in the first and second data structures, which are SETS data structure 204 and COLUMNS data structure 206 of FIG. 2 respectively.

The next step may be to create a branch within the mind map. A branch may start at a node of the mind map and end at the same node of the mind map to define a self-relation. For example, there may be a set of users for which there exists a hierarchy among users. Alternatively a branch may start at a node of the mind map and end at a different node, for example, of the mind map to define a relation between different nodes i.e., different sets of objects of the same kind.

The following step may be executed to store a record in the fifth data structure, which is RELATIONS data structure 305 of FIG. 3. The last step is to add at least one object to existing data sets i.e., nodes of the mind map. In some embodiments, a way of adding objects to mind map nodes may be by way of a graphical user interface with one or more graphical elements representing nodes and connections among the nodes. For example by choosing an option to add an object a user may be presented with a set of properties that may be set for the new object. The properties may be defined in the COLUMNS data structure 206 of FIG. 2. After the user provides an input, an object is added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 2 and 3 respectively.

Databases of the present disclosure may store data objects in a non-hierarchical manner. In some cases, such databases may enable database queries to be performed without the need of joins, such as inner or outer joins, which may be resource intensive. This may advantageously improve database queries.

Visualized Databases and Queries

The technologies disclosed herein may include a use of data objects. A data object stored in a data structure may be linked with another data object in the same data structure or in another data structure. However, the two data objects may be related to a single abstract class. For example, an enterprise may have multiple clients, and each client may have an identifier, a purchased product, and billing information. In a database, a client identifier and a purchased product may be placed together in a structure of a sale, but a client identifier and billing information may be organized into a structure of finance. However, an abstract class representing a client may aggregate an identifier, a purchased product, and billing information.

Figure 5:
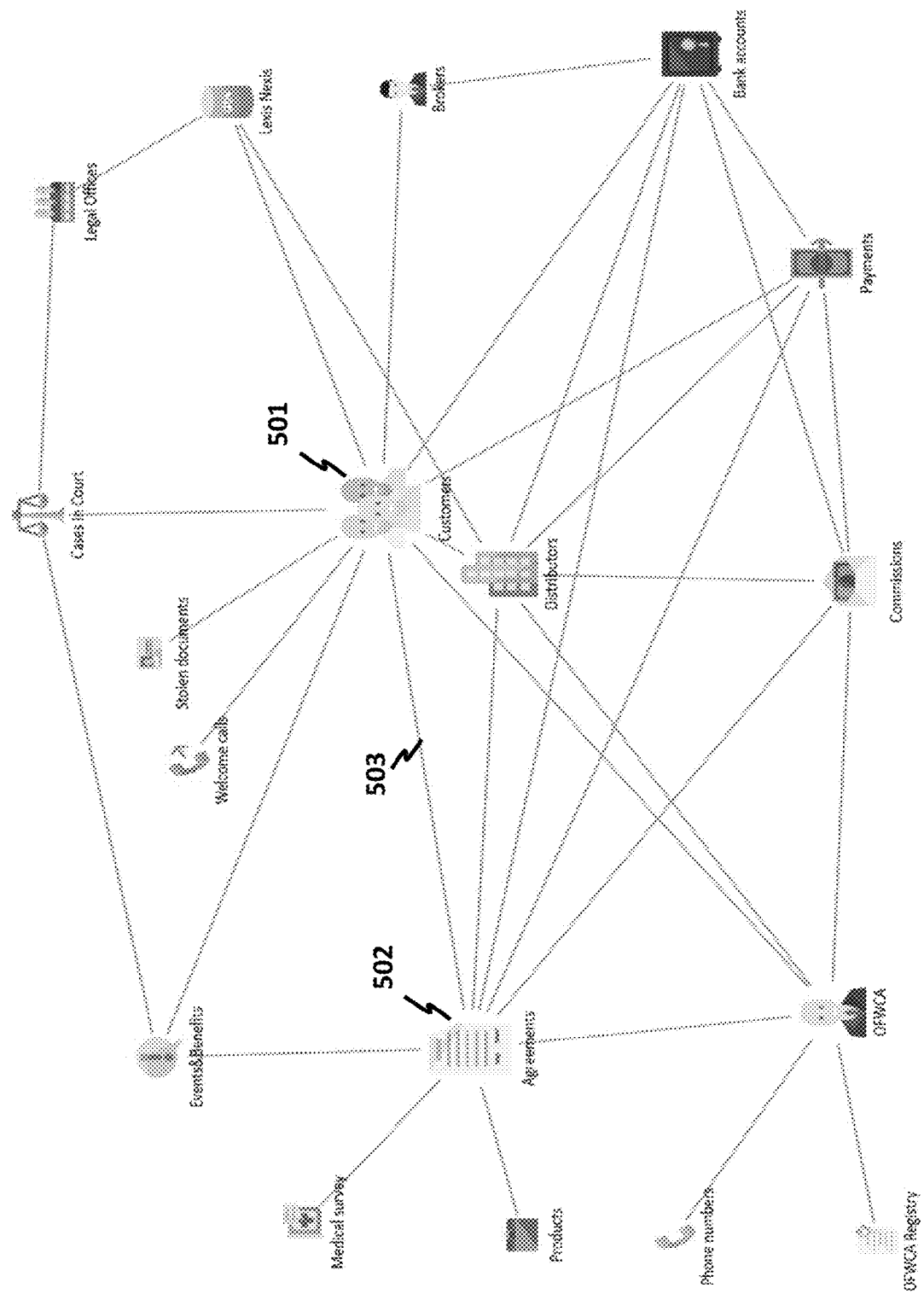
FIG. 5 depicts an example visualized graph representing a database.

FIG. 5 shows an example visualized database of a business environment, where each class (e.g., business class) is visualized as a graph node. Examples of an abstract class include, but not limited to, a customer 501, a welcome call, a distributor, a commission, a payment, a bank account, a broker, a legal office, a case in court, a stolen document, an event, a benefit, an agreement 502, a medical survey, a product, and a phone number. Further, visualized business classes may be linked. A link (for instance, link 503 between customers 501 and agreements 502) may be a representation of a link of underlying data objects. In some applications, a link means a JOIN in a database. In some cases, a visualized link may comprise an assigned link type; in other words, a link may be further associated with a meaning beyond merely a join.

A merit of visualized graph may allow a user to see a big picture of aggregated data objects in terms of abstract classes without going into details of data objects.

Figure 6:
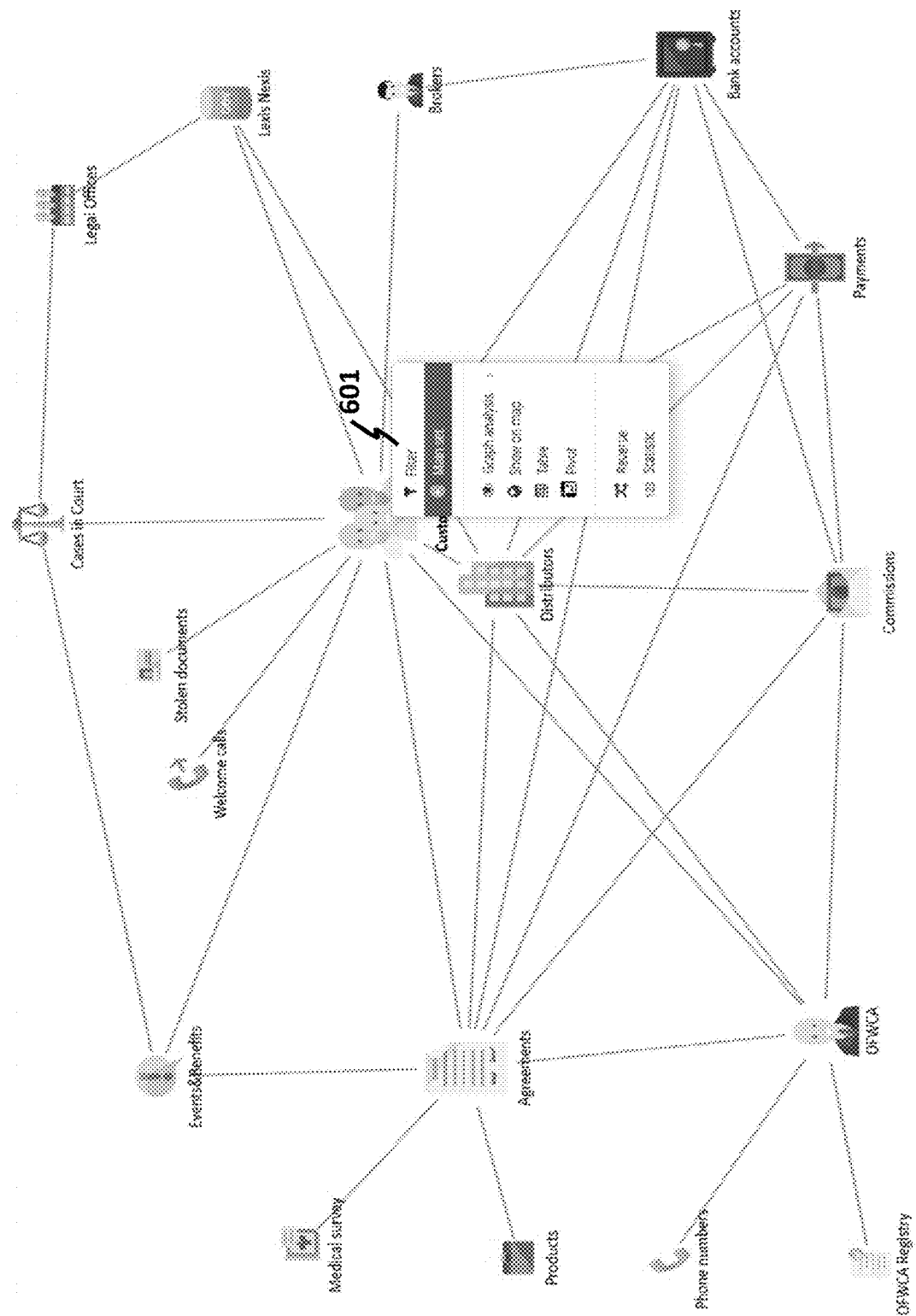
FIG. 6 depicts an example visualized graph allowing a user to click on an abstract class to perform data query.

Referring to FIG. 6, a mind map or a visualized graph of business classes can allow a user to click on a business class, and the clicked business class may be designated as a main class in a query. When clicking a business class, a drop-down menu 601 may be displayed. Options of a drop-down menu may comprise associated query operations, such as filter, main setting, graph analysis, show on map, a table, a pivot, a reverse, and a statistic. A filter may be chosen on the menu to select one or more desired objects in an abstract class. A setting may allow a perspective to be placed into the abstract class; a perspective may be a portion of data of the business class. In some designs, a setting may allow a specific object to be shown on a clicked class.

Figure 7:
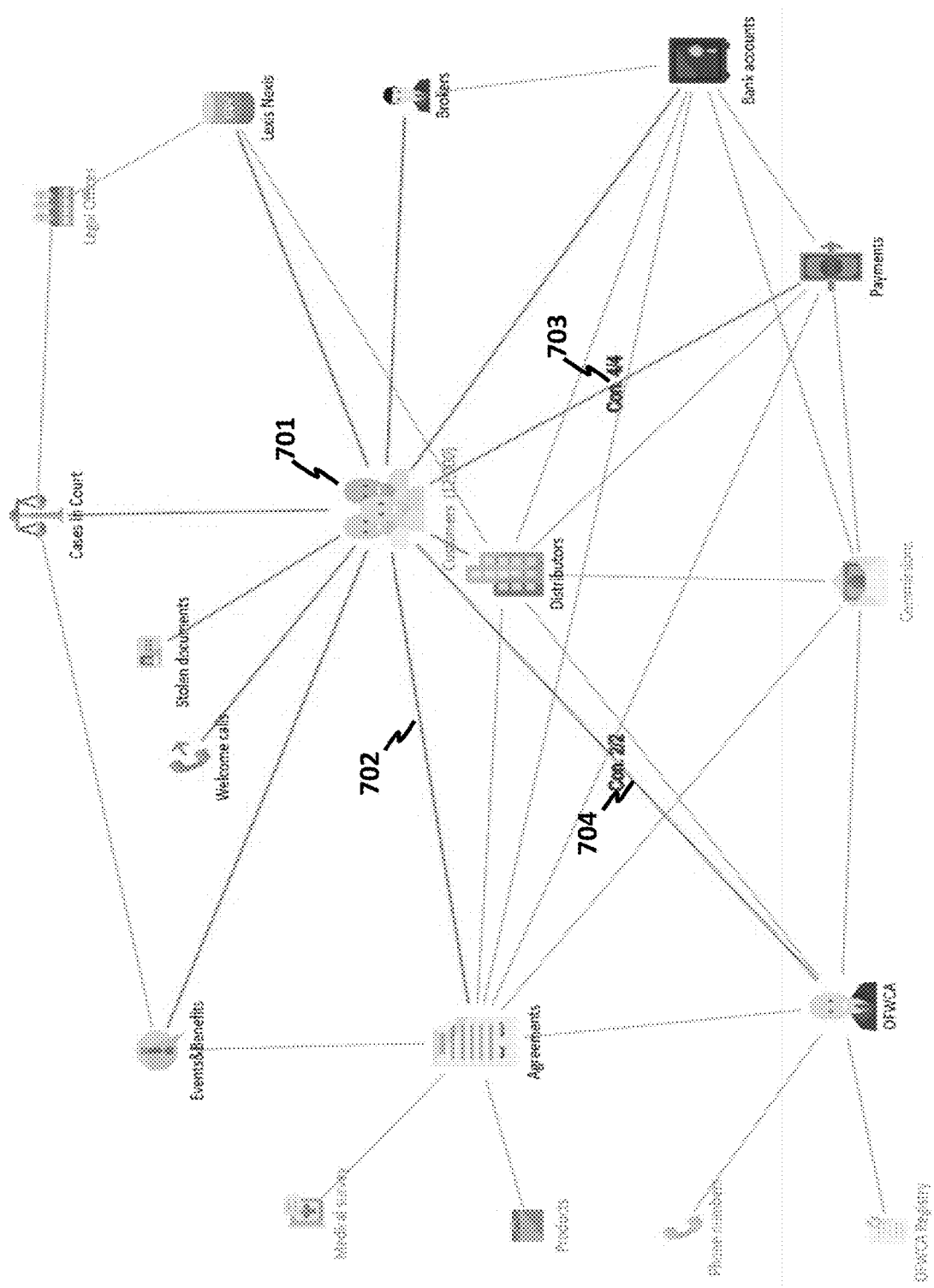
FIG. 7 depicts an example visualized graph with respect to a perspective.

Referring to FIG. 7, when a perspective is set, associated data may be shown. In some designs, the graph visualization may be changed accordingly. For instance, when a business class CUSTOMERS 701 is clicked, a user sets its perspective to be the number of customers. Further, a link (e.g., link 702) is changed to another line style (e.g., bolded or thicker line width) or color (e.g., different color from link without direct association with the clicked class) to emphasize what kind of data operations a user may perform, and what other business classes may have a direct association with the clicked business class.

Referring again to FIG. 7, a property of a changed link may be displayed. For example, a link 703 between CUSTOMERS and PAYMENTS may show 4/4, which means there are four link types between CUSTOMERS and PAYMENTS, and a link 704 between CUSTOMERS and OFWCA may show 2/2, which may indicate that there are two link types between CUSTOMERS and OFWCA. Also the links with direct association with CUSTOMERS may change their line styles and colors, as indicated by the thicker lines 703 and 704.

Figure 8:
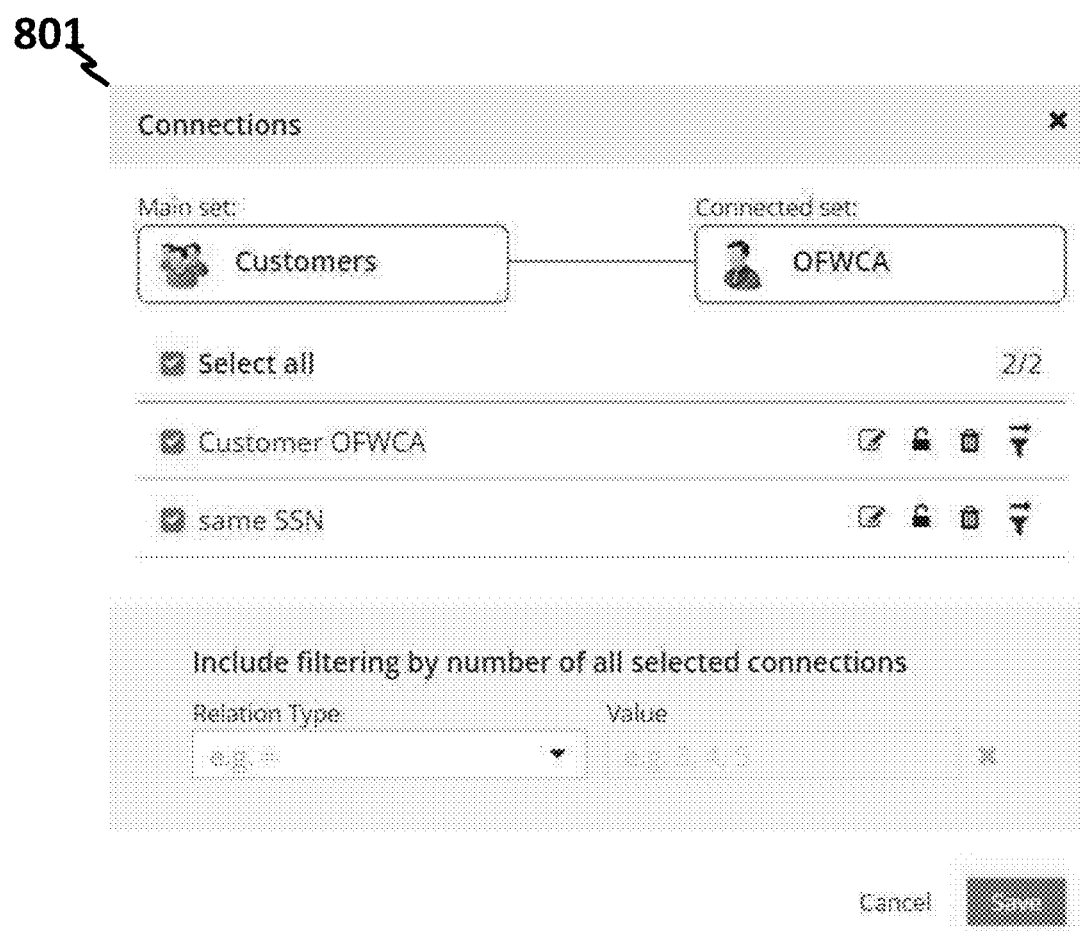
FIG. 8 depicts an example pop-up menu when a link between two data objects in FIG. 7 is tapped.

Further, when clicking on a link, details of link types can be visualized. Referring to FIG. 8, a menu 801 is shown when, for example, a link 704 between CUSTOMERS and an insurance agent (also may be referred to herein as "OFWCA") in FIG. 7 is tapped or clicked. Options in the menu may show properties of the connection, and allow a user to look into details of the connection.

Query and Processing

Figure 9:
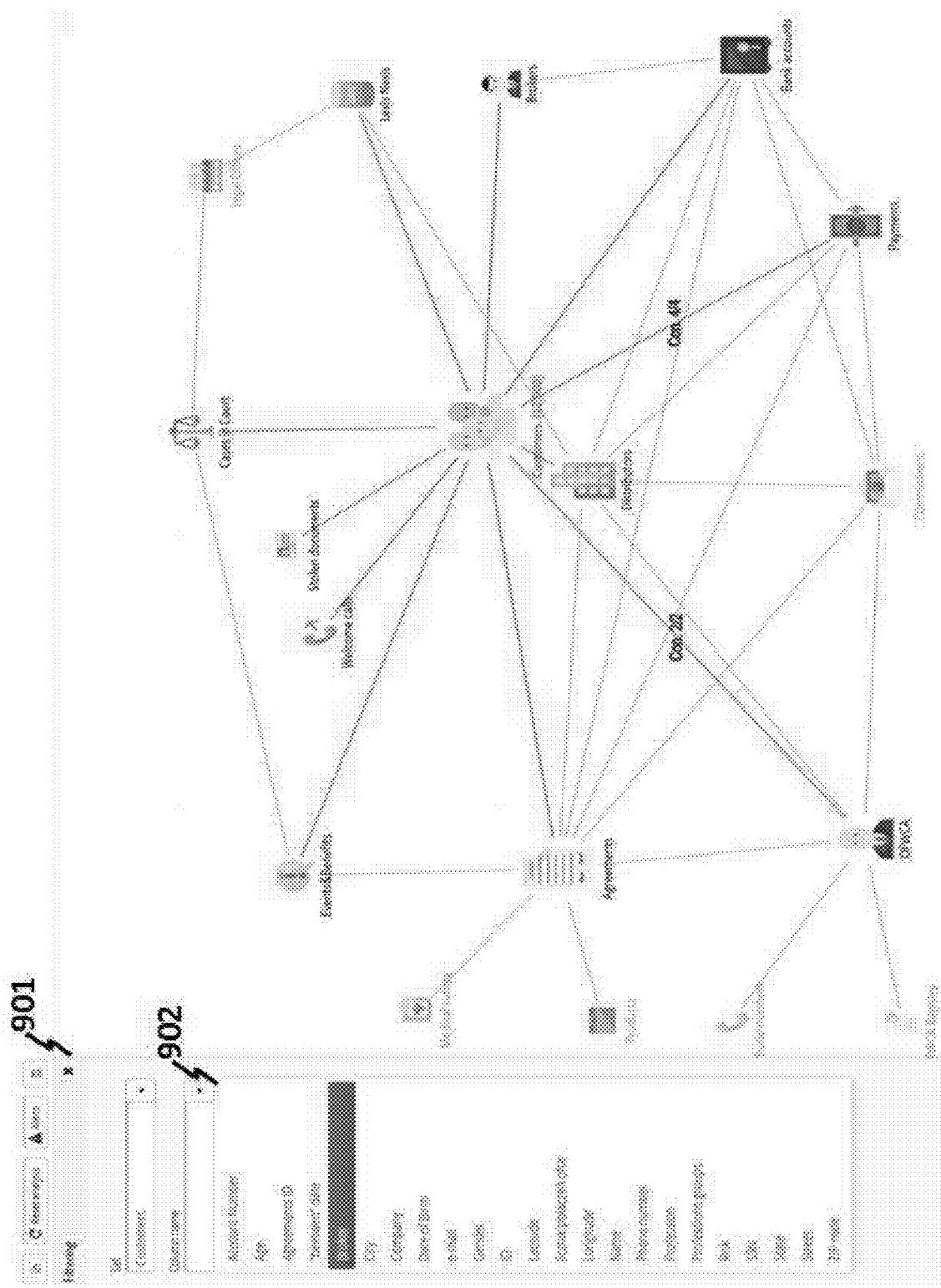
FIG. 9 depicts an example visualized graph with possible filtering criteria.

The technologies disclosed herein may allow a user to perform queries on a business class based on a visualized graph. Referring again to FIG. 6, when a class is selected (e.g., a business class) or is clicked, a drop-down menu associated with the class is shown. Choosing the "filter" option on the menu 601 may allow a user to perform a query. Referring to FIG. 9, filtering 901 can be performed on connected business classes of a clicked class; in this case, the class of CUSTOMERS is clicked, and a list 902 of data attributes of CUSTOMERS can be shown along with the graph. Examples of data attributes of CUSTOMERS class include, but not limited to, account number, age, agreements ID, between date, broker, city, company, date of birth, e-mail, gender, ID, latitude, longitude, name, phone number, profession, professions groups, risk, social security number, state, street, and zip code.

Figure 10:
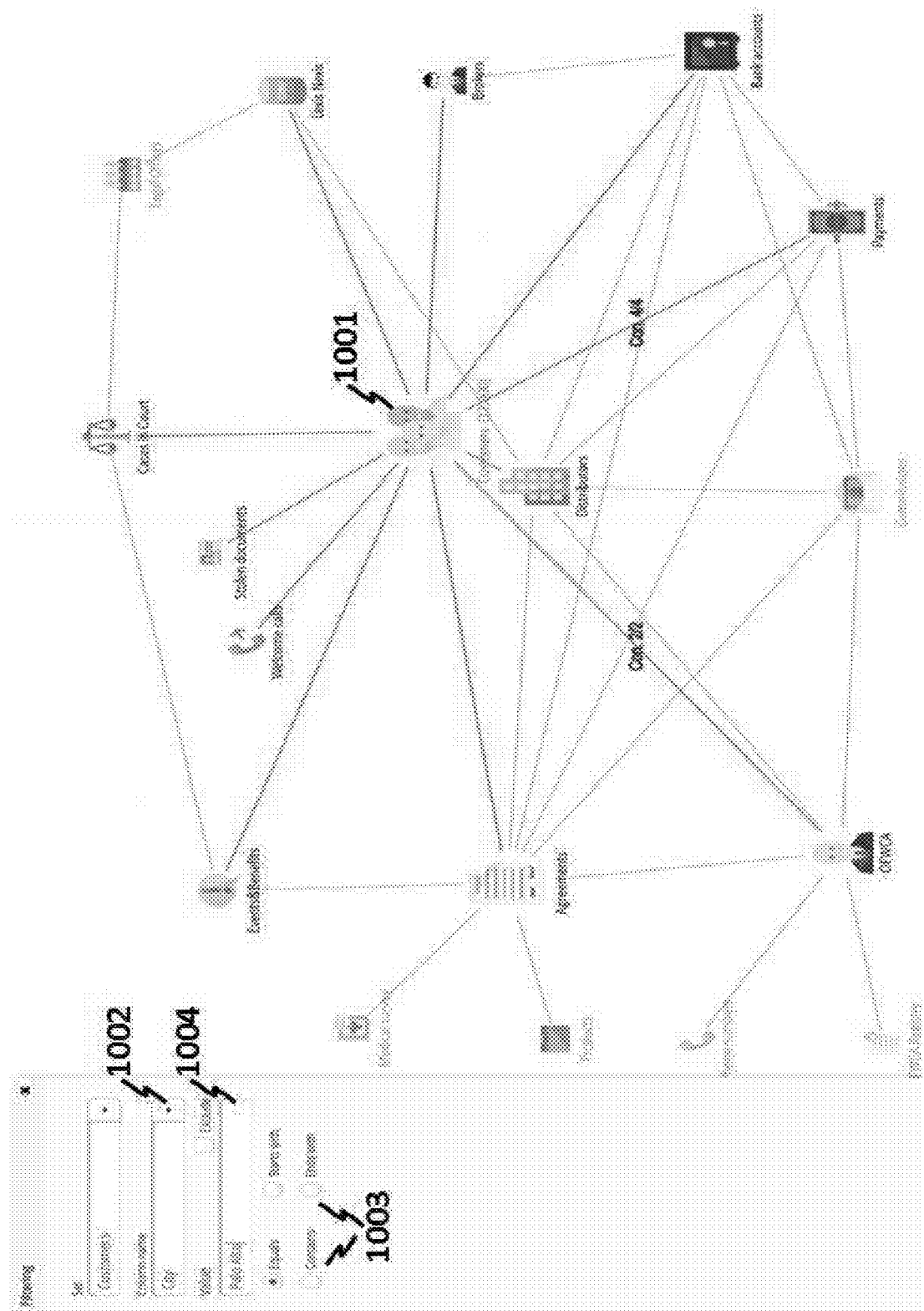
FIG. 10 depicts an example visualized graph where a class is selected and further an attribute of the class is selected.
Figure 11:
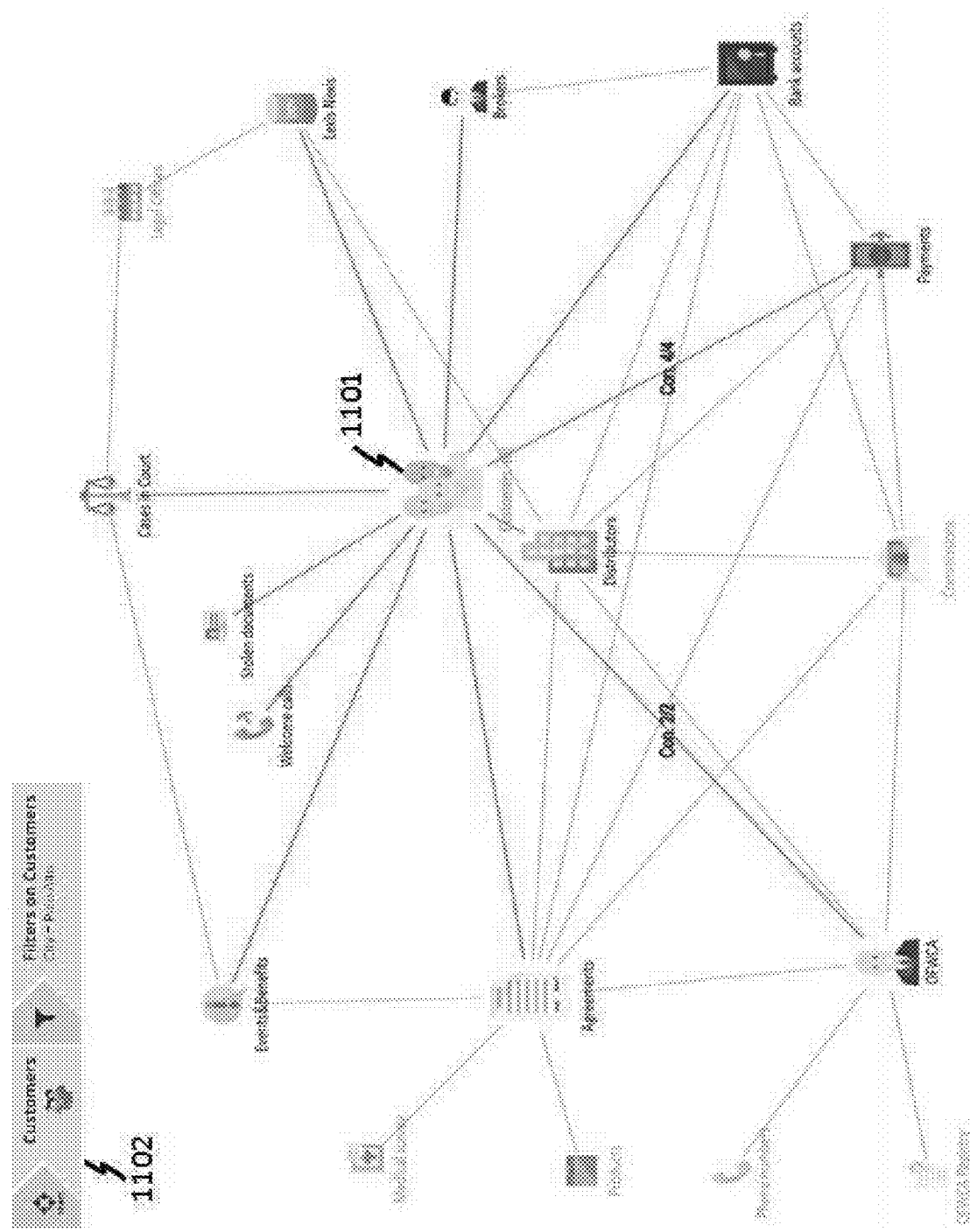
FIG. 11 depicts an example visualized graph resulting from a query on a city attribute.

Filtering on specific data attributes can be performed on a visualized graph or a mind map. When a list of data attributes is shown, a user is allowed to query one or more of the data attributes. Referring to FIG. 10, when CUSTOMERS class 1001 is selected and further a city attribute 1002 is selected, subsequently possible queries, including logic operations 1003, may be displayed. For example, a user may set the city equals to Palo Alto. Once a query is performed, corresponding perspective of the business class can be shown. FIG. 11 shows a query result of Palo Alto, where no customer 1101 (as indicated by the number in the parenthesis) is found. Further, history 1102 of queries can be shown on the user interface as well.

Figure 12:
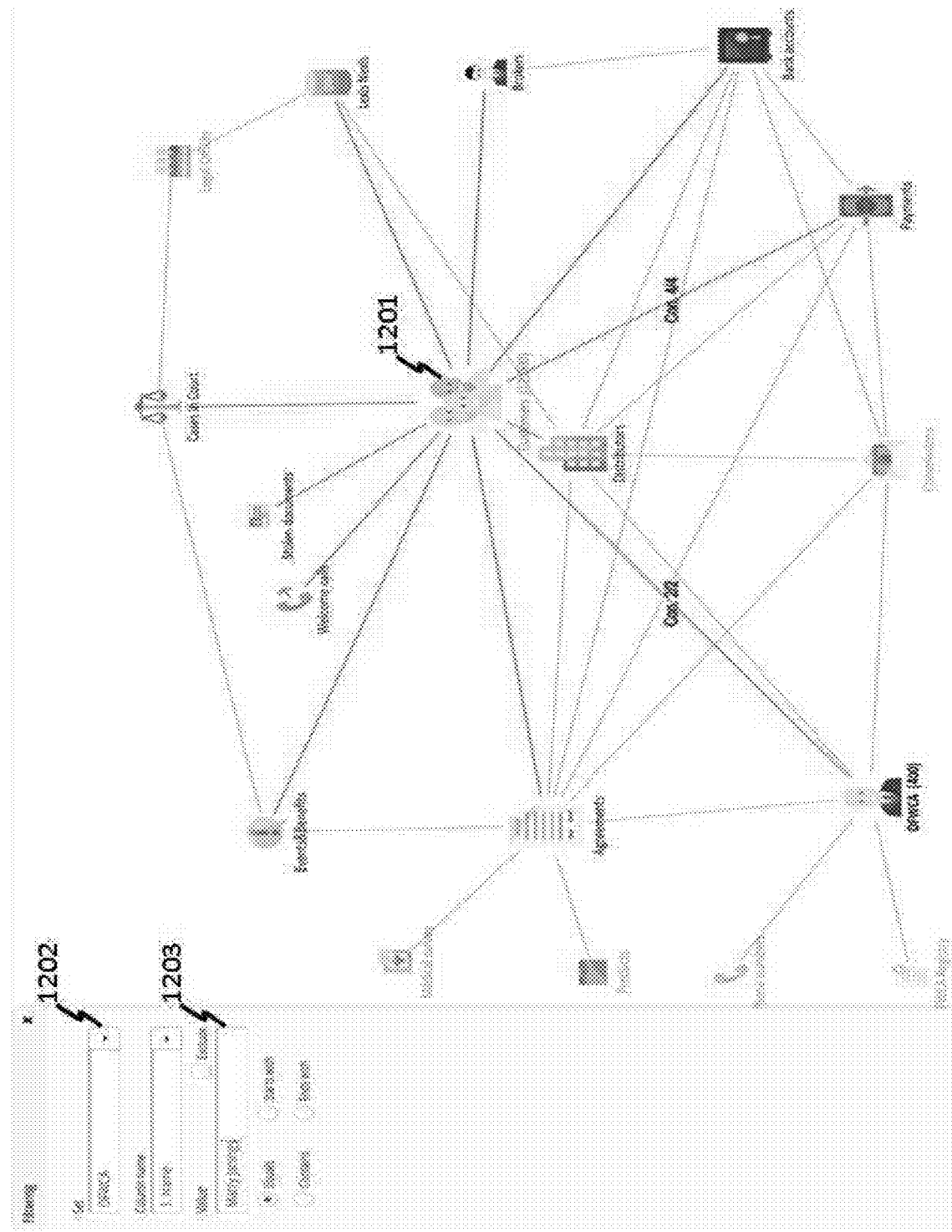
FIG. 12 depicts an example visualized graph where a class has been selected as a main class.
Figure 13:
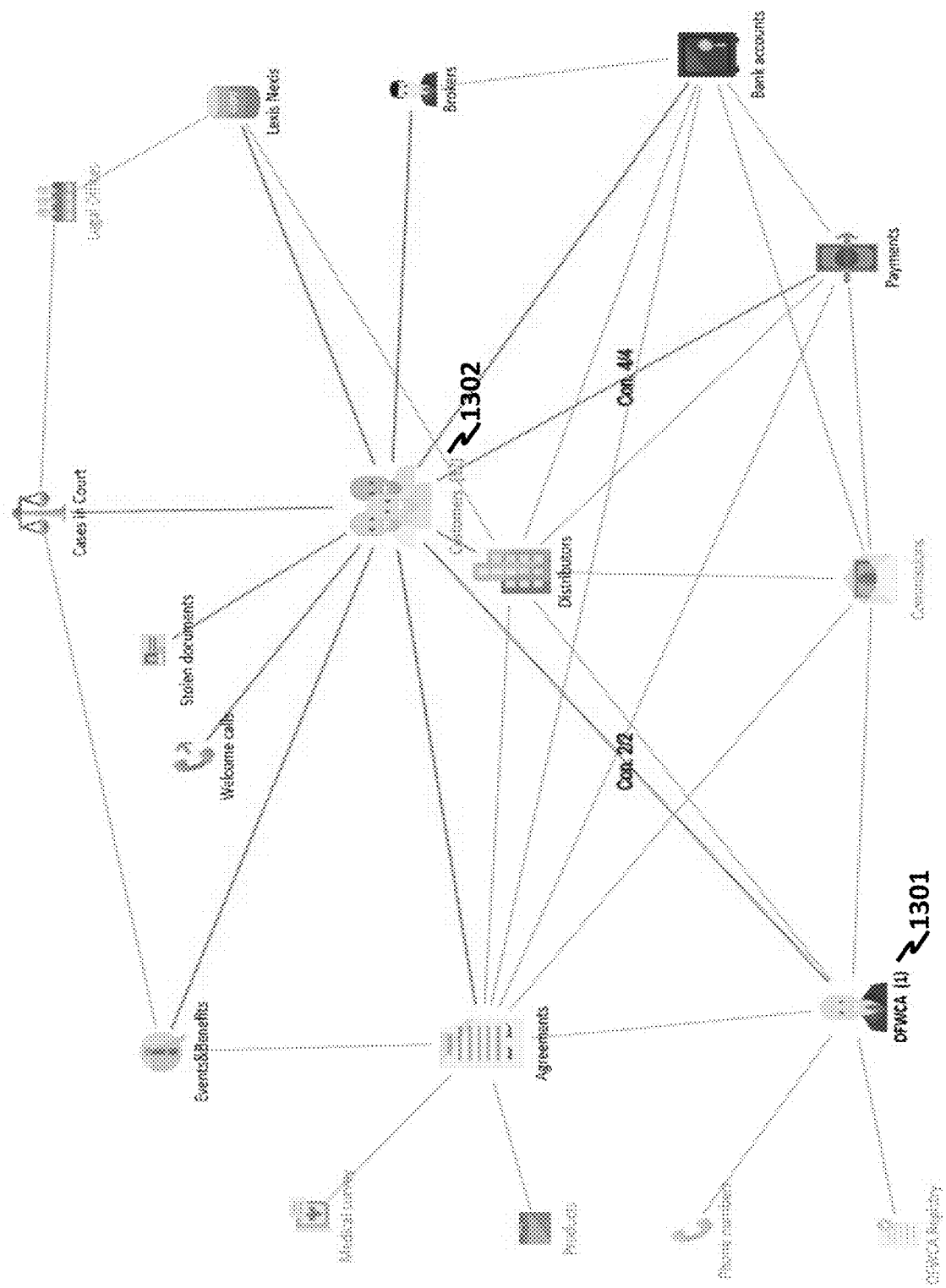
FIG. 13 depicts an example visualized graph where results of a filtering operation to a main class is shown.

In some cases, setting can be performed on a business class connected to a main class. FIG. 12 shows an example where CUSTOMERS class 1201 has been selected as a main class, but a user is allowed to set up OFWCA class 1202. In addition, a query, contingent on a main class, can be performed on a non-main class. In the example of FIG. 12, query on OFWCA equal to Marry Janings 1203 is performed; the result of the query is shown in FIG. 13, where one OFWCA 1301 is found and twelve customers 1302 are found.

Figure 14:
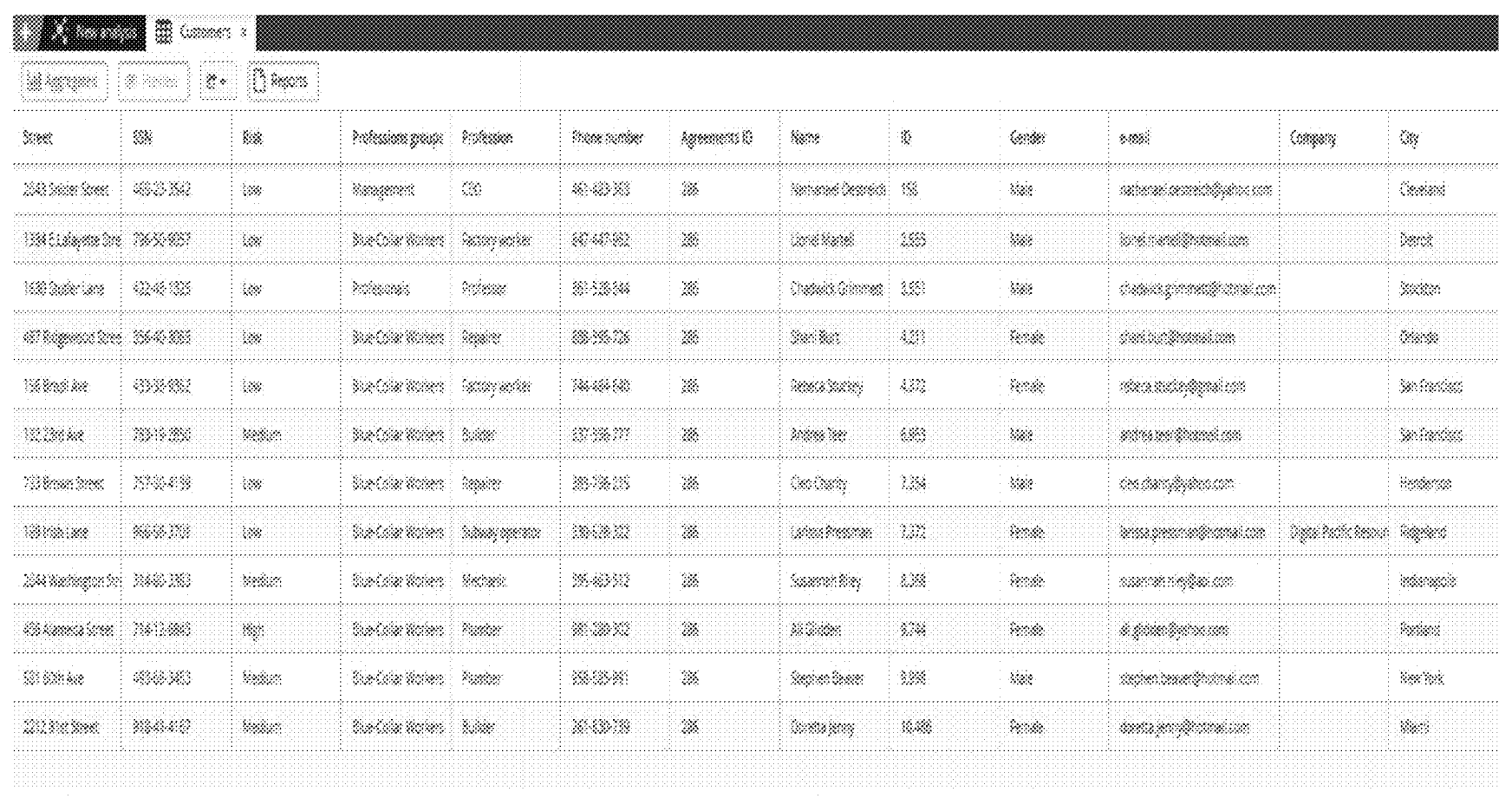

With a visualization tool developed herein, query is performed on a visualized graph. Further, queried data can be displayed by selecting a "table" option in a drop-down menu of a business class. A table view of data objects in the results of FIG. 13 can be shown in FIG. 14, where a table may show a summary of query strings and detailed data. In this example, rows are data objects of the CUSTOMERS class, columns are filtered data attributes of the customer class.

Figure 15:
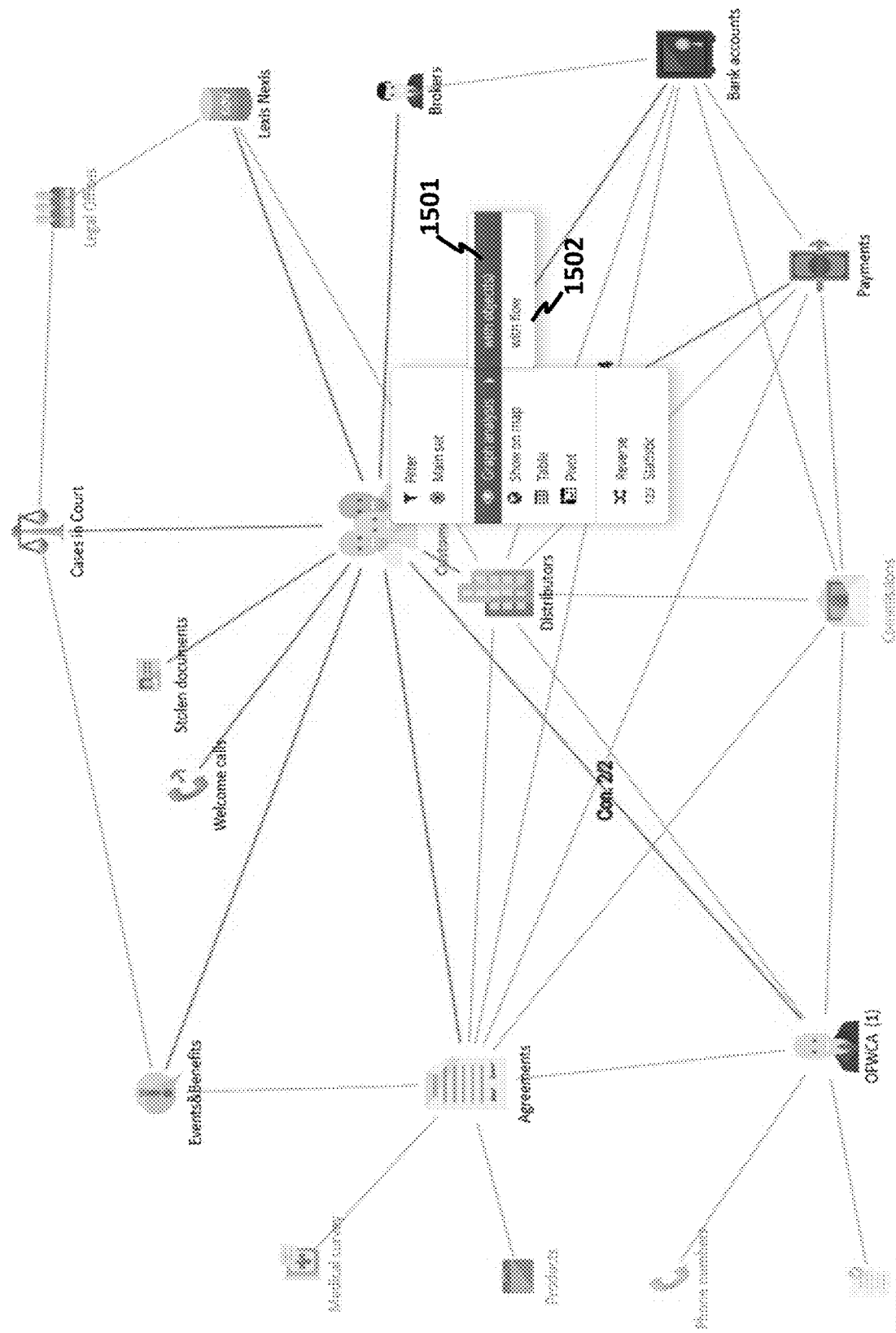
FIG. 15 depicts an example visualized graph where a user can choose an option of link chart analysis.

The technologies disclosed herein may let a user perform analysis on queried result. In FIG. 15, options of analysis can be made with objects 1501 or with flow 1502. An analysis with objects may include a change in link colors or styles, and a node may be a data object or a shared attribute, for example. An analysis with flow may show another visualized figure with arrows flowing from a business class object to another, wherein the width of an arrow may indicate aggregate values from connected objects. A flow analysis may be visualized by a plurality of linked nodes (further described in FIG. 57).

Figure 16:
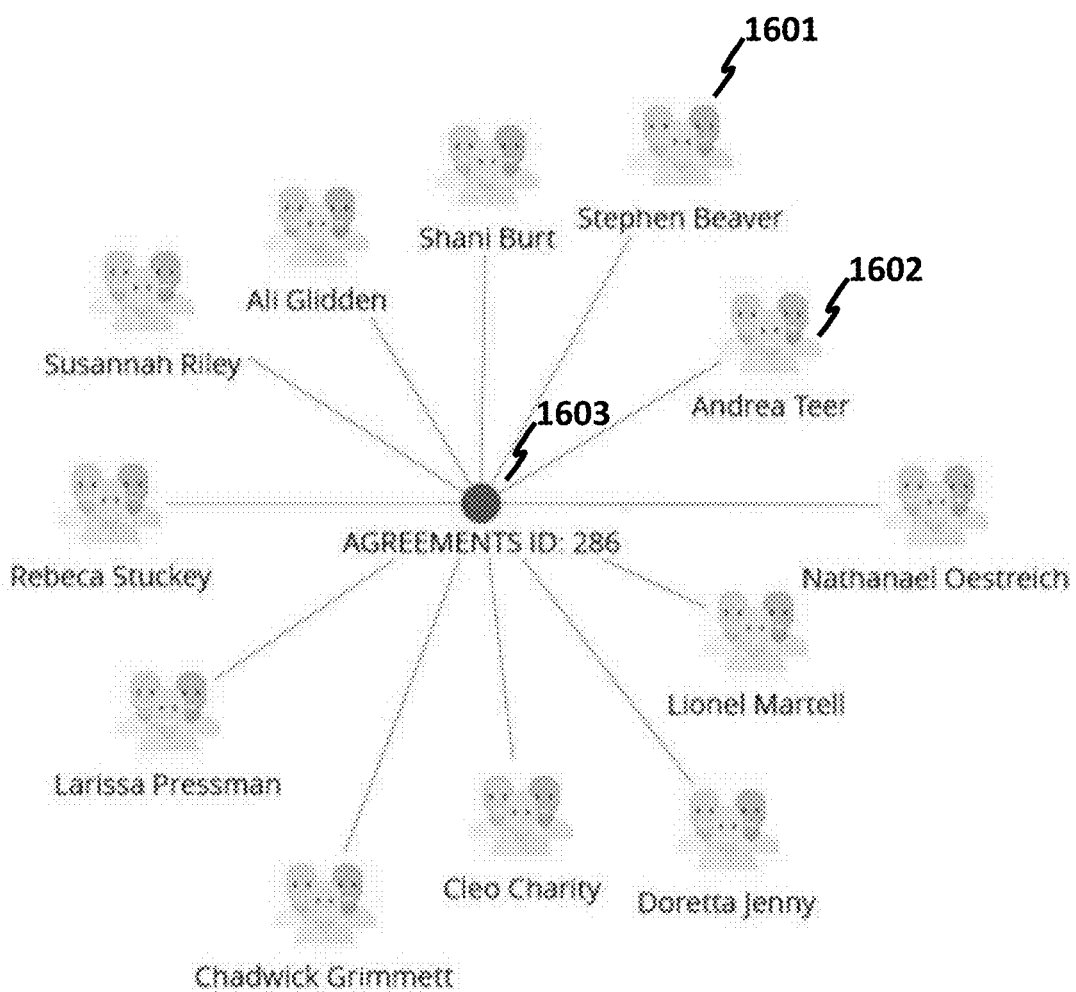
FIG. 16 shows an example graph based on a link chart analysis, where twelve customers from the data shown in FIG. 15 are visualized as nodes, and a central node is a shared attribute.

FIG. 16 shows a graph with object analysis, where twelve customers (e.g., Stephen Beaver 1601, Andrea Teer 1602, etc.) from the data shown in FIG. 15 are visualized as nodes, and a central node "AGREEMENT ID" 1603 is a shared attribute, which means that all the objects in the link chart share the same AGREEMEND ID.

Figure 17:
FIG. 17 shows an example graph based on a link chart analysis, where twelve customers are found in a query result, but do not share an attribute in the query.

FIG. 17 shows another object graph. In this example, twelve customers are found in a query result, but do not share an attribute in the query. Thus, the graph in FIG. 17 does not have any link.

Figure 18:
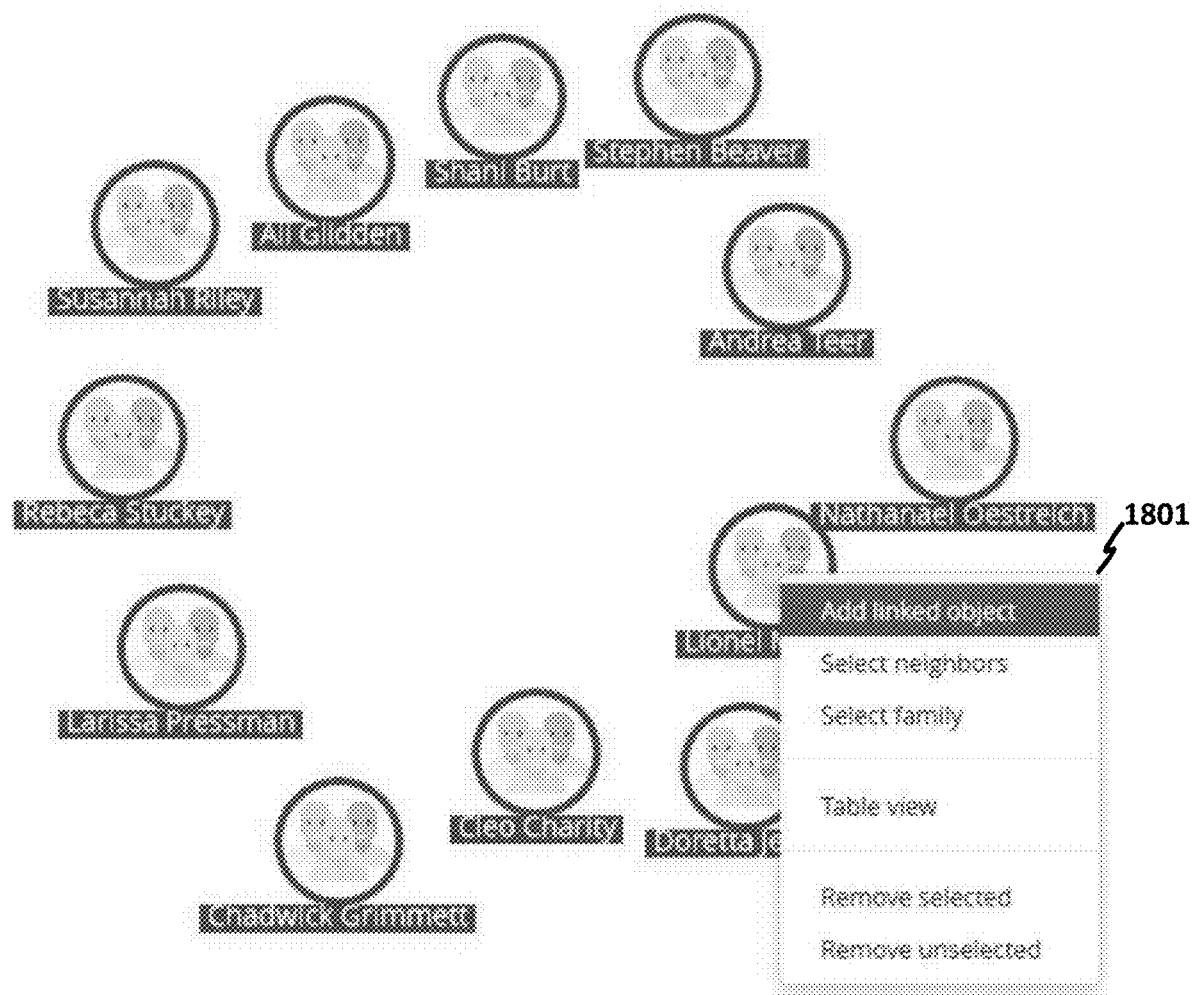
FIG. 18 shows an example user interface allowing a user to select a data object in a link chart analysis.
Figure 19:
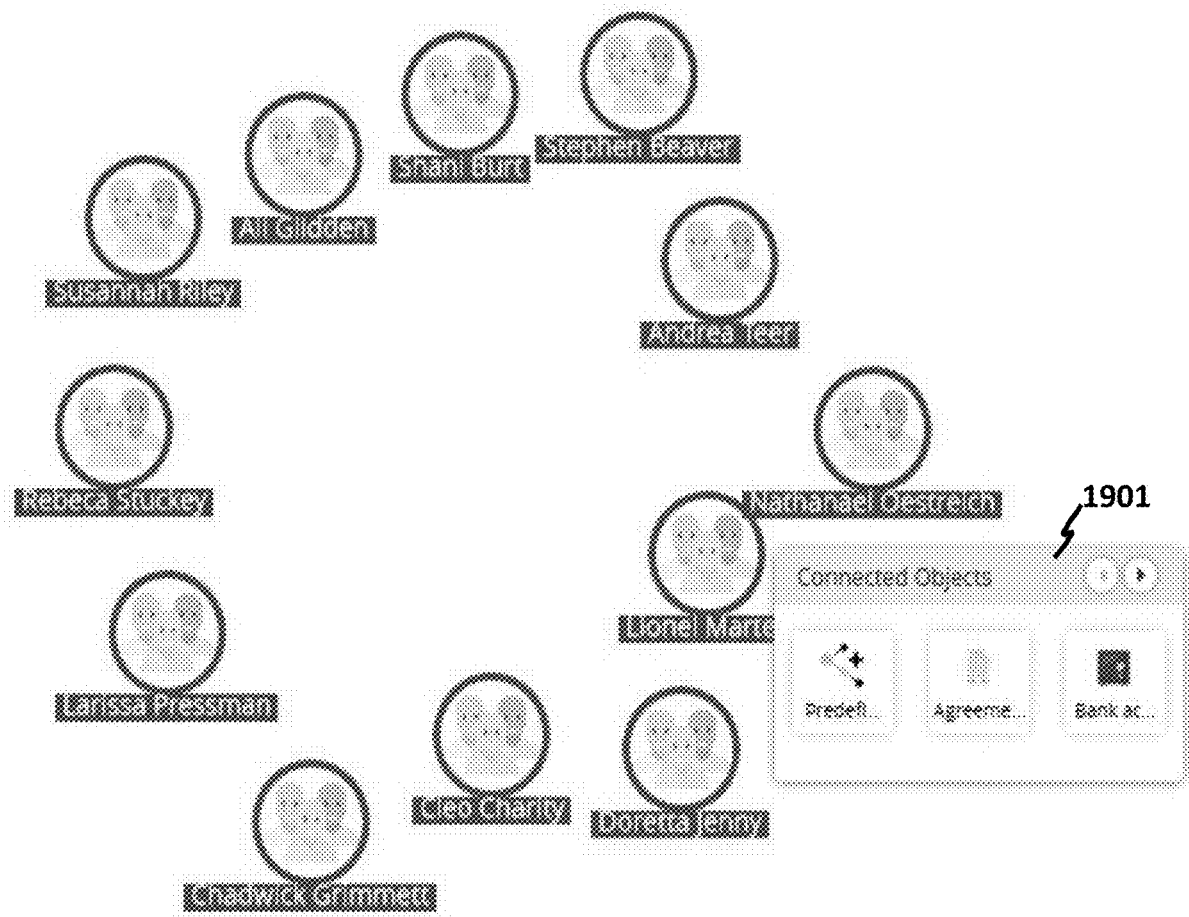
FIG. 19 shows an example user interface allowing a user to add selected abstract classes.
Figure 20:
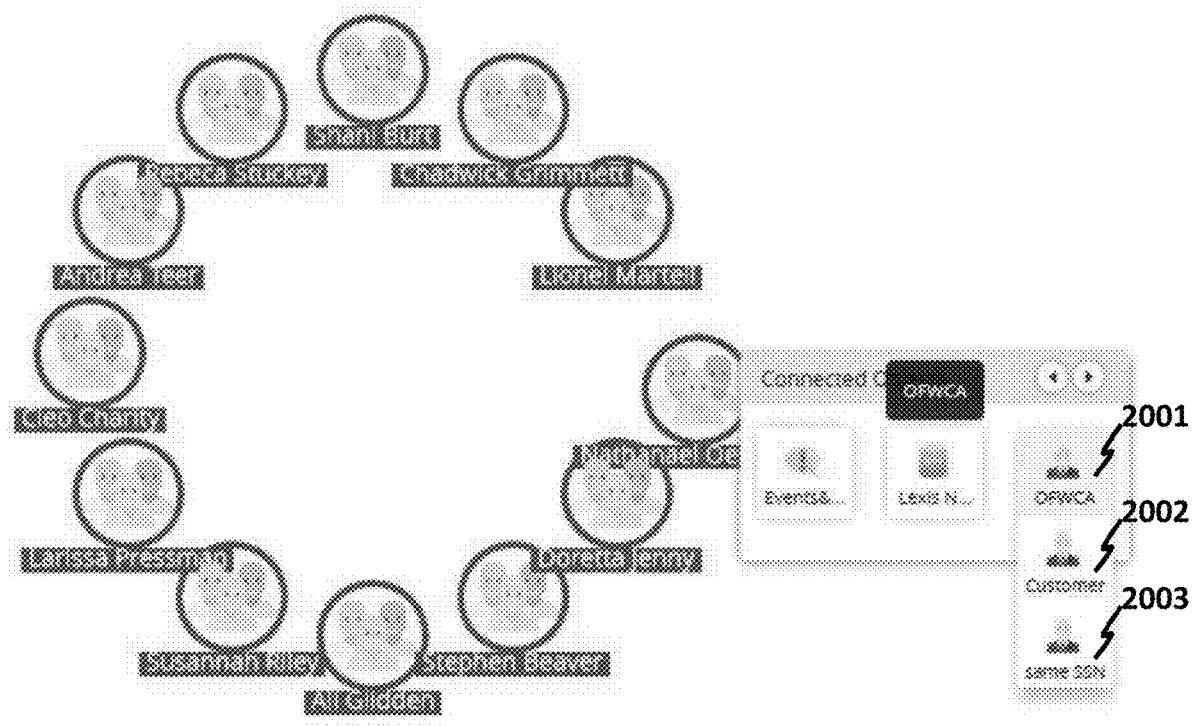
FIG. 20 shows an example user interface allowing a user to select a link type using which additional objects should be presented on the link chart.
Figure 21:
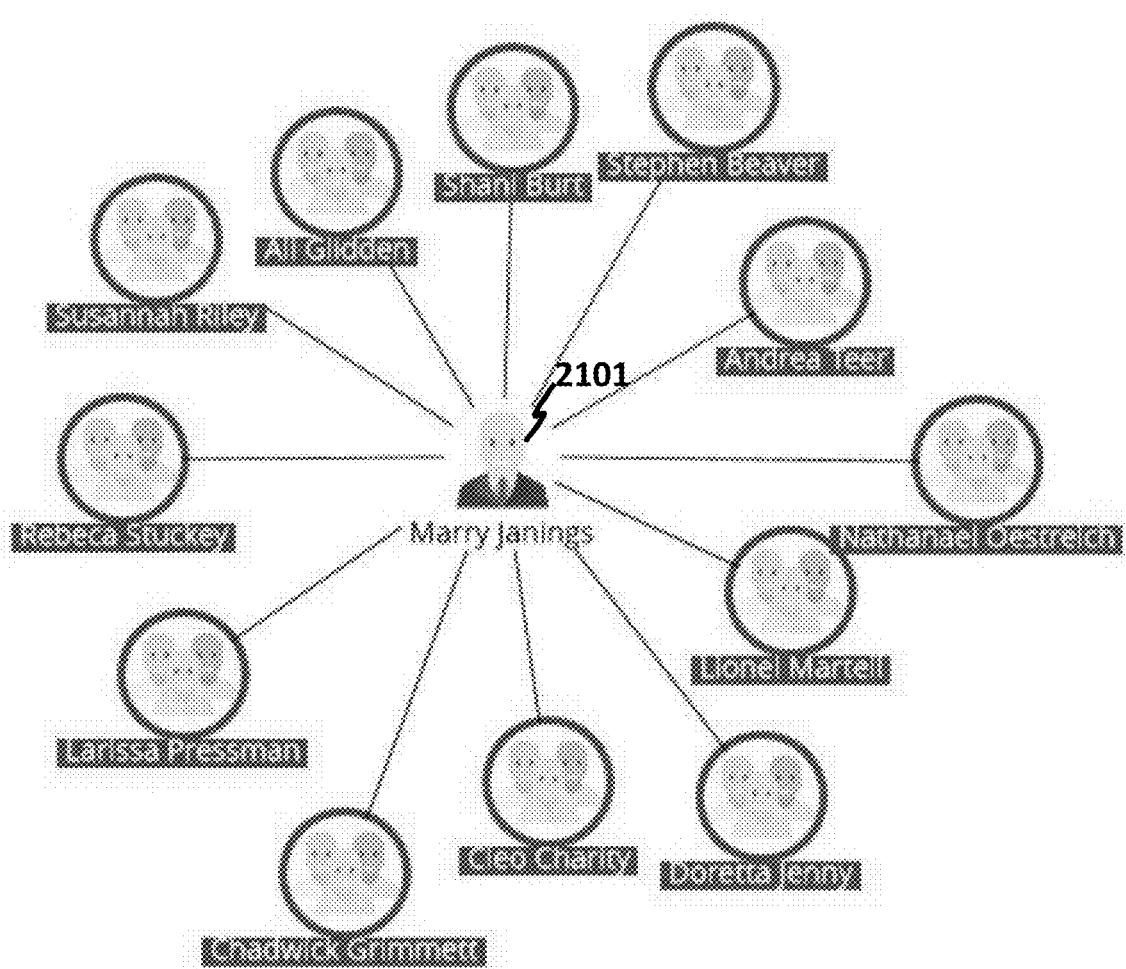
FIG. 21 shows an example graph resulting from combining a class with other class links.
Figure 22:
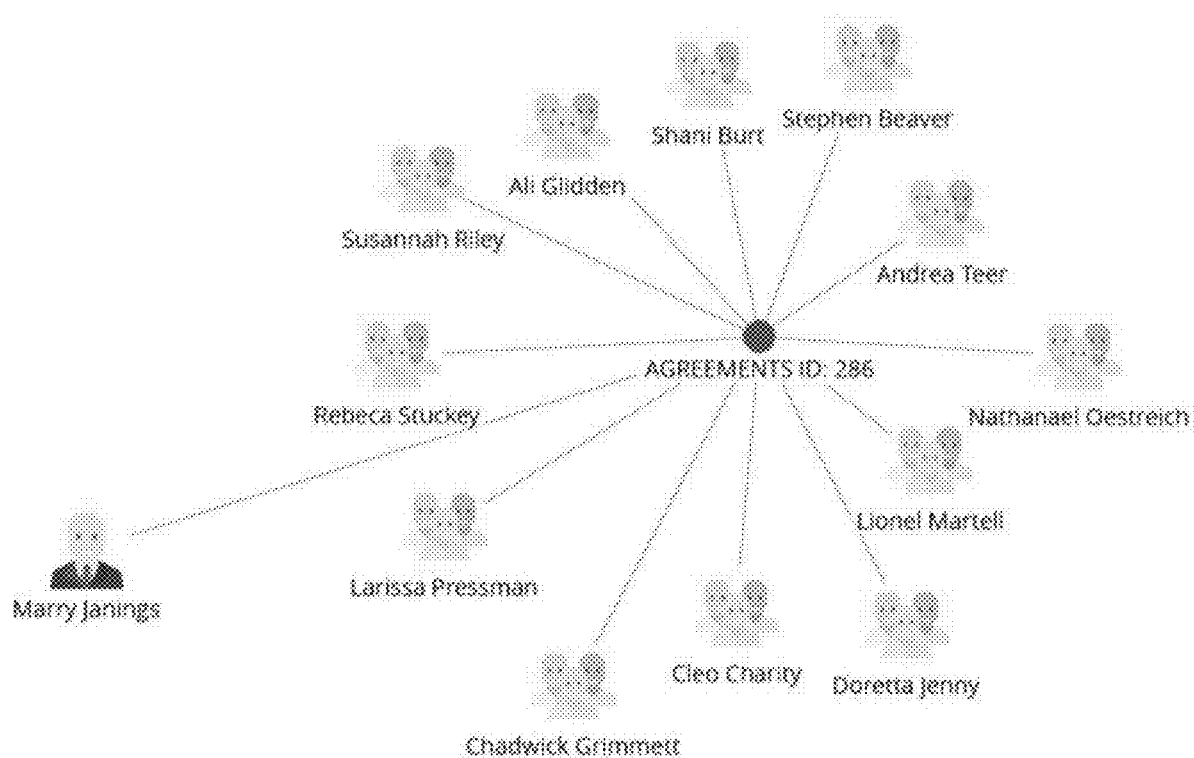
FIG. 22 shows another view of the graph in FIG. 21.
Figure 23:
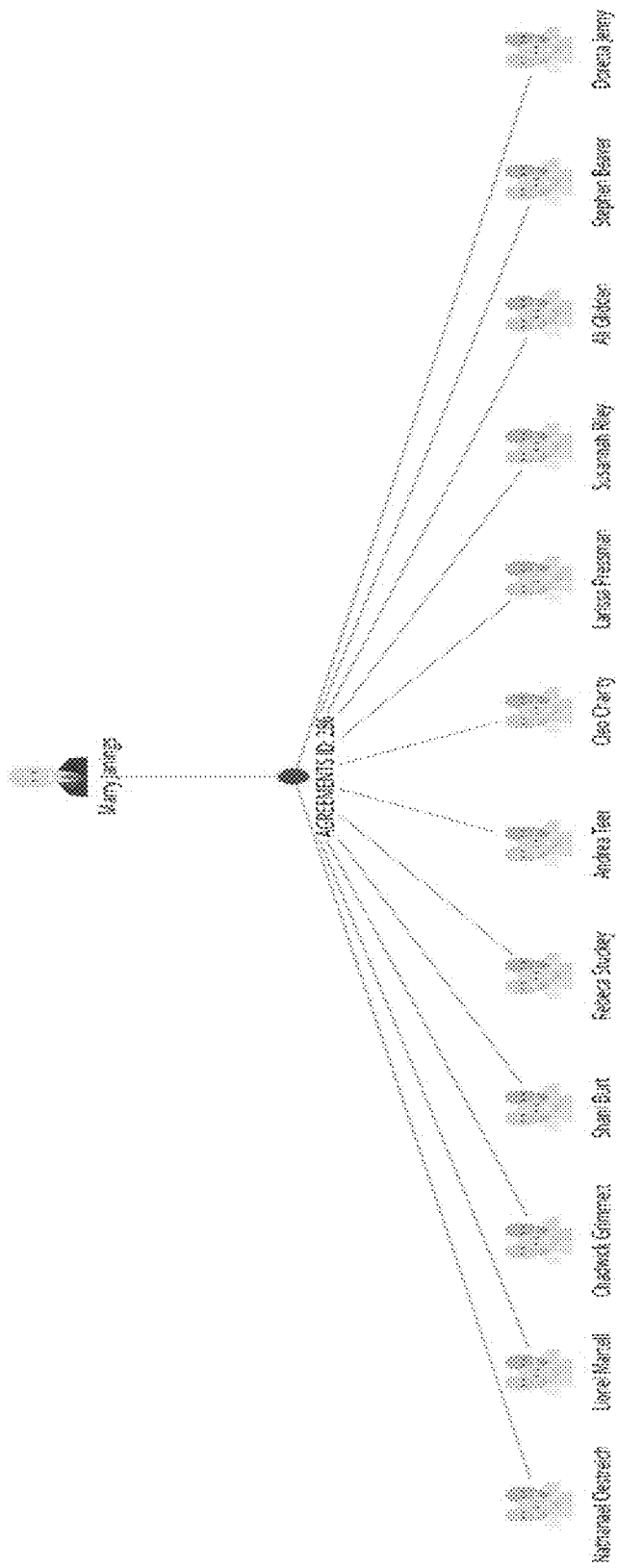
FIG. 23 shows a top hierarchical view of the graph in FIG. 22.
Figure 24:
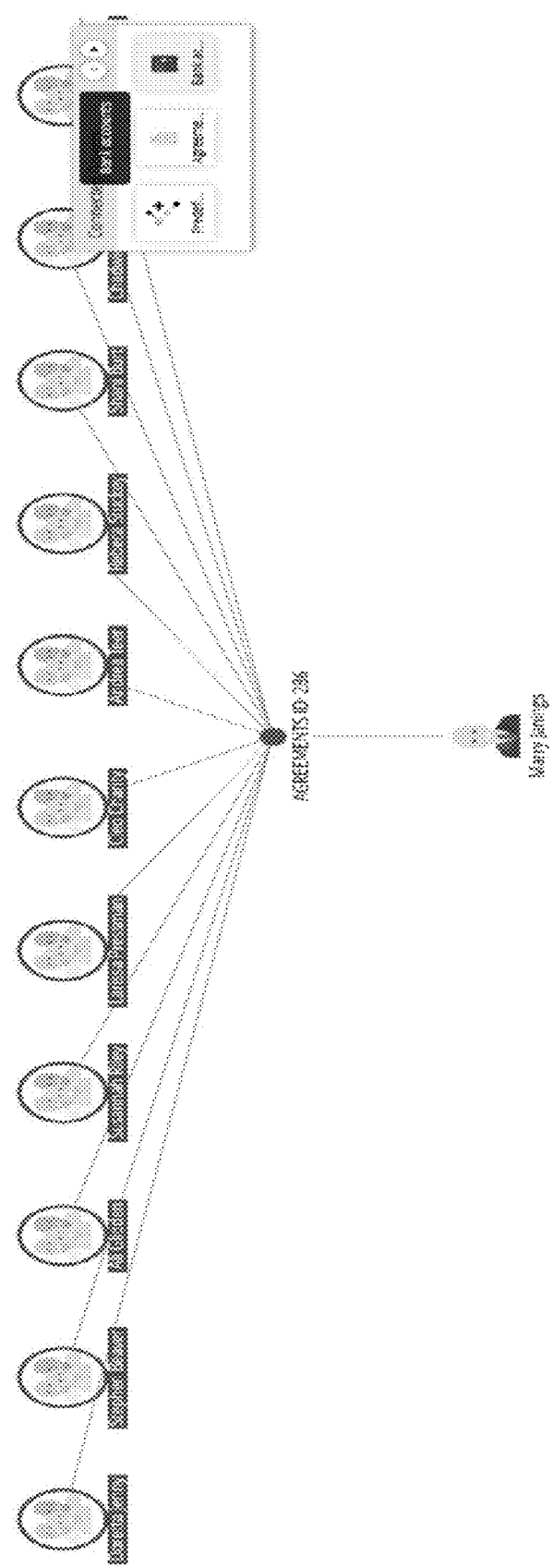
FIG. 24 shows a bottom hierarchical view of the graph in FIG. 22.

In some cases, referring to FIG. 18, the system may allow a user to select a data object in a flow analysis graph or object analysis graph and/or add another linked object. For instance, a menu 1801 is shown and allows a user to select one or more of the following analyses: Add linked object, Select neighbors, Select family, Table view, Remove selected, and Remove unselected. Further, FIG. 19 shows an example interface 1901 to allow a user to select from which business classes objects should be added. In addition, when a business class is selected, specific link types can be selected. In FIG. 20, an OFWCA class 2001 is selected, and its possible attributes, such as customer 2002 and same SSN 2003, are listed for a user to choose. In this example, a user chooses a customer with the same SSN as an OFWCA, and FIG. 21 shows the result, where the system identifies Marry Janings 2101 and adds it as a central node to the graph. When combining more shared attributes, another graph can be generated. Following the same example in FIG. 21, combining CUSTOMERS with OFWCA and AGREEMENT ID produces another graph in FIG. 22. Moreover, another view of the same graph can be shown, such as hierarchy diagrams in FIG. 23 and FIG. 24.

Figure 25:
FIG. 25 shows an example where a class of bank accounts is added to a link chart analysis.
Figure 26:
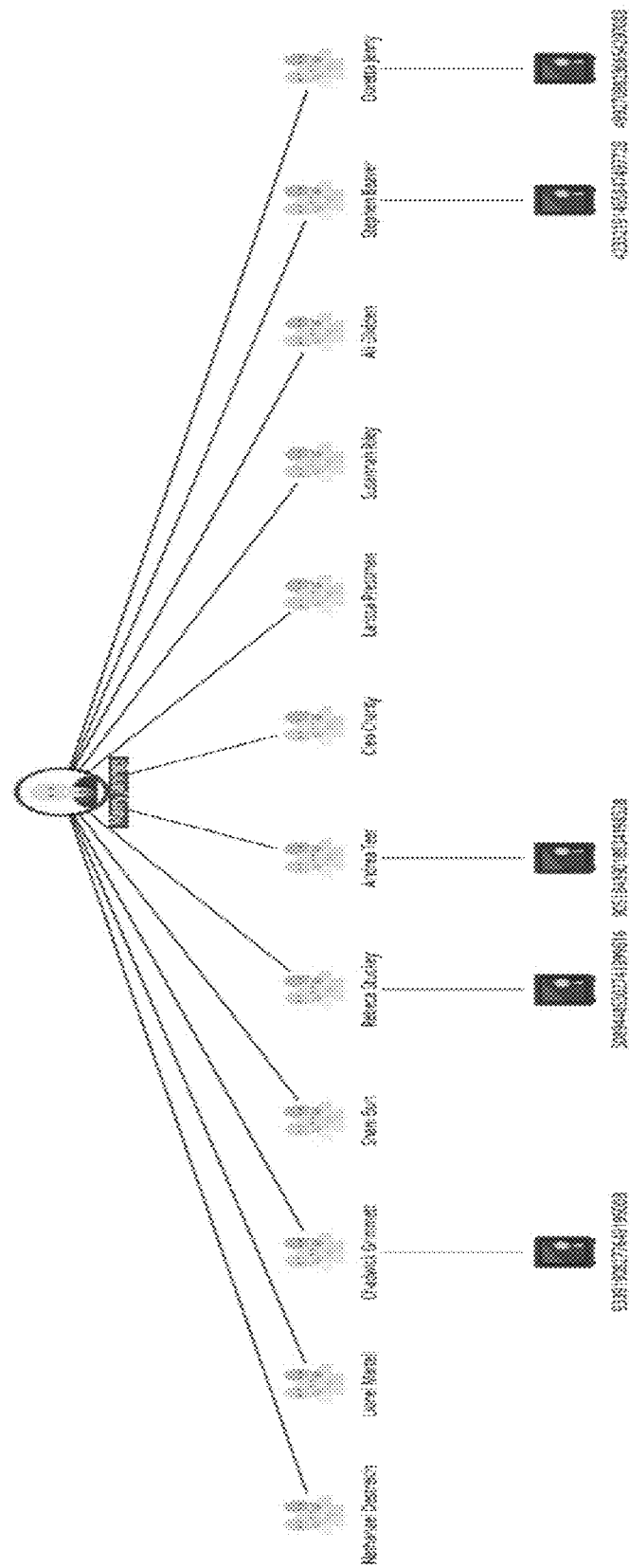
FIG. 26 shows a top hierarchical view of the graph in FIG. 25.
Figure 27:
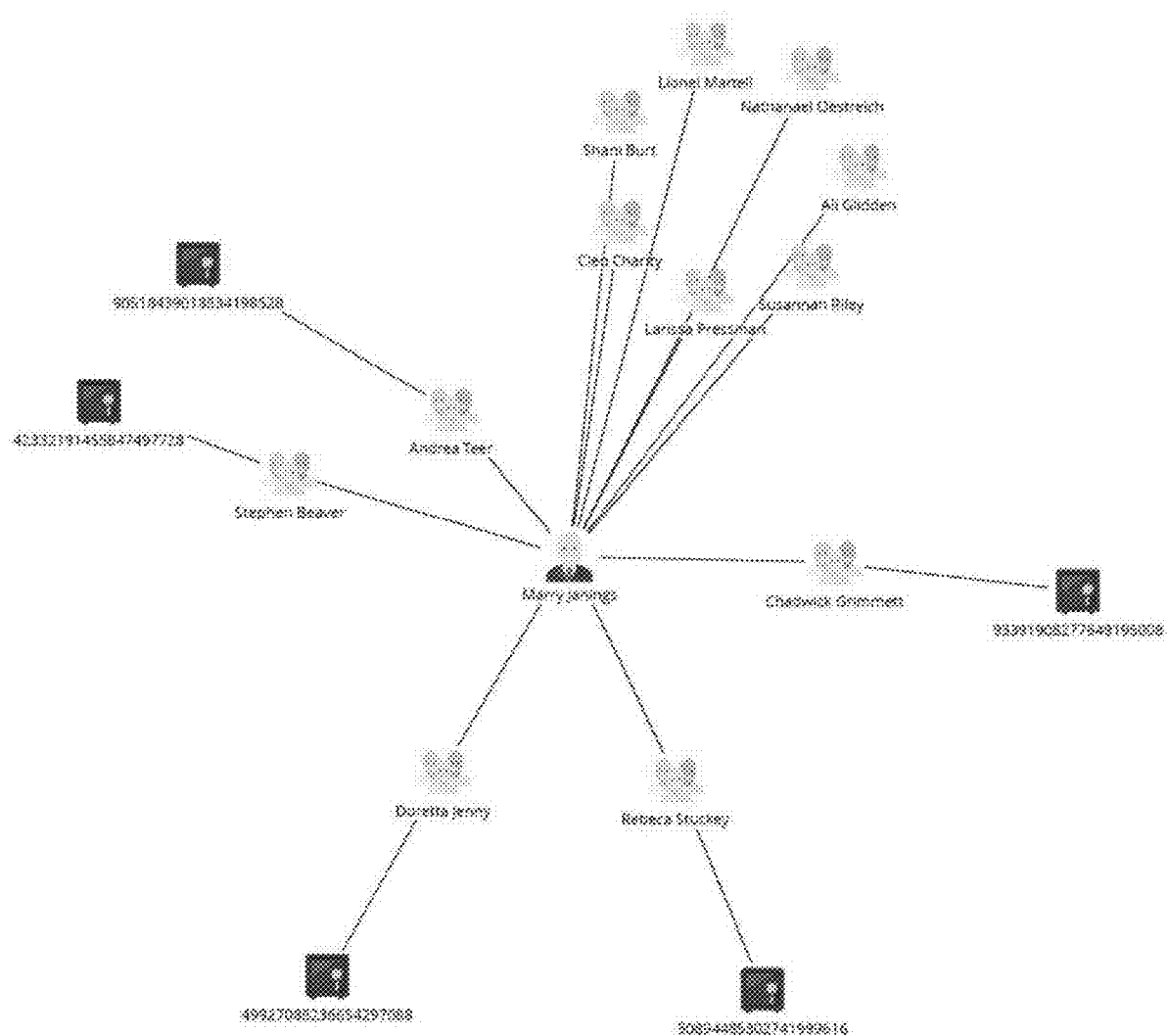
FIG. 27 shows a layout view of the graph in FIG. 25.
Figure 28:
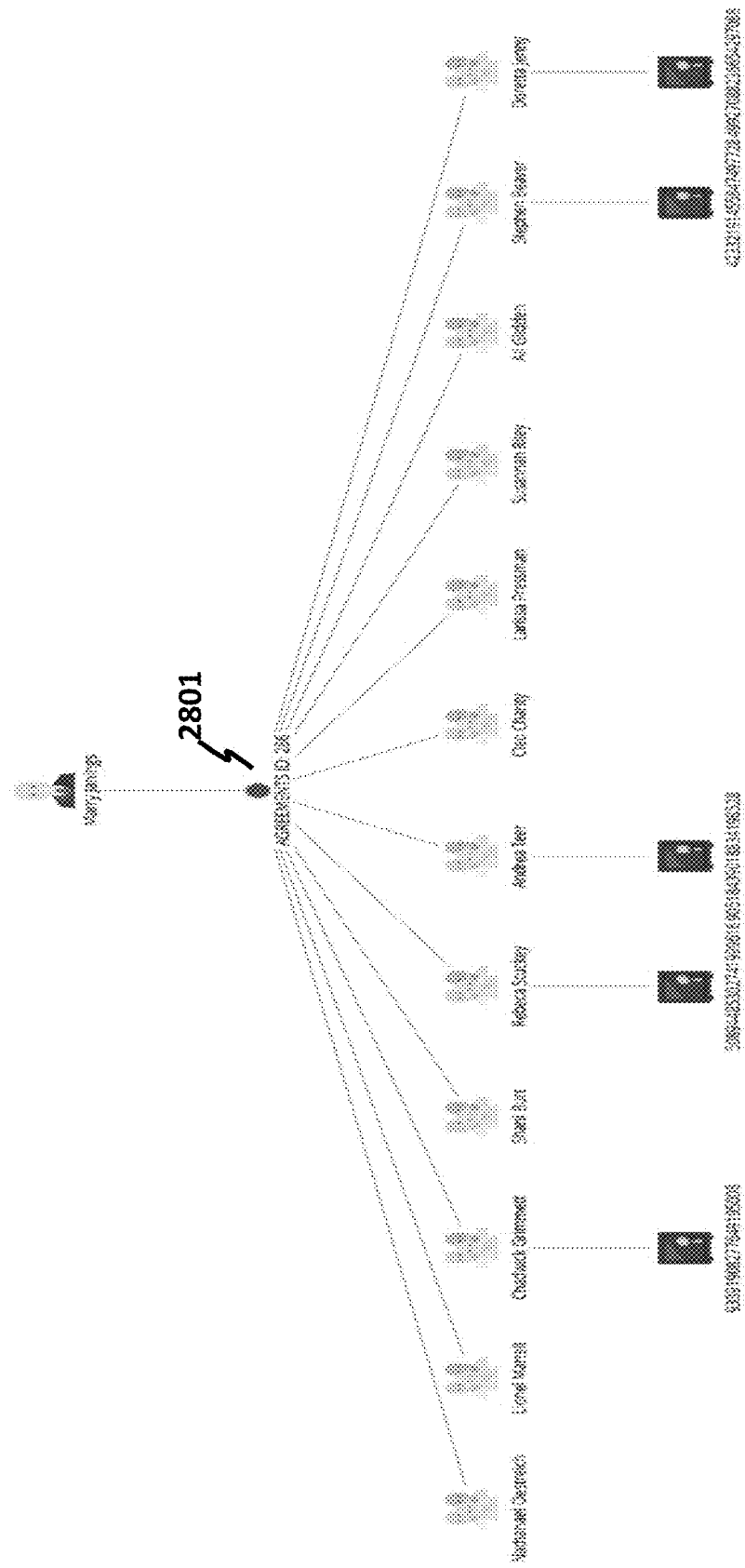
FIG. 28 shows a hierarchy graph with a shared data attribute is added.
Figure 29:
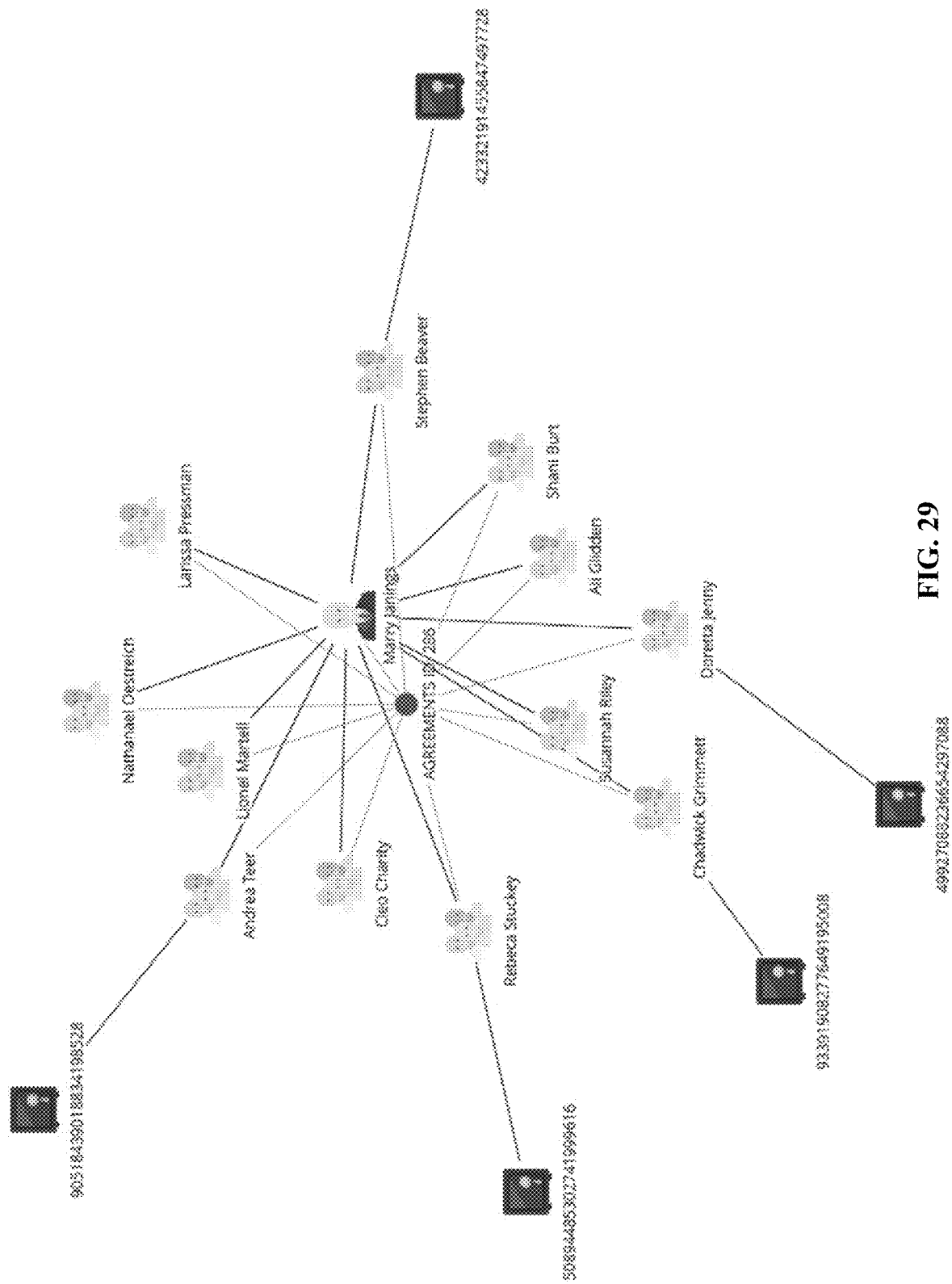
FIG. 29 shows a layout view of the graph in FIG. 28.

Based on the aforementioned query processes, a user may add any business class, data attribute, in a query process at any time. FIG. 25 shows another example where a class of bank accounts, corresponding to nodes 2501, 2502, 2503, 2504 and 2505, is added to the graph, and a hierarchy diagram is shown in FIG. 26. Another view of FIG. 26 is shown in FIG. 27. Further, a shared data attribute (in this case, AGREEMENT ID 2801) is allowed to be displayed, leading to another hierarchy diagram in FIG. 28 and graphical layout in FIG. 29.

Figure 30:
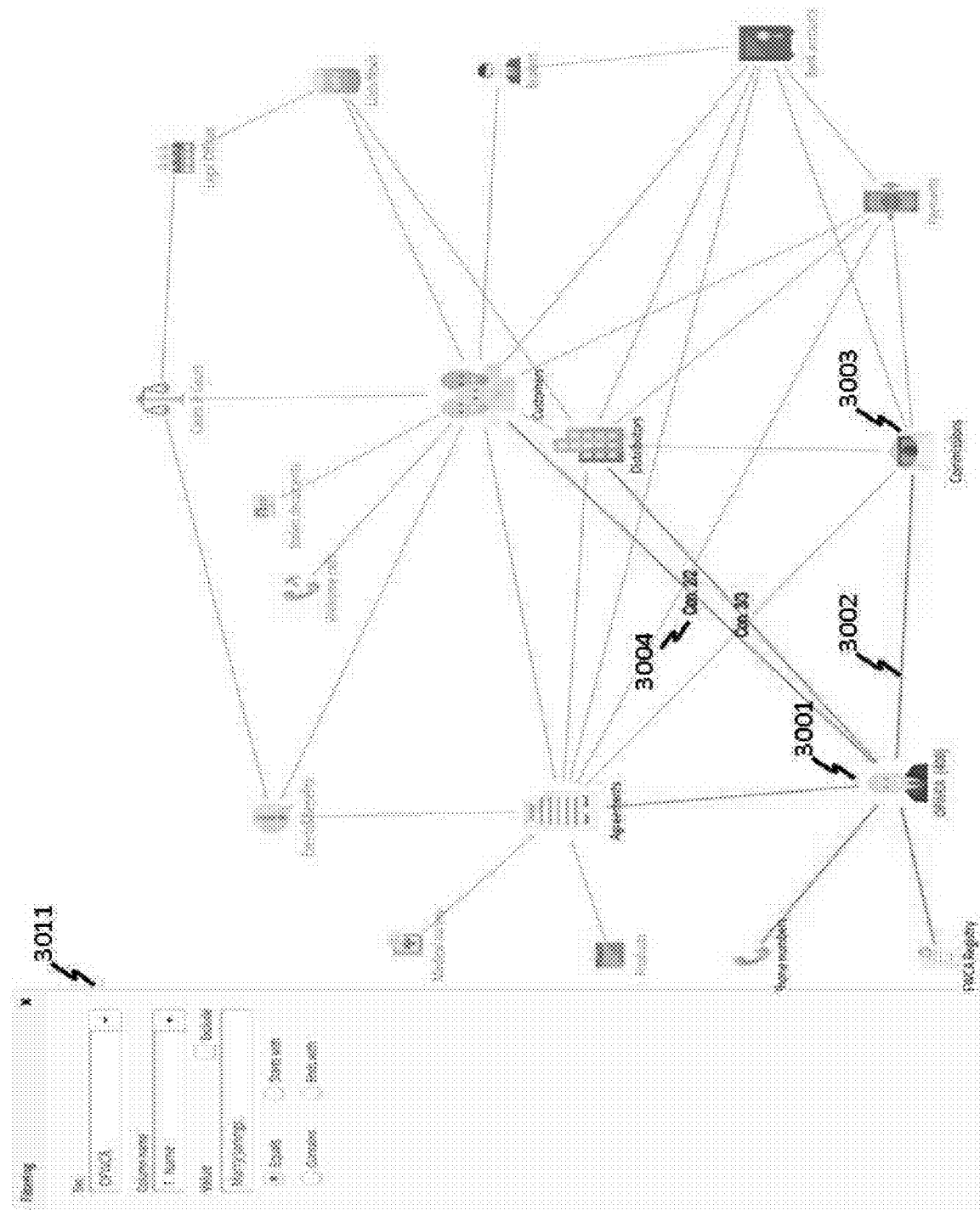
FIG. 30 shows an example query process.
Figure 31:
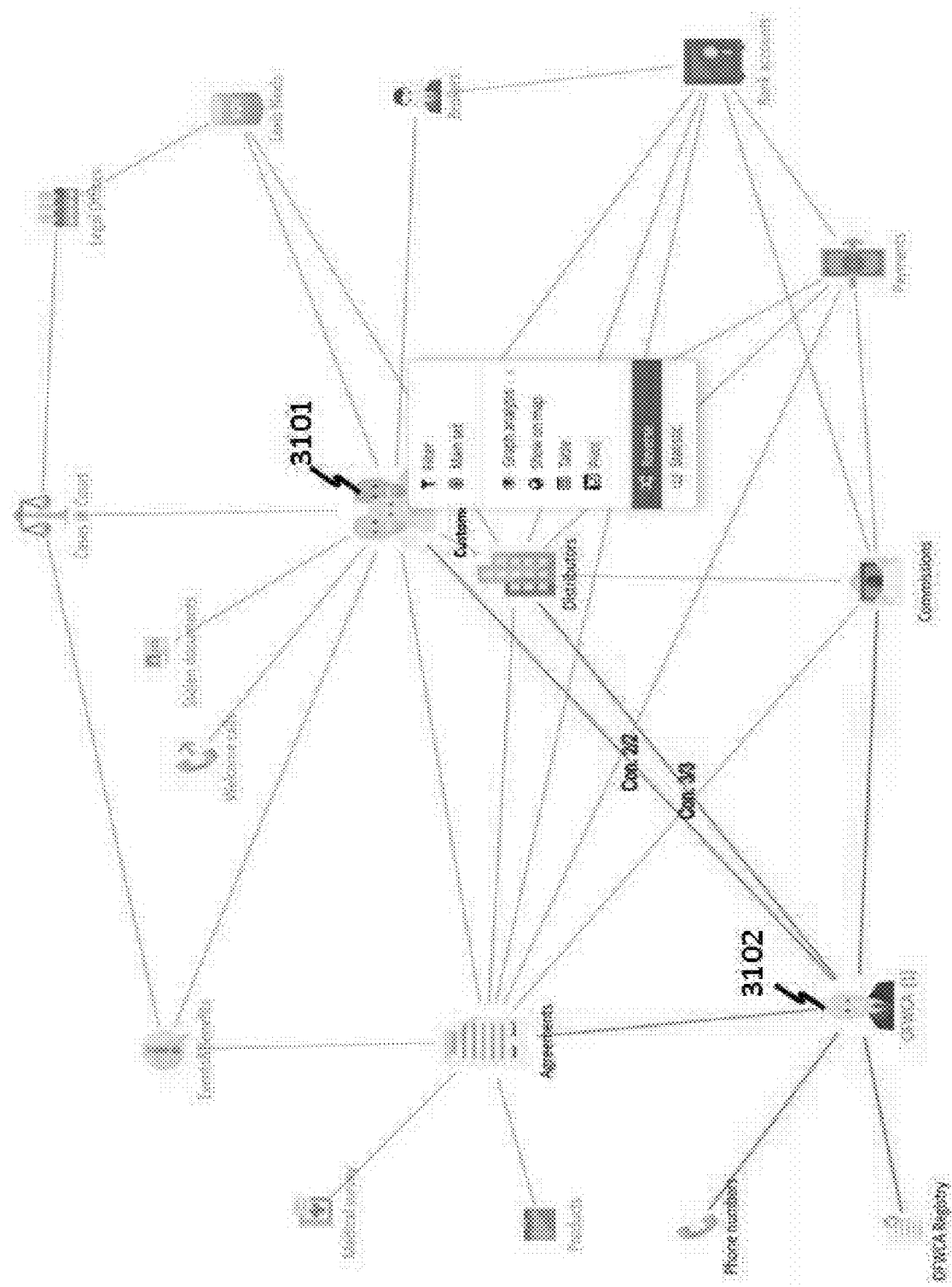
FIG. 31 shows an example query process where a user applies "Reverse" filter on connected set to filter main set.
Figure 32:
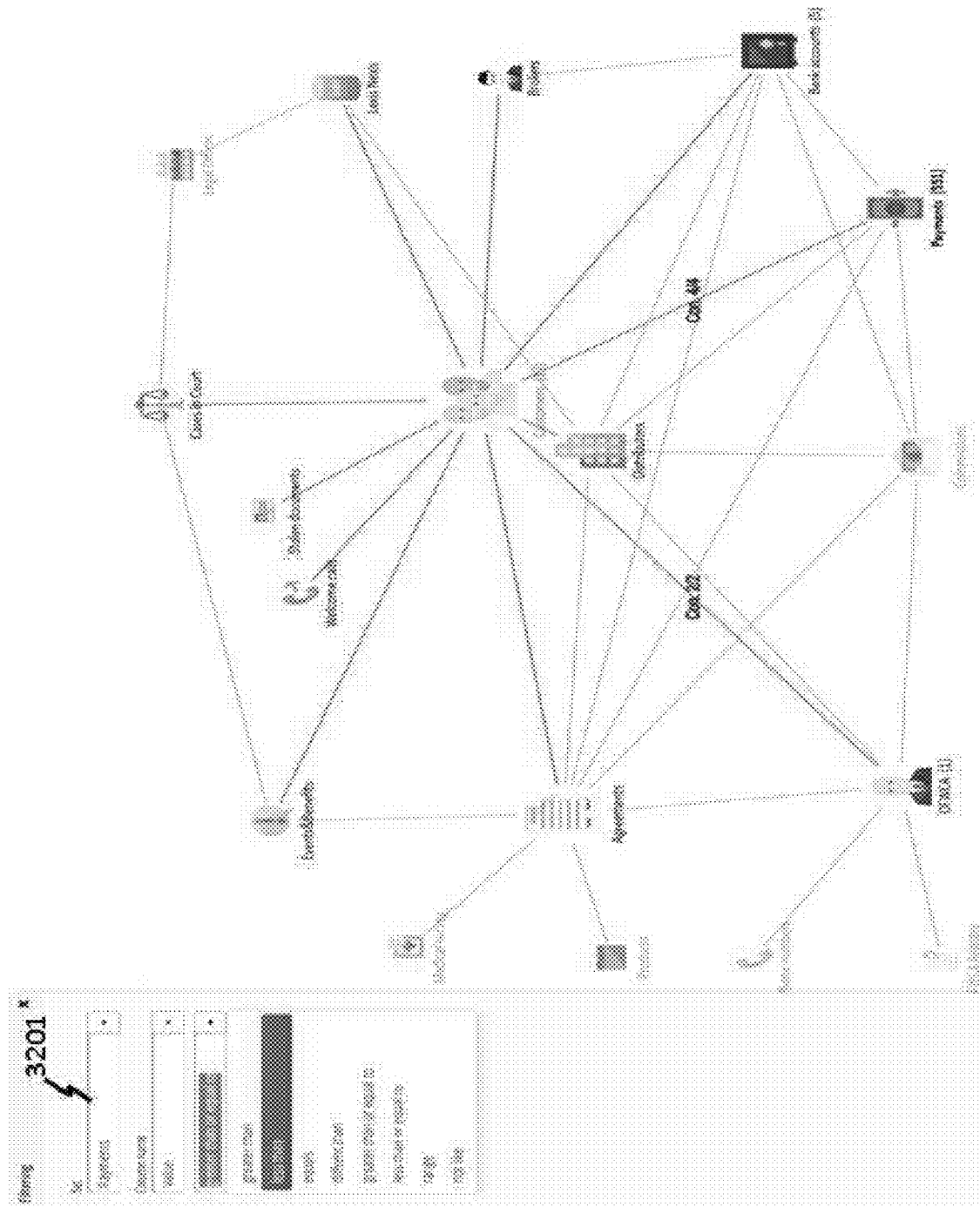
FIG. 32 shows an example query process where an extra class is selected from FIG. 31.
Figure 33:
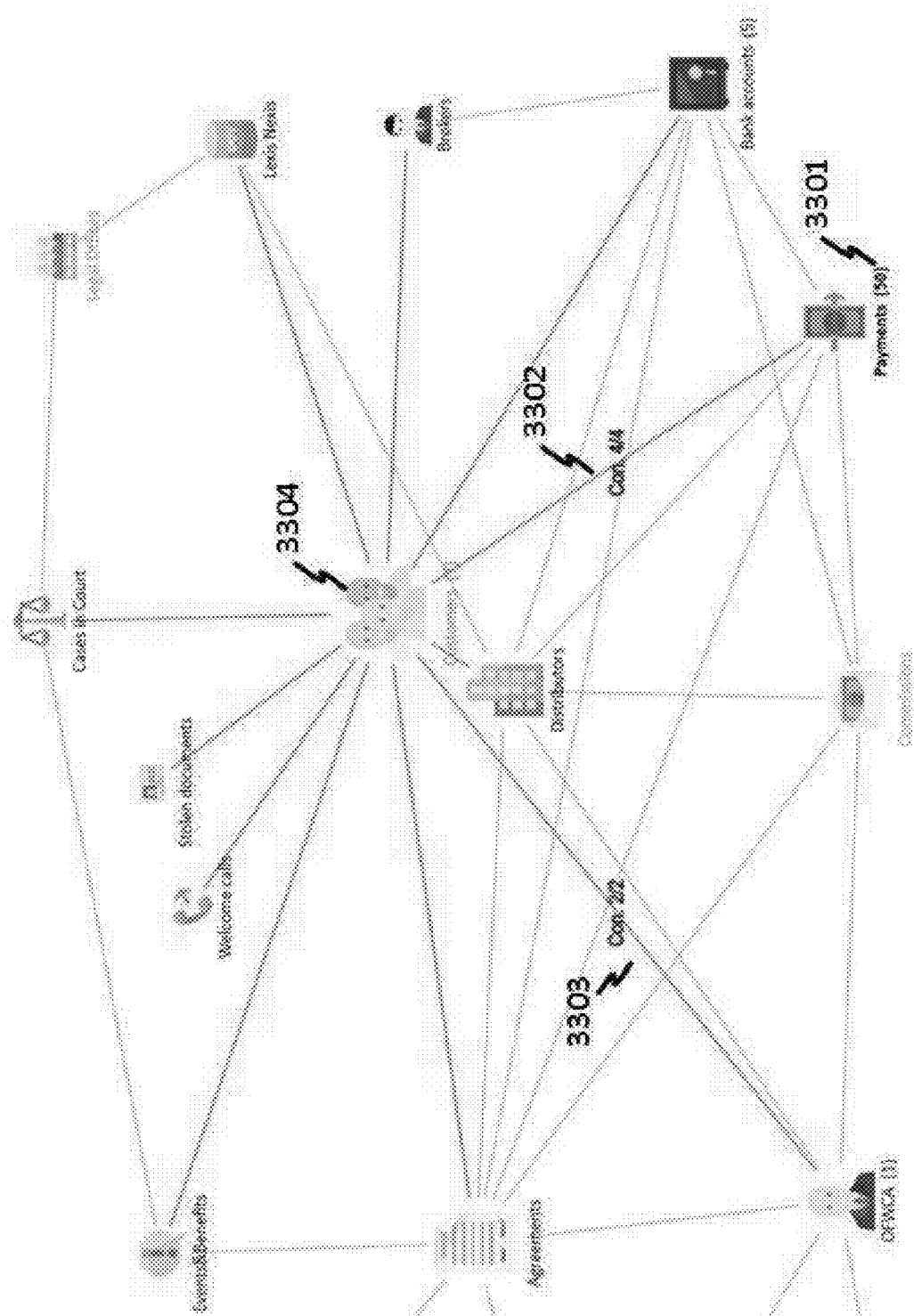
FIG. 33 shows an example visualized graph resulting from query in FIG. 32.
Figure 34:
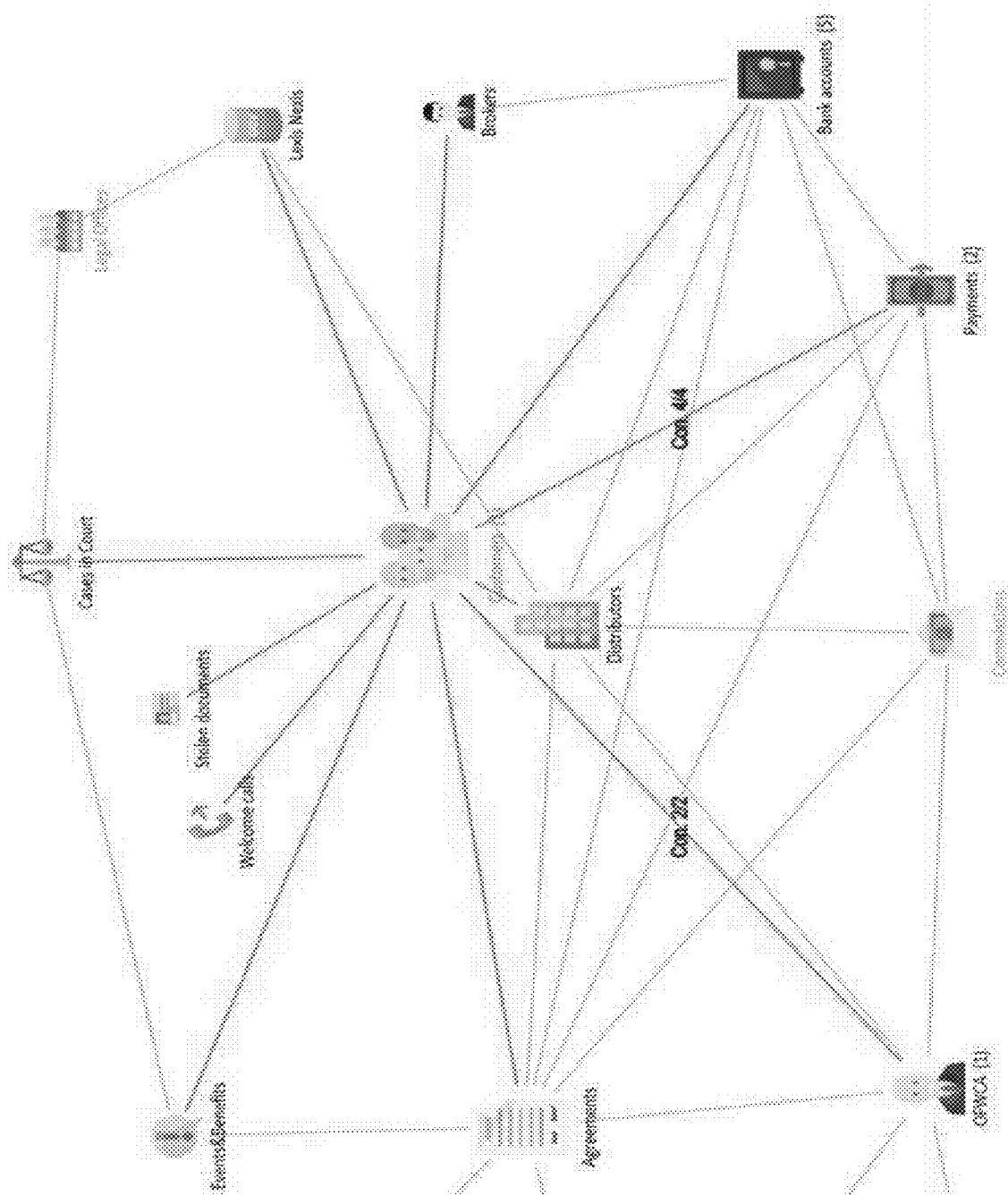
FIG. 34 shows an example query process where an attribute in a given class is selected.
Figure 35:
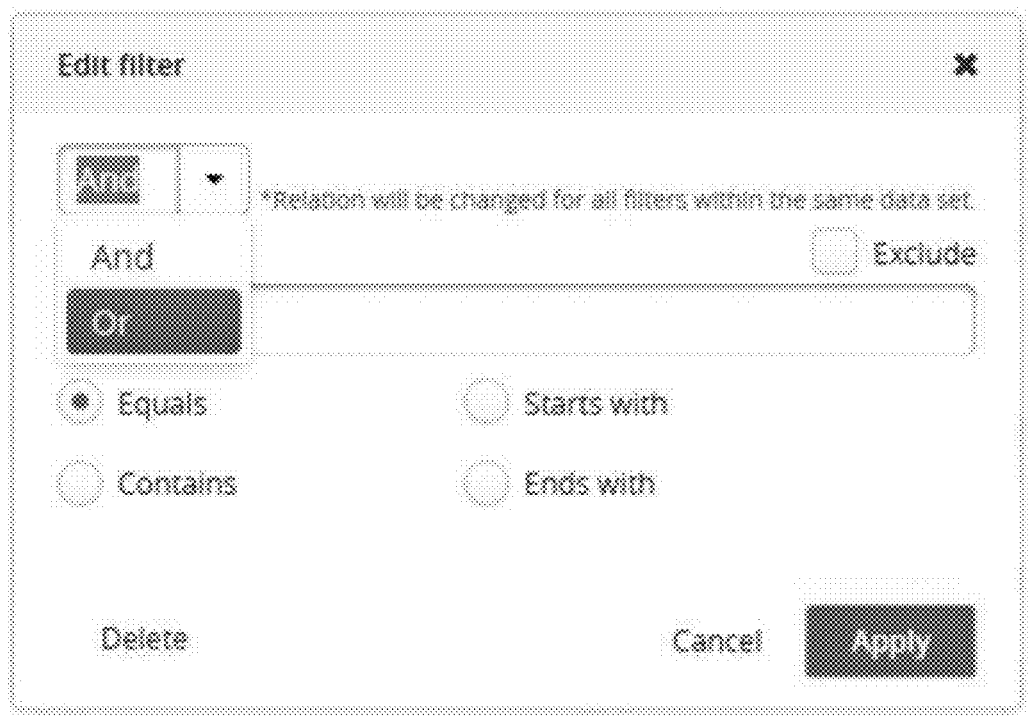
FIG. 35 shows an example user interface to edit logic relations in a query.
Figure 36:
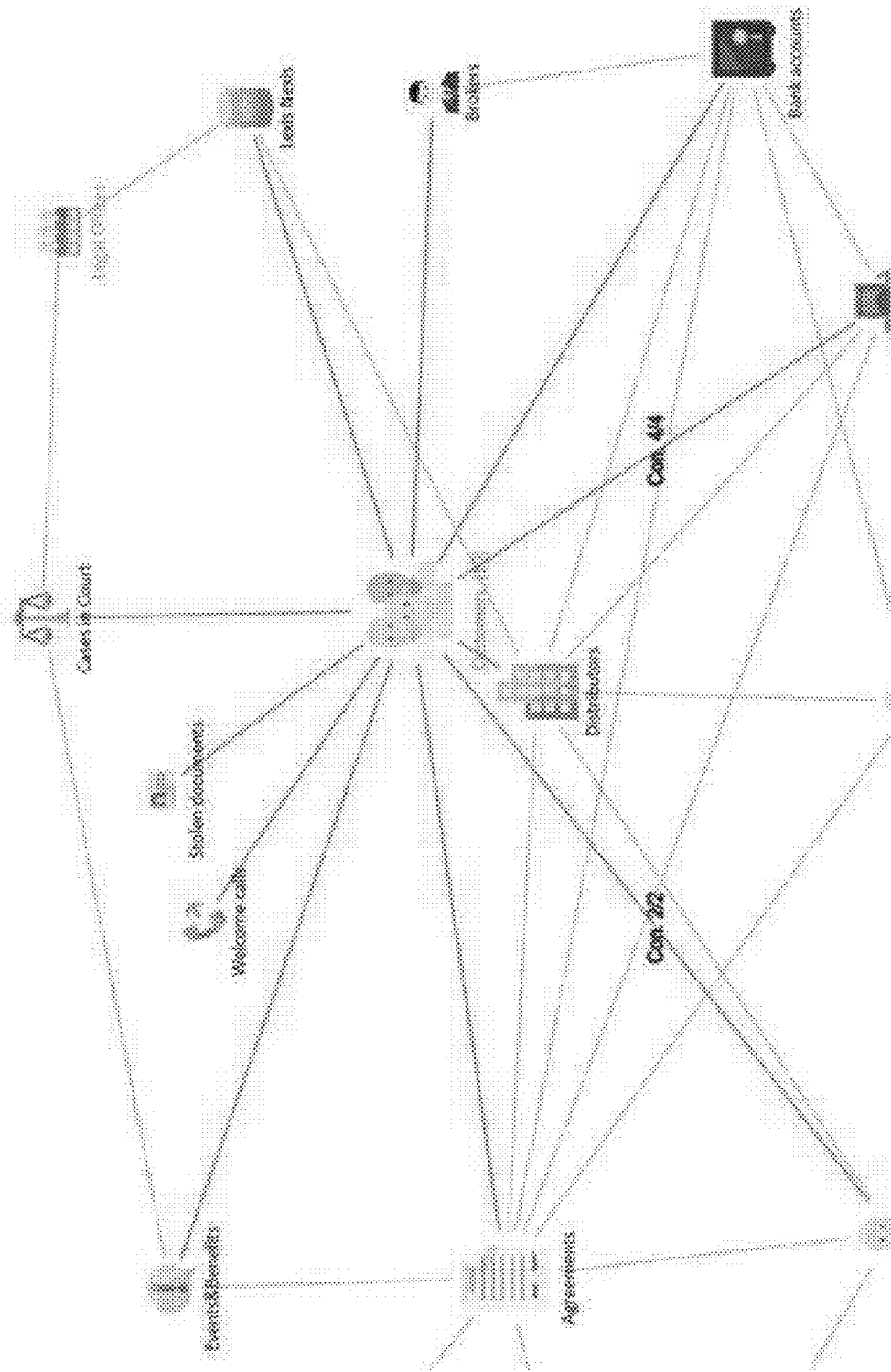
FIG. 36 shows an example visualized graph resulting from queries with an attribute of unpaid payment and an attribute of payments less than a given amount.

FIG. 30 shows a new query process on the same database. In this case, the business class of OFWCA 3001 is selected as a main class. Once the OFWCA icon is clicked on the graph, its links (e.g., a link 3002 between OFWCA 3001 and COMMISSIONS 3003) can be changed to another style or color. Properties of links (e.g., a number of link types 3004) are displayed accordingly. Further, possible filtering operations 3011 can be shown to aid in a user's query. Contingent on that the OFWFA node is designated as a main class, a user can perform further filtering based on another business class; FIG. 31 shows an example where a user chooses a CUSTOMERS class 3101. A user can additionally limit perspectives of the main class OFWCA 3102 or another class. In FIG. 32, for example, a payments class 3201 is selected to constrain the query process to filter data with payments less than $1,000, and the query results are shown in FIG. 33. In FIG. 33, fifty records of payments class 3301 associated with this query are found, and link 3302 (link between CUSTOMERS 3304 and PAYMENTS 3301) and link 3303 (link between OFWCA and CUSTOMERS) are added with link types; in the given example, seven customers 3304 may be found in this query, meaning that the fifty payments were done by seven customers. When a query is further performed on the filtered result to identify unpaid (as opposed to those payments marked as paid) in the PAYMENTS class, there are one customer, two payment records, and five bank accounts found, which is also shown in FIG. 34. The graph-based query interface can be changed to execute different queries; FIG. 35 shows an interface to edit logic relations in a query. When query criteria are changed to include unpaid or payments less than $1,000, the visualization generates a new result with ten customers, sixty-one payment records, one OFWCA, and five bank accounts, as shown in FIG. 36. As described earlier, the graph-based query interface disclosed herein can provide efficient and intuitive approaches to query and filter the stored data or data objects, without having to understand any specific database querying languages.

Figure 38:
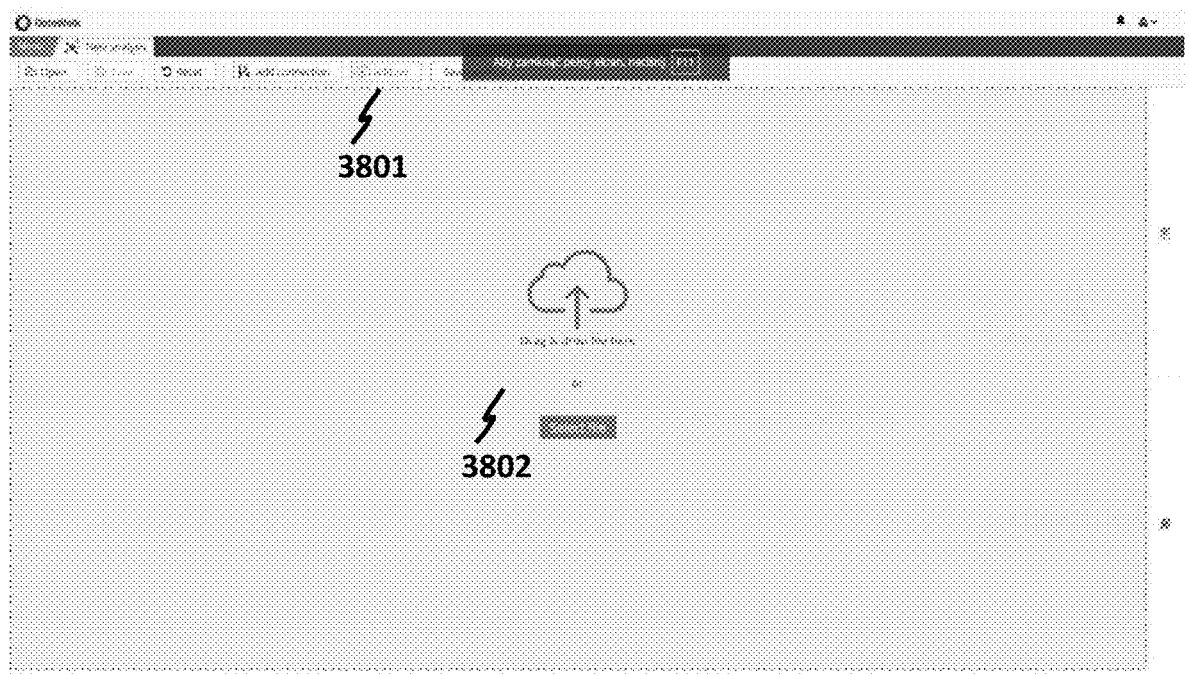
FIG. 38 shows an example user interface for adding new dataset.

Data walking may comprise a user interface. Embodiments are described below. In FIG. 38, on the top bar there may be a button 3801 that can enable a Drop file area 3802. The button 3801 may be available only for a user who has he administrator role in the system.

Figure 39:
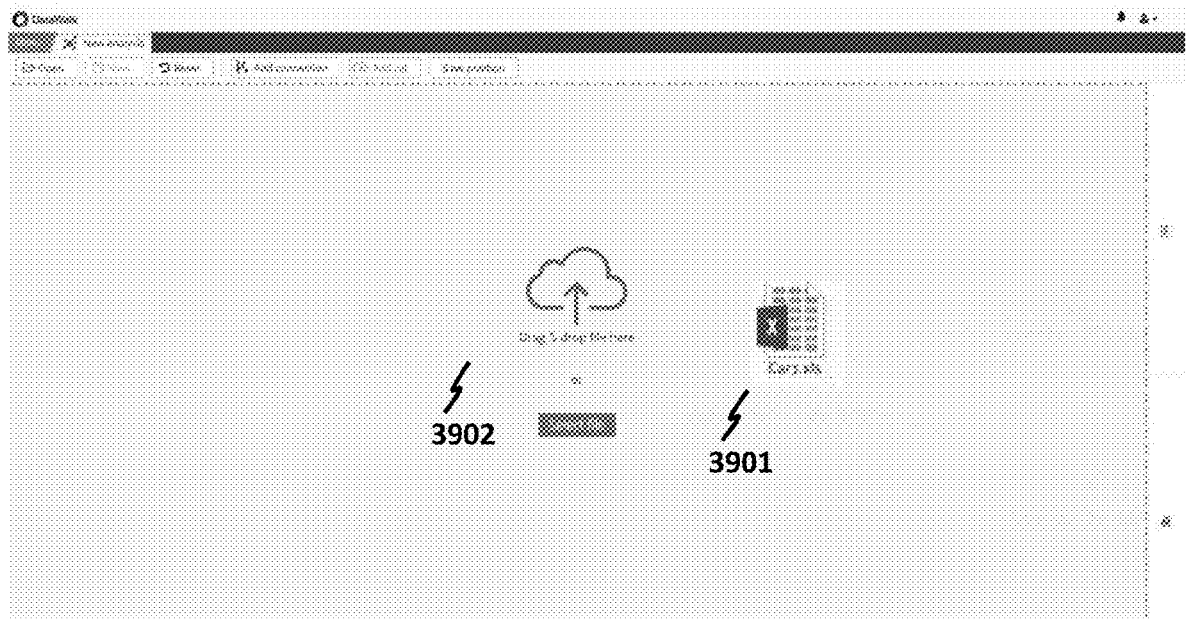
FIG. 39 shows an example user interface for a user dragging-and-dropping a new dataset file.

In FIG. 39, a user may be allowed to drag-and-drop a file 3901 to a drop file area 3902. Alternatively, a user may click the area 3902, and the system may enable a dialog window for the user to choose a file. Examples of file formats include, but not limited to, Excel files, spread sheets, and plain text files storing data.

After a user releases a file 3902, the data stored in the file may be created or visualized on the user interface. For example, the names of the columns in that dataset may be taken from the first row of the first spreadsheet in the data file. The column type may be generated based on the data column format, or be inferred from the data contents. In some embodiments, formats may be applied in the following way when there is no easy way to obtain the format from the file: (a) If the field is date, then the date may be taken and the visualized format may be changed/modified/altered/edited to another format (e.g., dd/MM/yyyy HH:ii:ss). (b) If the field is a floating-point number, then the format may be "###,####,###0.00". (c) If the field is an integer, then the format may be "###,###,###". (d) If the field is a string, the format may be taken as is. (d) If the field is a currency, then the format may be "$###,###,###0.0". All other fields may be flattened to above scenario. For the information of unknown formats, a user may easily change the formats in an editor of the user interface.

Figure 40:
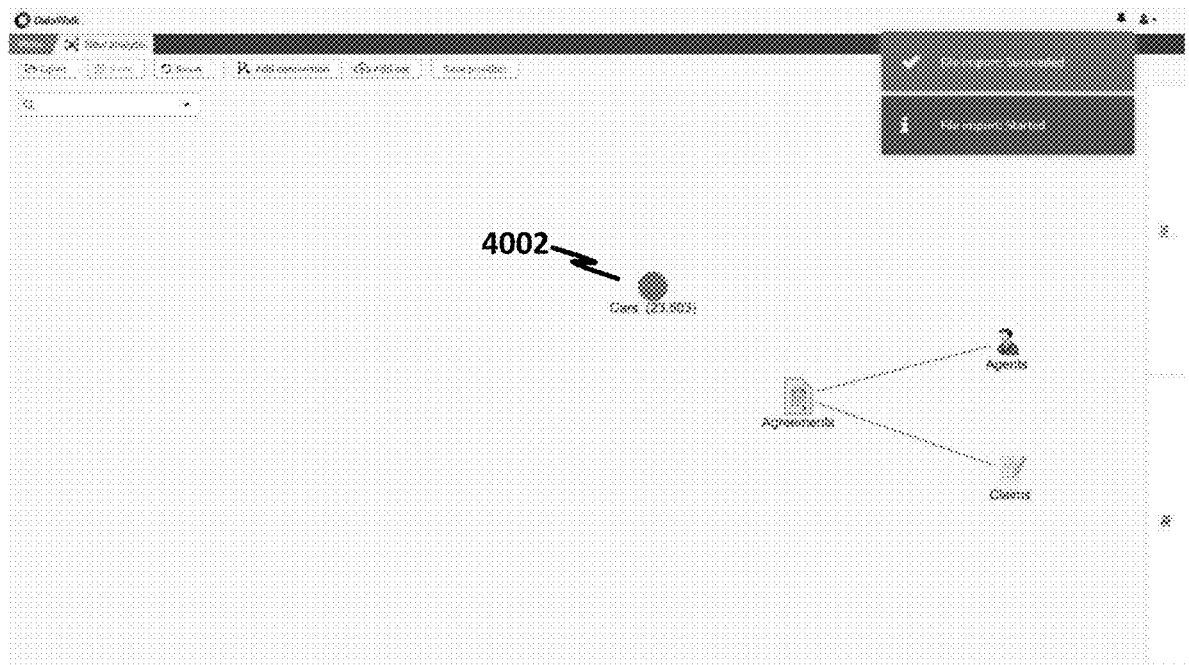
FIG. 40 shows an example user interface where the system may recognize a new variable in the dataset.

In FIG. 40, after a file is selected or being dropped onto the file area 3902 of FIG. 39, the system may analyze the file and extract variables in the file. In this example, data of "cars" is stored in the file, and the system may recognize the "Cars" variable 4002 which may then be added to the user interface and visualized.

Figure 41:
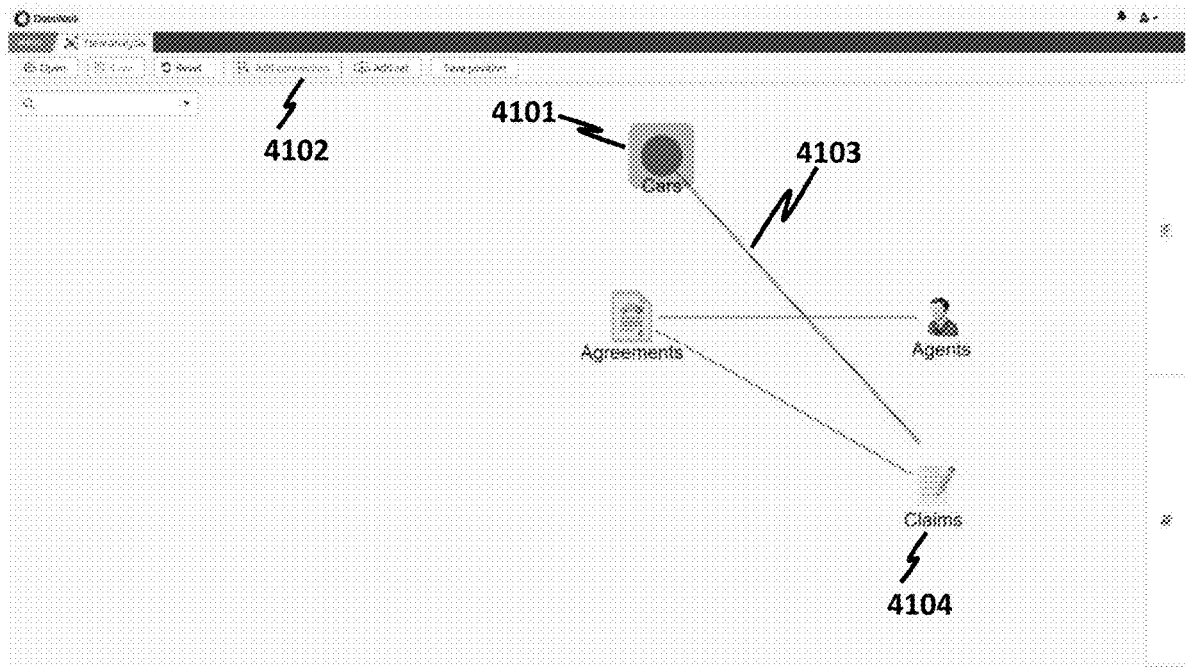
FIG. 41 shows an example user interface where association may be visualized by a link.

In FIG. 41, variables in a database may be associated. Association may be visualized by a link. When a new variable 4101 is added, an additional button 4102 may become visible on the top bar. Clicking the button may enable dragging mode for links. A link 4103 between the Cars dataset 4101 and the Claims dataset 4104 may be added by clicking on the Cars dataset 4101 and dragging a pointer to the Claims dataset 4104. This mode of editing links can be extended and applied to adding any link between a pair of nodes.

Figure 42:
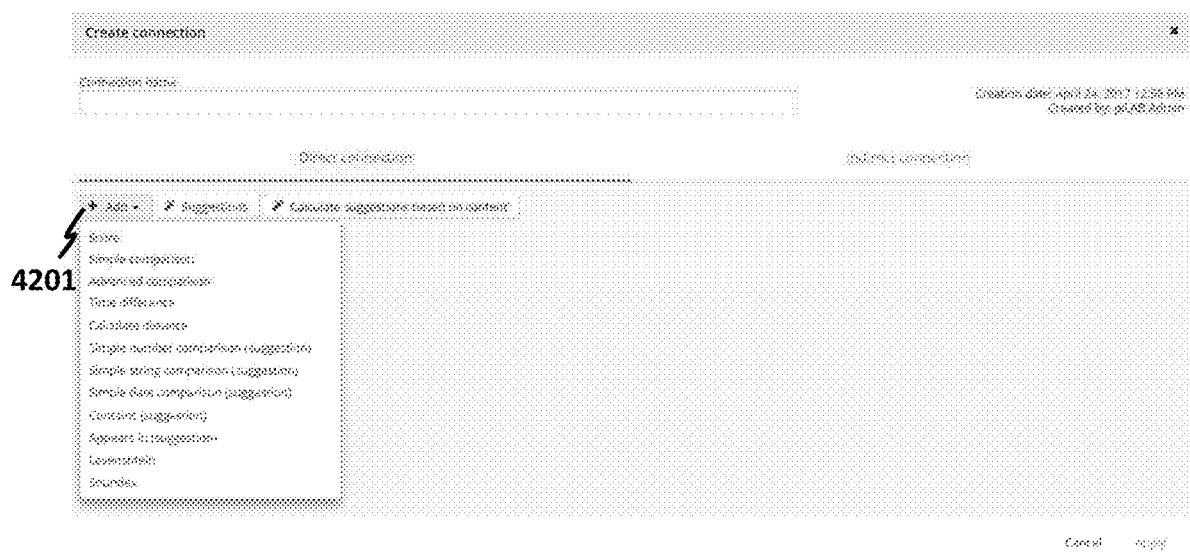
FIG. 42 shows an example popup window for creating a connection generator rule.

Right after two nodes are connected, a popup window may be displayed, as shown in FIG. 42. The popup window may be a basic element that can create connection generator rules. For example, it may be used to set up the name of the link and connection generator rules. A drop-down menu 4201 may be enabled to allow a user to edit the rules. The menu 4201 may comprise options to choose combinations of all columns of two linked datasets. The popup window may also be configured to establish "operations" rules, such as, but not limited to, comparison algorithms, scoring algorithms, or any other mathematical or logical operations to be performed between or among the linked datasets.

Figure 43:
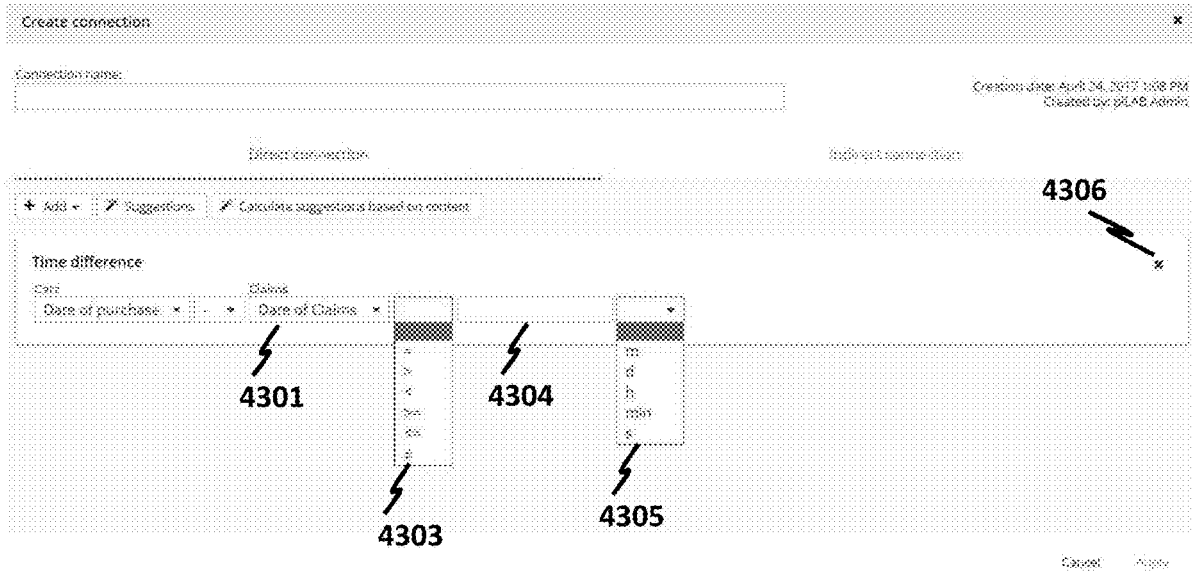
FIG. 43 shows an example window for configuring a connection rule.

After choosing an operation, the interface may display another popup window, shown in FIG. 43. The fields may comprise one or more of the following: (a) a second column 4301; (b) Rule 4303: this may include a mathematical rule of the result, such as "=", "<=", ">=", ">", "<"; (c) Value 4304: this is text field into which user can type expected result for further process; (d) Unit 4305: this field may not be obligatory to be filled by user. Regarding the information a user wants to operate on, the units may automatically show appropriate ones. For instance, if the geolocation is required, then the units of distance (e.g., miles, meters, feet) may be prefilled; if a date is required, then units of dates (e.g., minutes, hours, days) may be prefilled. The user interface may comprise a Delete button 4306. Clicking the button may delete the link. Templates for the rule can be dependent on the operation. For each operation described above, different formula can be visualized.

Figure 44:
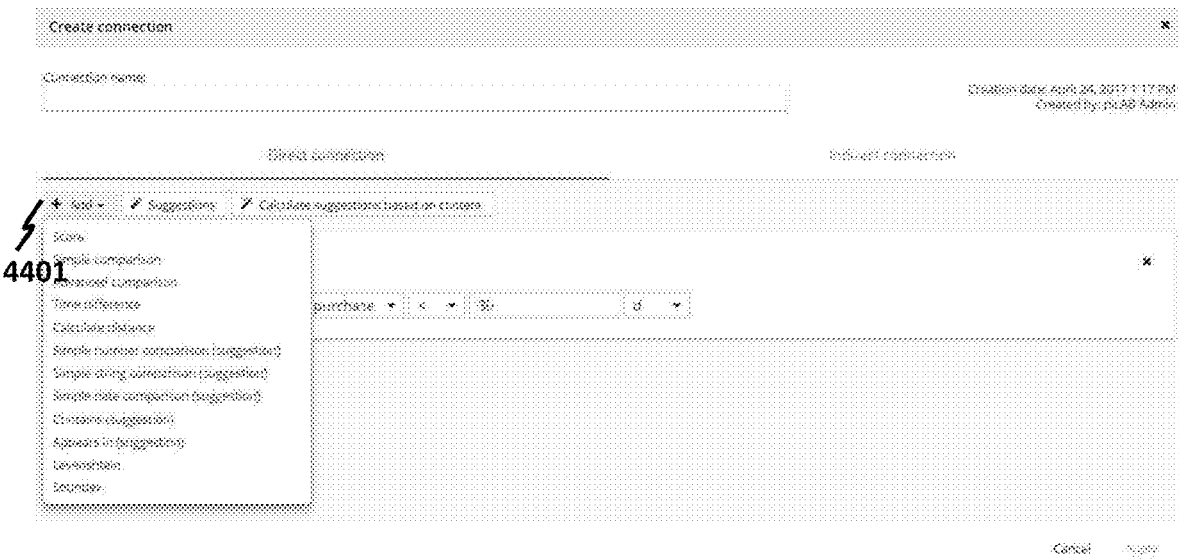
FIG. 44 shows some embodiments where a comparison rule is established.
Figure 45:
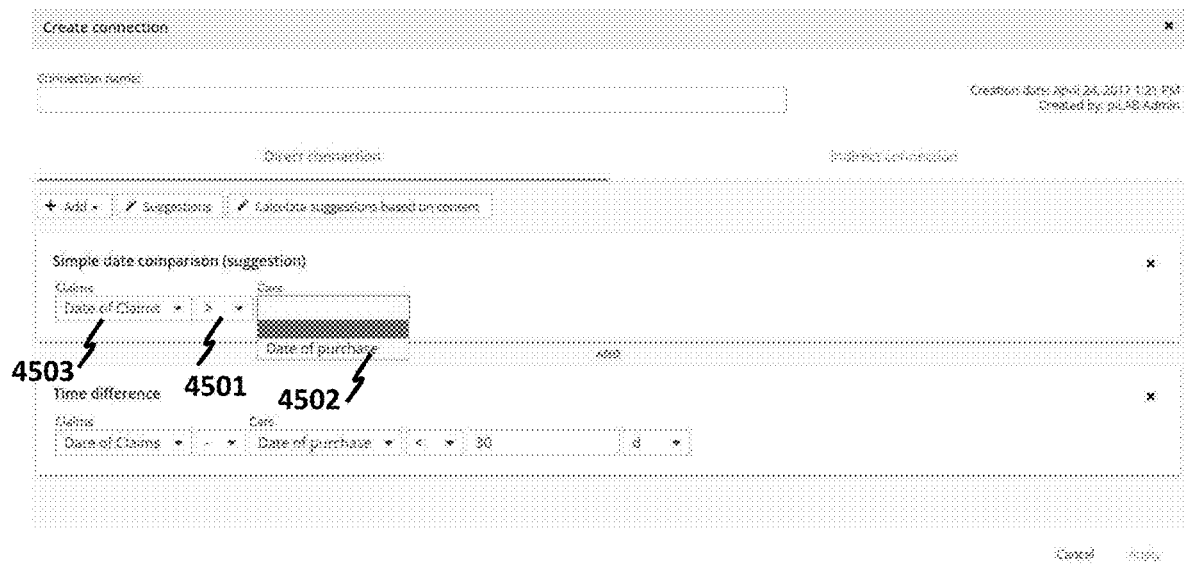
FIG. 45 shows an example window of configuring connection properties.

FIG. 44 shows some embodiments where a new rule can be established. The configuration window is shown in FIG. 44. The second column 4401 may need to be chosen. For example, referring to FIG. 45, a new rule that is called "simple date comparison" may be created. This rule can comprises of two columns and the mathematical rule of the result. In field 4503, a user can choose one date column. The disclosed system can automatically visualize only the columns that are in the format of date. The field 4501 may include a mathematical rule to be applied (e.g., such as "=", "<=", ">=", ">", "<") between one column 4503 and another column 4502.

Figure 46:
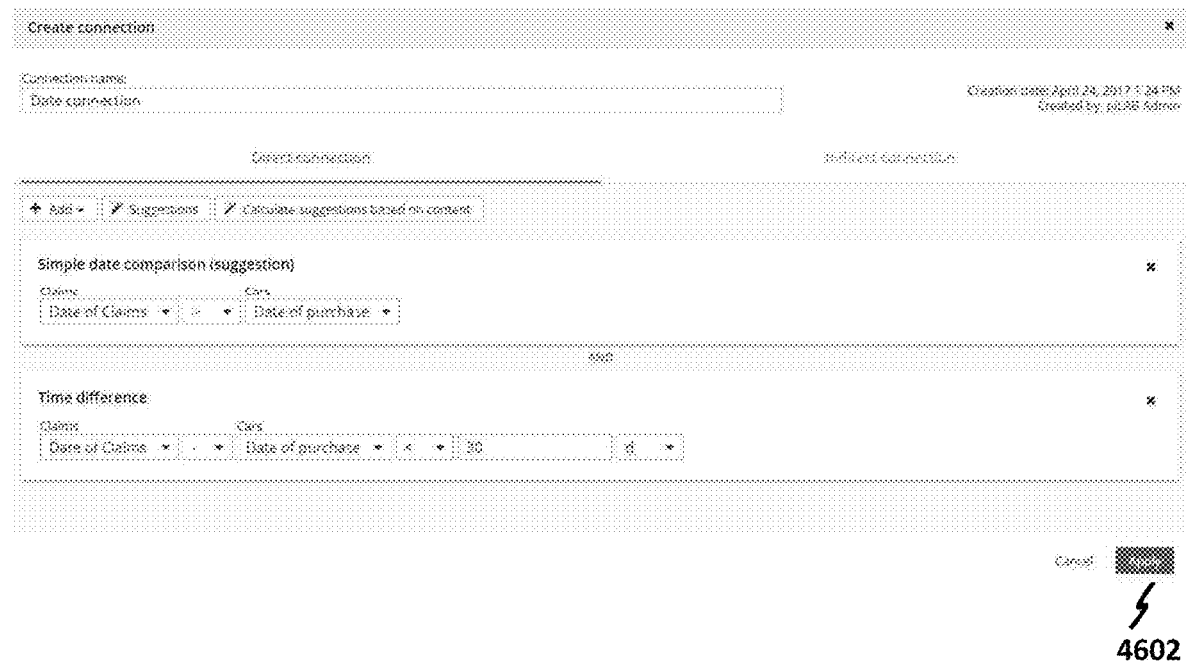
FIG. 46 shows an example window of configuring a connection.

Referring to FIG. 46, by clicking the Apply button 4602, a virtual link may be successfully configured. The link may be visible only by the user who created it.

Figure 47:
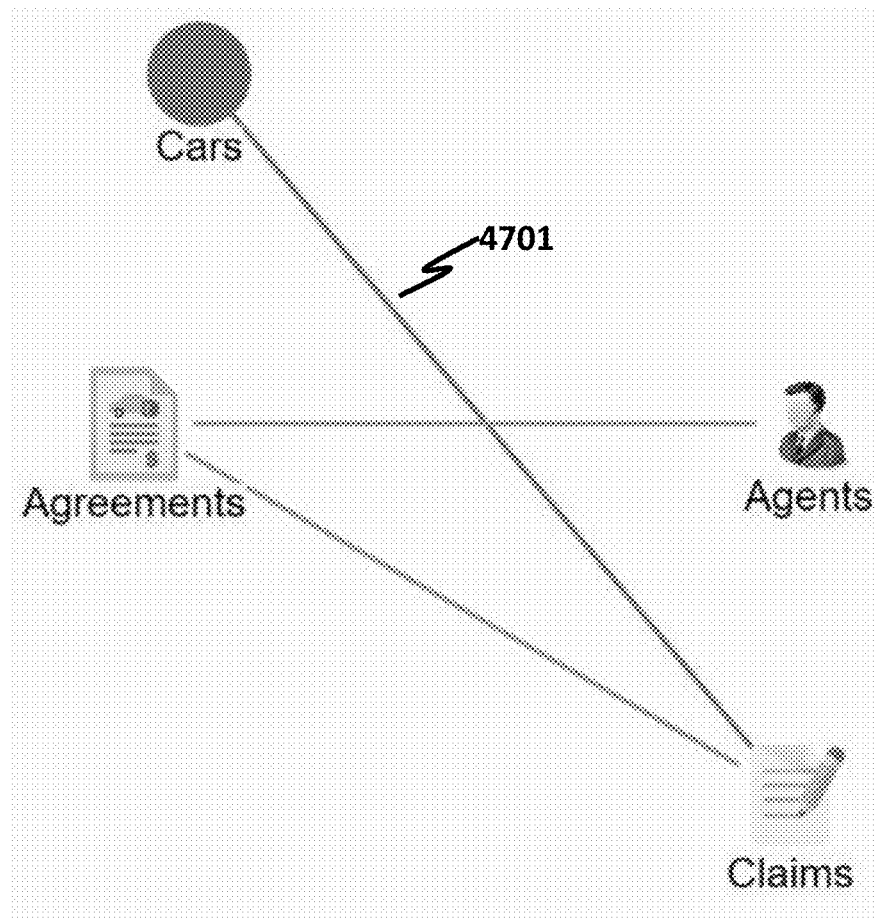
FIG. 47 shows an example of creating a link between datasets.

Referring to FIG. 47, a connection 4701 may become visible after a user configures the connection. In some designs, this connection 4701 may be different from other connections, but with an assumption that this link can be added between sets that already exists. Information about this link may be visible after clicking on that link. In some applications, the datasets that are self-linked may be doubled on the user interface and may be connected with dashed link currently. The link 4701 from the perspective of the user interface and other subsystems may work as a normal link. The virtual links may be visible only for the end user who created them (e.g., a "private link").

Figure 48:
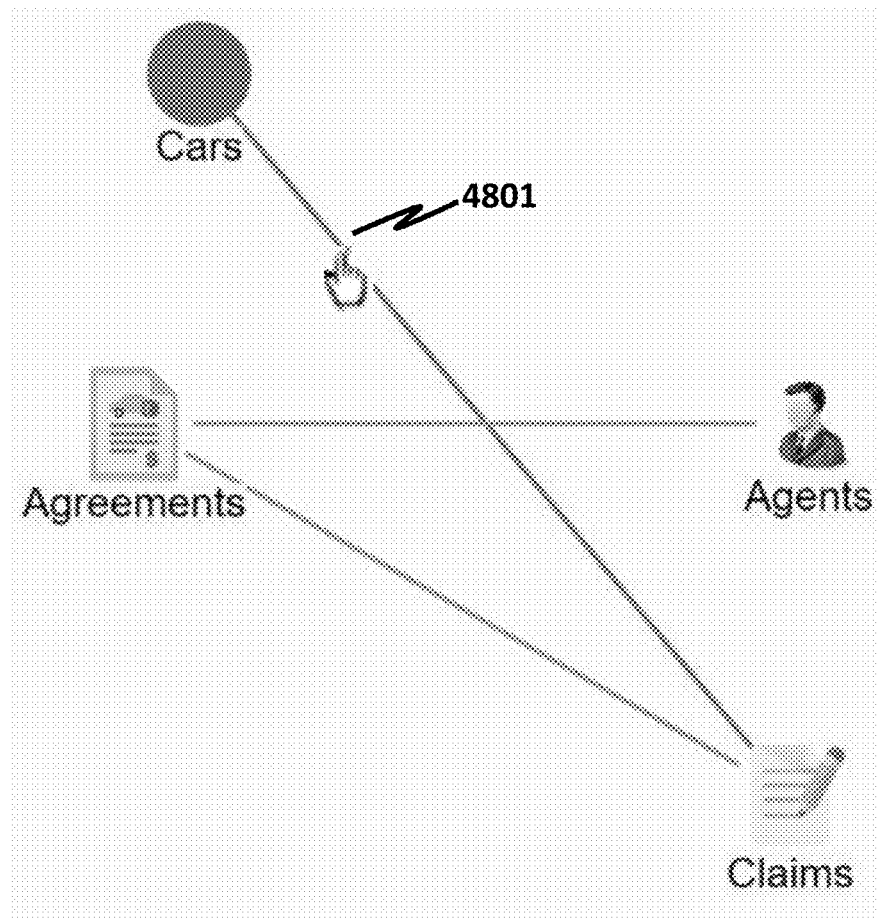
FIG. 48 shows an example of clicking a created link.
Figure 49:
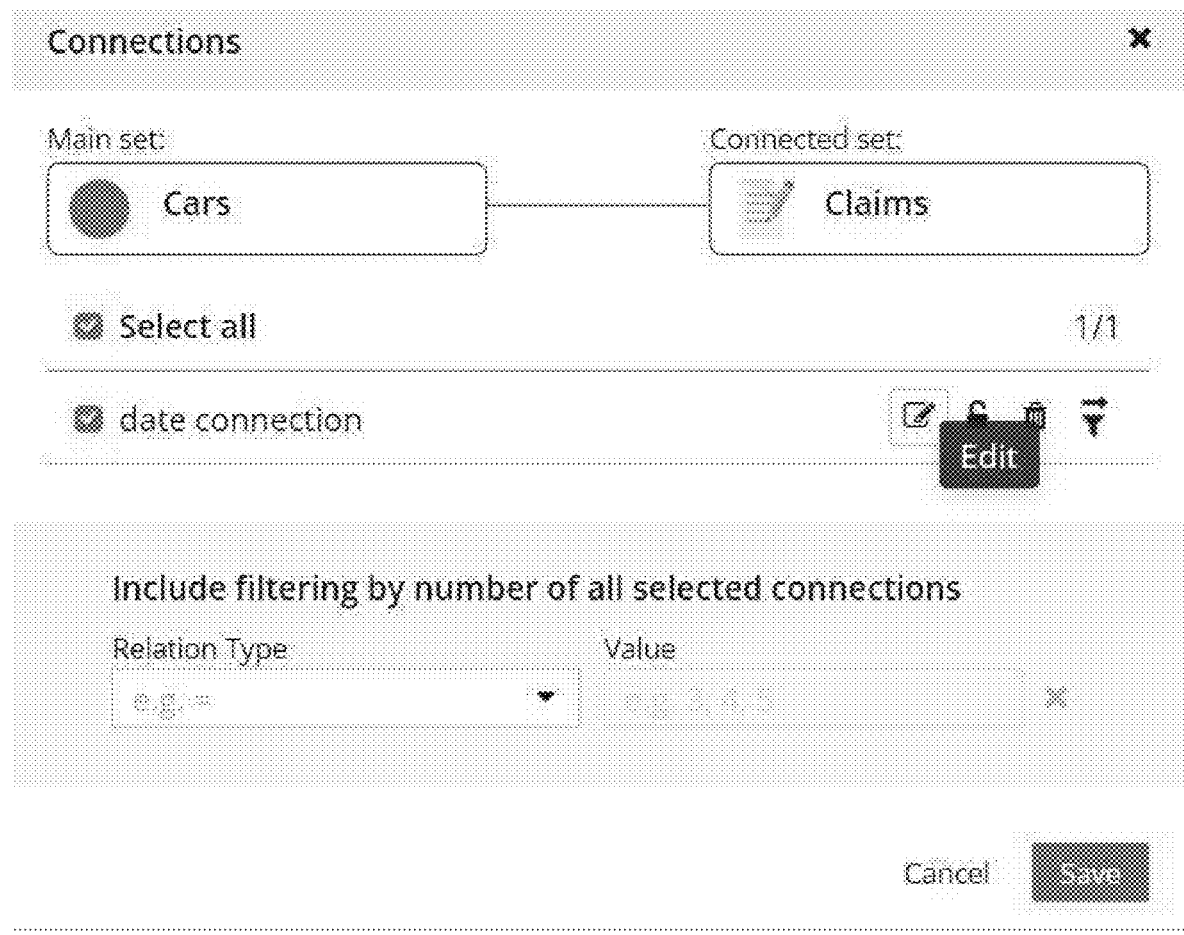
FIG. 49 shows an example window of editing connections.

Referring to FIG. 48, after clicking on the link 4801, the link may behave exactly the same as the non-virtual link. Virtual links from the perspective of upper layers may not differ much from a normal filtering on connection. The only difference may be that the edit virtual connection is available near any virtual connection on that virtual line such that the user can change, save or create. This approach can enable users to create multiple virtual connections on one link—which is very much wanted approach. FIG. 49 shows an example of a connection edit window. An administrator or certain users with privileges, for example, may also configure the link to be visible to other users, as opposed to the link being a "private" link. For example, the administrator may decide to "publish" the link, which would enable the link to be available to the public.

Figure 50:
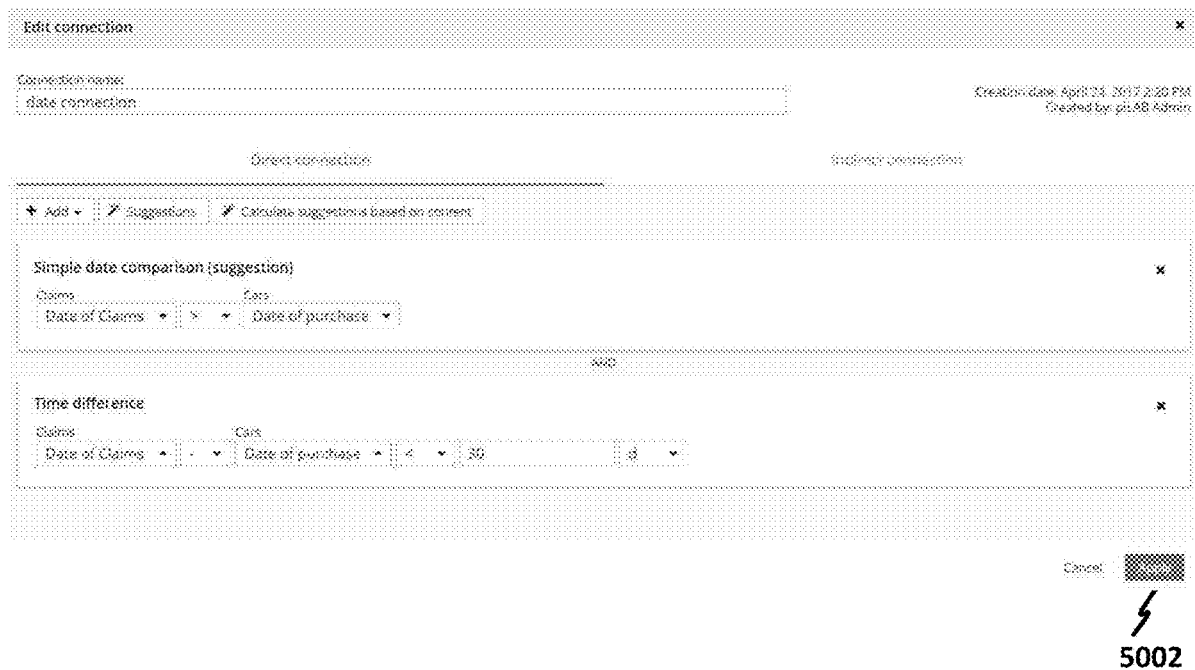
FIG. 50 shows an example interface of connection generator.

FIG. 50 shows an example of connection generator. When the editing is on and the user has admin privileges, the system can save the link and make it available globally. The system may also create a template with the connection generator rule in an Administrator Panel for later use. After clicking the Apply button 5002, the private connection may be created.

Figure 51:
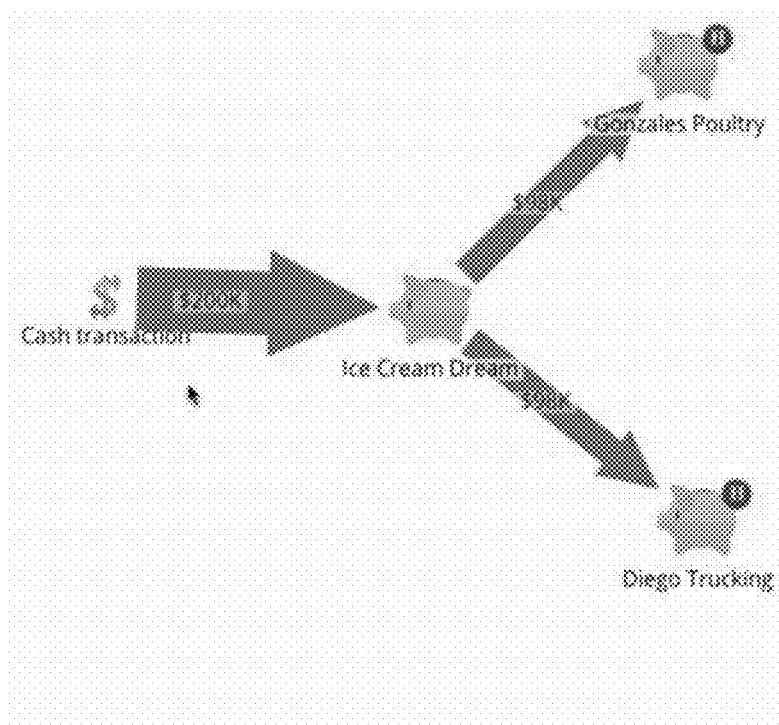
FIG. 51 shows an example of graph with flow analysis.

FIG. 51 shows an example of flow analysis. In this given example, a financial transaction may be analyzed, wherein money by cash transaction of $200 k inflows into an entity (e.g., "Ice Cream Dream object") and afterwards, certain amounts are transferred to other entities (e.g., to Gonzales Poultry and Diego Trucking $98 k, each).

Methods and systems of the present disclosure may be combined with other methods and systems, such as those described in U.S. patent application Ser. No. 14/222,795 filed Mar. 24, 2014, U.S. patent application Ser. No. 14/315,481 filed Jun. 26, 2014, U.S. patent application Ser. No. 14/469,958 filed Aug. 27, 2014, and U.S. patent application Ser. No. 14/469,968 filed Aug. 27, 2014, each of which is entirely incorporated herein by reference. Such methods and systems, for example, may be used with methods and systems of the present disclosure to store data as a mind map in a relational database system.

Computer Systems

Figure 37:
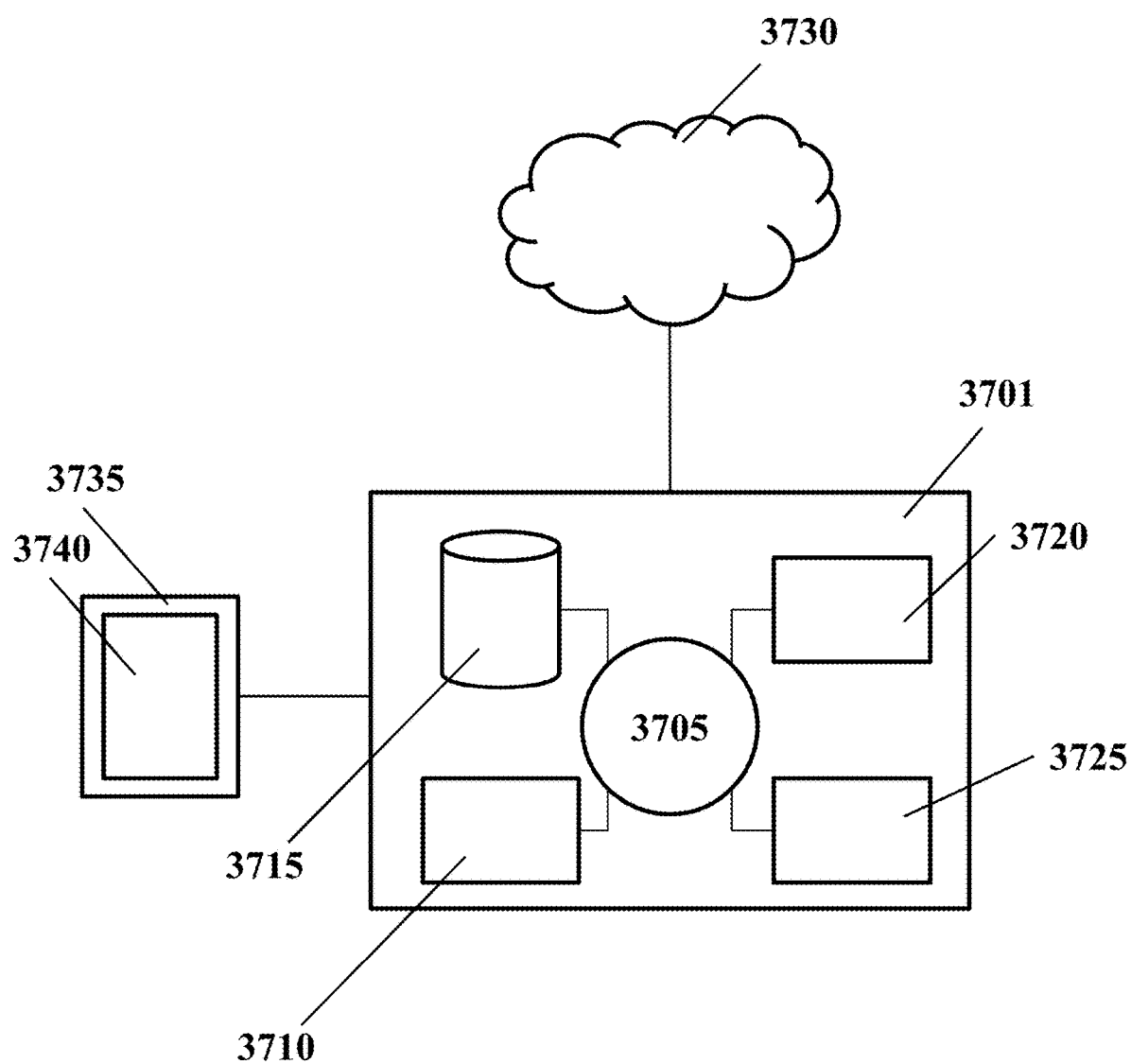
FIG. 37 shows a computer control system that is programmed or otherwise configured to implement methods provided herein.

The present disclosure provides computer control systems that are programmed to implement methods of the disclosure. FIG. 37 shows a computer system 3701 that is programmed or otherwise configured to generate an interface for database query. The computer system 3701 can regulate various aspects of visualization, queries and graph analysis of the present disclosure, such as, for example, generating graphs of business classes and performing queries on selected classes. The computer system 3701 can be an electronic device of a user or a computer system that is remotely located with respect to the electronic device. The electronic device can be a mobile electronic device.

The computer system 3701 includes a central processing unit (CPU, also "processor" and "computer processor" herein) 3705, which can be a single core or multi core processor, or a plurality of processors for parallel processing. The computer system 3701 also includes memory or memory location 3710 (e.g., random-access memory, read-only memory, flash memory), electronic storage unit 3715 (e.g., hard disk), communication interface 3720 (e.g., network adapter) for communicating with one or more other systems, and peripheral devices 3725, such as cache, other memory, data storage and/or electronic display adapters. The memory 3710, storage unit 3715, interface 3720 and peripheral devices 3725 are in communication with the CPU 3705 through a communication bus (solid lines), such as a motherboard. The storage unit 3715 can be a data storage unit (or data repository) for storing data. The computer system 3701 can be operatively coupled to a computer network ("network") 3730 with the aid of the communication interface 3720. The network 3730 can be the Internet, an internet and/or extranet, or an intranet and/or extranet that is in communication with the Internet. The network 3730 in some cases is a telecommunication and/or data network. The network 3730 can include one or more computer servers, which can enable distributed computing, such as cloud computing. The network 3730, in some cases with the aid of the computer system 3701, can implement a peer-to-peer network, which may enable devices coupled to the computer system 3701 to behave as a client or a server.

The CPU 3705 can execute a sequence of machine-readable instructions, which can be embodied in a program or software. The instructions may be stored in a memory location, such as the memory 3710. The instructions can be directed to the CPU 3705, which can subsequently program or otherwise configure the CPU 3705 to implement methods of the present disclosure. Examples of operations performed by the CPU 3705 can include fetch, decode, execute, and writeback.

The CPU 3705 can be part of a circuit, such as an integrated circuit. One or more other components of the system 3701 can be included in the circuit. In some cases, the circuit is an application specific integrated circuit (ASIC).

The storage unit 3715 can store files, such as drivers, libraries and saved programs. The storage unit 3715 can store user data, e.g., user preferences and user programs. The computer system 3701 in some cases can include one or more additional data storage units that are external to the computer system 3701, such as located on a remote server that is in communication with the computer system 3701 through an intranet or the Internet.

The computer system 3701 can communicate with one or more remote computer systems through the network 3730. For instance, the computer system 3701 can communicate with a remote computer system of a user (e.g., a webserver, a database server). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 3701 via the network 3730.

Methods as described herein can be implemented by way of machine (e.g., computer processor) executable code stored on an electronic storage location of the computer system 3701, such as, for example, on the memory 3710 or electronic storage unit 3715. The machine executable or machine readable code can be provided in the form of software. During use, the code can be executed by the processor 3705. In some cases, the code can be retrieved from the storage unit 3715 and stored on the memory 3710 for ready access by the processor 3705. In some situations, the electronic storage unit 3715 can be precluded, and machine-executable instructions are stored on memory 3710.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 3701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 3701 can include or be in communication with an electronic display 3735 that comprises a user interface (UI) 3740 for providing, for example, visualization. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 3705.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for providing visualization of data objects in a relational database, comprising:
   (a) bringing an electronic device of a user in communication with a computer server comprising said relational database that stores data objects in a non-hierarchical data structure, which electronic device comprises a user interface;
   (b) generating and displaying a graph comprising a plurality of visual graphical elements, wherein said plurality of visual graphical elements comprises a first node representing a first class encompassing a first subset of said data objects, a second node representing a second class encompassing a second subset of said data objects, and a link representing a relationship between said first class and said second class;
   (c) receiving a request from said user, via said user interface, to perform a task directed to at least a subset of said data objects;
   (d) generating one or more filtering operations for said task and, upon execution, producing a graphical result comprising a filtered data set from said at least said subset of said data objects; and
   (e) automatically displaying said graphical result on said user interface.

2. The method of claim 1, wherein said one or more filtering operations comprise a filter on a property of a selected class.

3. The method of claim 1, wherein said graphical result is automatically displayed by updating one or more of said plurality of visual graphical elements.

4. The method of claim 1, further comprising outputting said graphical result in a table view.

5. The method of claim 1, wherein said request is inputted by providing a querying interface for said database based on a selected node.

6. The method of claim 5, wherein said querying interface comprises a menu associated with said selected node.

7. The method of claim 6, wherein said menu comprises a filtering option, wherein said filtering option is configured to perform a query on one or more classes linked to said selected node.

8. The method of claim 7, wherein said filtering option provides one or more options for filtering based on said selected node on said graph.

9. The method of claim 8, wherein said request from said user comprises options selected from said one or more options provided on said graph.

10. The method of claim 1, wherein said non-hierarchical data structure comprises:
    a first data structure, stored in a memory, comprising a definition of data sets in said relational database, wherein a definition of a data set comprises a unique data set identifier and a set name;
    a second data structure, stored in said memory, comprising definitions of properties of objects in said relational database, wherein a definition of a property comprises a unique identifier of said property and a data set identifier, from said first data structure, said property is assigned to;
    a third data structure, stored in said memory, comprising definitions of objects of said data sets in said relational database, wherein a definition of an object comprises a unique object identifier and a data set identifier, from said first data structure, said object is assigned to;
    a fourth data structure, stored in said memory, comprising definitions of object values of said data sets in said relational database, wherein a definition of object value comprises an object identifier, from said third data structure, and a property of said data set, from said second data structure, said object value being assigned to;
    a fifth data structure, stored in said memory, comprising definitions of relations of data sets in said relational database, wherein a definition of a relation comprises a unique identifier of said relation and a name of said relation; and
    a sixth data structure, stored in said memory, comprising definitions of objects relations between said objects in said relational database, wherein a definition of an object relation associates a relation, from said fifth data structure, with two object identifiers from said third data structure.

11. A method for providing visualization of data objects in a relational database, comprising:
    (a) bringing an electronic device of a user in communication with a computer server comprising said relational database that stores said data objects in a non-hierarchical data structure, which electronic device comprises a user interface;
    (b) displaying a first output of a first relationship of said data objects on said user interface, wherein said first relationship is between said data objects in said non-hierarchical data structure, and wherein said first output includes one or more graphical elements that are representative of said first relationship;
    (c) receiving a request from said user to access a subset of said data objects stored in said relational database, which request is inputted in said user interface that displays said relationship;
    (d) accessing said relational database to retrieve said subset of said data objects from said relational database;
    (e) generating a second relationship of said data objects, wherein said second relationship is representative of said subset of said data objects; and
    (f) generating and displaying a second output of said second relationship on said user interface, which second output includes one or more graphical elements that are representative of said second relationship.

12. The method of claim 11, wherein said first relationship is a graph that comprises a node representing a class encompassing a first subset of said data objects, and a link representing a data relationship between a pair of one or more other classes representing a remainder of said data objects.

13. The method of claim 12, wherein said second relationship is an additional graph that comprises an additional node representing a class encompassing a second subset of said data objects, which second subset includes data objects from said first subset of said data objects.

14. The method of claim 12, further comprising providing a querying interface for said relational database based on a selected node on said graph, wherein said graph is updated based on said selected node and a menu associated with said selected node is provided on said user interface.

15. The method of claim 14, wherein said menu comprises a filtering option, wherein said filtering option is configured to perform a query on one or more classes linked to said selected node.

16. The method of claim 15, wherein said filtering option provides one or more options for filtering based on said selected node on said graph.

17. The method of claim 16, wherein said request from said user comprises options selected from said one or more options provided on said graph.

18. The method of claim 16, wherein possible filtering options are automatically populated based on said selected node on said graph.

19. The method of claim 11, wherein said relational database stores said data objects with the aid of an electronic mind map.

20. A system for providing visualization of data objects to a user, comprising:
   a database that stores said data objects in a non-hierarchical manner; and
   one or more computer processors operatively coupled to said relational database, wherein said one or more computer processors are individually or collectively programmed to (i) provide a first output of a first relationship of said data objects for display on a user interface, wherein said first relationship is between said data objects in said non-hierarchical manner, and wherein said first output includes one or more graphical elements that are representative of said first relationship; (ii) receive a request from said user to access a subset of said data objects stored in said relational database, which request is inputted in said user interface that displays said relationship; (iii) access said relational database to retrieve said subset of said data objects from said relational database; (iv) generate a second relationship of said data objects, wherein said second relationship is representative of said subset of said data objects; and (v) generate a second output of said second relationship for display on said user interface, which second output includes one or more graphical elements that are representative of said second relationship.

* * * * *